(12) United States Patent
Horihata

(10) Patent No.: US 12,387,594 B2
(45) Date of Patent: Aug. 12, 2025

(54) PARKING-STOPPING POINT MANAGEMENT DEVICE, PARKING-STOPPING POINT MANAGEMENT METHOD, AND VEHICLE DEVICE

(71) Applicant: DENSO CORPORATION, Kariya (JP)

(72) Inventor: Satoshi Horihata, Kariya (JP)

(73) Assignee: DENSO CORPORATION, Kariya (JP)

( * ) Notice: Subject to any disclaimer, the term of this patent is extended or adjusted under 35 U.S.C. 154(b) by 178 days.

(21) Appl. No.: 18/068,212

(22) Filed: Dec. 19, 2022

(65) Prior Publication Data
US 2023/0118619 A1  Apr. 20, 2023

Related U.S. Application Data

(63) Continuation of application No. PCT/JP2021/021493, filed on Jun. 7, 2021.

(30) Foreign Application Priority Data

Jun. 23, 2020 (JP) ................................. 2020-107960

(51) Int. Cl.
*G08G 1/04* (2006.01)
*G06T 7/20* (2017.01)
(Continued)

(52) U.S. Cl.
CPC .............. *G08G 1/04* (2013.01); *G06T 7/20* (2013.01); *G06T 7/70* (2017.01); *G06V 20/58* (2022.01);
(Continued)

(58) Field of Classification Search
CPC ....... B60W 30/18154; B60W 30/0956; B60W 30/00; B60W 30/08; B60W 30/095;
(Continued)

(56) References Cited

U.S. PATENT DOCUMENTS

2020/0342761 A1*  10/2020  Hosokawa ........... G06V 20/588
2021/0304606 A1*  9/2021  Noguchi .............. G06V 20/593

FOREIGN PATENT DOCUMENTS

CN         105513342 A  *  4/2016  .......... G08G 1/0133
JP         2004145632 A      5/2004
(Continued)

OTHER PUBLICATIONS

U.S. Appl. No. 18/068,080, filed Dec. 19, 2022, Horihata.

*Primary Examiner* — Brian A Zimmerman
*Assistant Examiner* — Anthony D Afrifa-Kyei
(74) *Attorney, Agent, or Firm* — Harness, Dickey & Pierce, P.L.C.

(57) ABSTRACT

A parking-stopping point management device includes a determination criterion acquisition unit configured to acquire at least one of vehicle behavior data indicative of a behavior of at least one vehicle and sensing information of a surrounding monitoring sensor mounted in the at least one vehicle in association with position information of the at least one vehicle; a parking-stopping point detection unit configured to detect, as a parking-stopping point, a street parking point which is a point where the parking-stopping vehicle is parked on a normal road; an existence state determination unit configured to determine whether the parking-stopping vehicle still exists at the street parking point detected by the parking-stopping point detection unit based on the information acquired by the determination criterion acquisition unit; and a distribution processing unit configured to distribute information on the street parking point detected by the parking-stopping point detection unit to the at least one vehicle.

19 Claims, 17 Drawing Sheets

(51) Int. Cl.
*G06T 7/70* (2017.01)
*G06V 20/58* (2022.01)
*G08G 1/01* (2006.01)

(52) U.S. Cl.
CPC .. *G08G 1/0133* (2013.01); *G06T 2207/30261* (2013.01)

(58) Field of Classification Search
CPC ........... B60W 30/16; B60W 30/18159; B60W 2554/20; B60W 2554/404; B60W 2554/4041; B60W 2554/4046; B60W 2554/80; B60W 30/06; B60W 40/06; G08G 1/0962; G08G 1/096827; G08G 1/096861; G08G 1/143; G08G 1/147; G08G 1/0125; G08G 1/00; G08G 1/01; G08G 1/0104; G08G 1/0129; G08G 1/0133; G08G 1/0108; G08G 1/0137; G08G 1/04; G01C 21/3682; G01C 21/3685; G01C 21/3423; G01C 21/3461
See application file for complete search history.

(56) References Cited

FOREIGN PATENT DOCUMENTS

| | | | | | |
|---|---|---|---|---|---|
| JP | 2004341893 | A | | 12/2004 | |
| JP | 2005025528 | A | | 1/2005 | |
| JP | 2008292323 | A | | 12/2008 | |
| JP | 2014123356 | A | * | 7/2014 | ......... G01C 21/3685 |
| JP | 2019040539 | A | | 3/2019 | |
| JP | 2019121274 | A | | 7/2019 | |
| JP | 2020086735 | A | | 6/2020 | |
| JP | 2021064251 | A | * | 4/2021 | ...... B60W 30/18163 |
| WO | WO-2014155884 | A1 | | 10/2014 | |
| WO | WO-2019119256 | A1 | * | 6/2019 | ............... G08G 1/01 |

* cited by examiner

FIG. 14

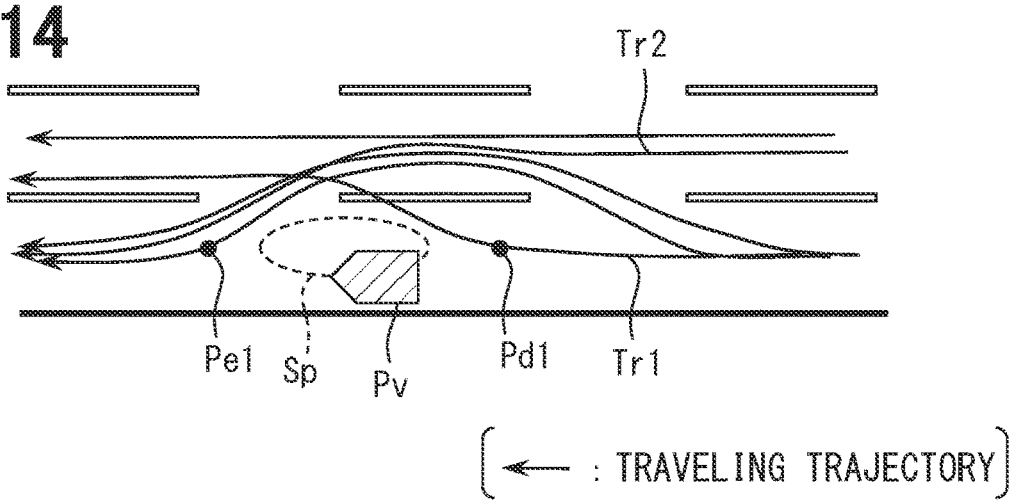

(← : TRAVELING TRAJECTORY)

FIG. 15

| IMAGE CONFIRMATION RESULT (SERVER) | RECOGNITION RESULT (VEHICLE REPORT) | NUMBER OF AVOIDANCE VEHICLES FOR APPEARANCE DETERMINATION |
|---|---|---|
| ○ | ○ | 1 |
| ○ | × | 3 |
| UNIDENTIFIED | ○ | 2 |
| UNIDENTIFIED | × | 4 |
| × | ○ | 8 |
| × | × | 10 |

○ : DETERMINE THAT THERE IS STREET PARKING
× : DETERMINE THAT THERE IS NO STREET PARKING

FIG. 16

| IMAGE CONFIRMATION RESULT (SERVER) | RECOGNITION RESULT (VEHICLE REPORT) | NUMBER OF STRAIGHT TRAVELING VEHICLES FOR DISAPPEARANCE DETERMINATION |
|---|---|---|
| × | × | 2 |
| × | ○ | 4 |
| UNIDENTIFIED | × | 3 |
| UNIDENTIFIED | ○ | 5 |
| ○ | × | 10 |
| ○ | ○ | 12 |

× : DETERMINE THAT THERE IS NO STREET PARKING
○ : DETERMINE THAT THERE IS STREET PARKING

| CAMERA | RADAR | VEHICLE BEHAVIOR | DETECTION RELIABILITY |
|---|---|---|---|
| ○ | ○ | ○ | 10 |
| ○ | × | ○ | 9 |
| × | ○ | ○ | 9 |
| × | × | ○ | 8 |
| ○ | ○ | × | 7 |
| ○ | × | × | 4 |
| × | ○ | × | 4 |
| × | × | × | 0 |

○ : STREET PARKING DETECTED/AVOIDANCE ACTION PERFORMED
× : STREET PARKING NOT DETECTED/AVOIDANCE ACTION NOT PERFORMED

PARKING-STOPPING POINT MANAGEMENT DEVICE, PARKING-STOPPING POINT MANAGEMENT METHOD, AND VEHICLE DEVICE

CROSS REFERENCE TO RELATED APPLICATIONS

The present application is a continuation application of International Patent Application No. PCT/JP2021/021493 filed on Jun. 7, 2021, which designated the U.S. and claims the benefit of priority from Japanese Patent Application No. 2020-107960 filed on Jun. 23, 2020. The entire disclosures of all of the above applications are incorporated herein by reference.

TECHNICAL FIELD

The present disclosure relates to a technology for detecting an obstacle that may obstruct vehicle traffic, and more particularly to a parking-stopping point management device and a parking-stopping point management method for managing position information of a parking-stopping point of a vehicle on a road.

BACKGROUND ART

As the technology for detecting the obstacle on the road, for example, a configuration for detecting an animal dead body, a fallen tree, and a fallen object from a traveling vehicle by using an vehicle-mounted camera, based on an image captured by the vehicle-mounted camera, is well-known. A box, a ladder, and a ski plate are assumed as the fallen object.

SUMMARY

According to one aspect of the present disclosure, a parking-stopping point management device, includes a determination criterion acquisition unit that is configured to acquire at least one of vehicle behavior data indicative of a behavior of at least one vehicle and sensing information of a surrounding monitoring sensor mounted in the at least one vehicle in association with position information of the at least one vehicle; a parking-stopping point detection unit that is configured to detect, as a parking-stopping point, a street parking point which is a point where the parking-stopping vehicle is parked on a normal road; an existence state determination unit that is configured to determine whether the parking-stopping vehicle still exists at the street parking point detected by the parking-stopping point detection unit based on the information acquired by the determination criterion acquisition unit; and a distribution processing unit that is configured to distribute information on the street parking point detected by the parking-stopping point detection unit to the at least one vehicle. The parking-stopping point detection unit is configured to set, as the street parking point, a location where the parking-stopping vehicle exists when a distance between the parking-stopping vehicle on the road and a roadside falls within a predetermined distance. The parking-stopping point detection unit is configured to detect the street parking point on the road at an exit area of an intersection in preference to the street parking point on the road at an entrance area of the intersection.

BRIEF DESCRIPTION OF DRAWINGS

FIG. 14 is a figure describing an operation of an appearance determination unit.

FIG. 15 is a figure illustrating an example of a reference of the appearance determination unit to determine that an obstacle exists.

FIG. 16 is a figure illustrating an example of a reference of a disappearance determination unit to determine that the obstacle has disappeared.

DESCRIPTION OF EMBODIMENTS

Figure 1:
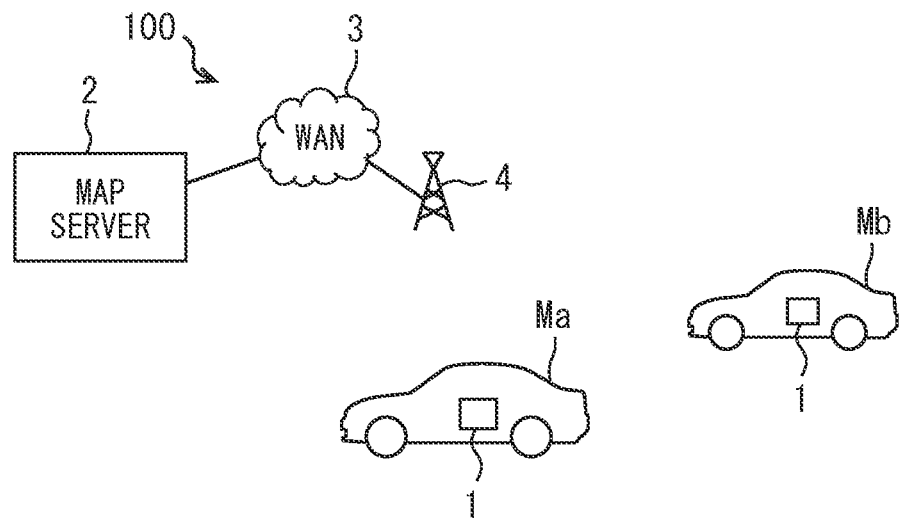
FIG. 1 is a figure describing a configuration of a street parking information distribution system.

Next, a relevant technology will described below only for understanding the following embodiments. There has been know a vehicle using the vehicle-mounted camera to confirm whether the fallen object notified from a server still remains. The vehicle returns a result thereof to the server, and the server updates an existence state of the fallen object, based on the confirmation result from the vehicle. A configuration in which a time required for removing the obstacle is roughly predicted, based on a type of the fallen object, and a predicted time thereof is distributed, is also well-known.

Conventionally, only an object to be removed by a road administrator, such as the animal dead body, the fallen tree, and the object fallen from the vehicle, that is, only stationary objects which are not autonomously moved are assumed. Conventionally, a parking or stopping vehicle (hereafter, parking-stopping) in the vicinity of a roadside is not assumed as the obstacle. Unlike the stationary objects such as the fallen object, the parking-stopping vehicle on the road is caused to restart a movement by a user of the vehicle. Therefore, the existence state may be relatively dynamically changed, compared to the fallen object. That is, characteristics such as an existence period of the parking-stopping vehicle are different from characteristics of the obstacle.

For example, the existence of the parking-stopping vehicle on the road may hinder services such as an autonomous driving function on a normal road. When a parking-stopping position of the vehicle can be acquired as map data, a traveling plan for avoiding the point can be established, and a handover can be performed in advance. That is, in order to practically use an autonomous driving technology and to improve safety and convenience, there is a demand for a technology which can quickly detect a parking-stopping point of the vehicle on the road.

The present disclosure is made based on the above-described circumstances, and one of objectives thereof is to provide a parking-stopping point management device, a parking-stopping point management method, and a vehicle device which can detect a parking-stopping point of a vehicle on a road.

According to the above-described configuration, a parking-stopping point of a vehicle is detected, based on behavior data or sensing information of at least one vehicle passing through the point.

According to one aspect of the present disclosure, a parking-stopping point management method is provided for managing point information indicative of a parking-stopping point of a parking-stopping vehicle on a road. The method is executed by at least one processor. The method includes acquiring at least one of vehicle behavior data indicative of a behavior of at least one vehicle and sensing information of a surrounding monitoring sensor mounted in the at least one vehicle in association with position information; detecting, as a parking-stopping point, a street parking point which is a point where the parking-stopping vehicle is parked on a normal road; determining whether the parking-stopping vehicle still exists at the detected parking-stopping point based on the acquired information; and distributing information on the street parking point to the at least one vehicle. Detecting the parking-stopping point includes detecting the parking-stopping vehicle, which is a vehicle parking on the road, setting, as the street parking point, a location where the parking-stopping vehicle exists when a distance between the parking-stopping vehicle on the road and a roadside falls within a predetermined distance, and detecting the street parking point on the road at an exit area of an intersection in preference to the street parking point on the road at an entrance area of the intersection.

According to one aspect of the present disclosure, a parking-stopping point management method is provided for managing point information indicative of a parking-stopping point of a parking-stopping vehicle on a road. The method is executed by at least one processor. The method includes acquiring at least one of vehicle behavior data indicative of a behavior of at least one vehicle and sensing information of a surrounding monitoring sensor mounted in the at least one vehicle in association with position information; detecting, as a parking-stopping point, a street parking point which is a point where the parking-stopping vehicle is parked on a normal road; and determining whether the parking-stopping vehicle still exists at the detected parking-stopping point based on the acquired information. Detecting the parking stopping point includes acquiring the position of the street parking point on a map, based on map data and the sensing information acquired by the determination criterion acquisition unit, determining whether a stopping vehicle parked on the road is the parking-stopping vehicle, based on a position of a roadside on the map and the position of the street parking point on the map, and detecting a position where the stopping vehicle exists as the position of the street parking point, when it is determined that the stopping vehicle is the parking-stopping vehicle.

According to the above-described method, a parking-stopping point of a vehicle on a road can be detected, based on information from a vehicle traveling on the road, such as vehicle behavior data and/or sensing information of a surrounding monitoring sensor.

According to one aspect of the present disclosure, a vehicle device is provided for transmitting information related to a parking-stopping point which is a parking-stopping point of a vehicle on a road, to a predetermined server. The vehicle device includes a stopping vehicle information acquisition unit that is configured to acquire, based on an input signal from a surrounding monitoring sensor mounted in a subject vehicle, information related to a stopping vehicle that is stopped on the road; a parking determination unit that is configured to determine, based on the information related to the stopping vehicle which is acquired by the stopping vehicle information acquisition unit, whether the stopping vehicle is a street parking vehicle parked on the road or a temporary stopping vehicle with a travelling state; and a report processing unit that is configured to transmit, to the server, a data set indicative of a point where the street parking vehicle exists when the parking determination unit determines that the stopping vehicle is the street parking vehicle. The stopping vehicle information acquisition unit acquires a position and a direction of each of a plurality of stopping vehicles. The parking determination unit determines that the stopping vehicles are the street parking vehicles when the stopping vehicles constitute a row and at least one of the stopping vehicles is parked in a direction opposite to the other stopping vehicles.

According to one aspect of the present disclosure, a vehicle device is provided for transmitting information related to a parking-stopping point which is a parking-stopping point of a vehicle on a road, to a predetermined server. The vehicle device includes a stopping vehicle information acquisition unit that is configured to acquire, based on an input signal from a surrounding monitoring sensor mounted in a subject vehicle, information related to a stopping vehicle that is stopped on the road; a parking determination unit that is configured to determine, based on the information related to the stopping vehicle which is acquired by the stopping vehicle information acquisition unit, whether the stopping vehicle is a street parking vehicle parked on the road or a temporary stopping vehicle with a travelling state; a report processing unit that is configured to transmit, to the server, a data set indicative of a point where the street parking vehicle exists when the parking determination unit determines that the stopping vehicle is the street parking vehicle; and a subject vehicle position acquisition unit that is configured to acquire a position of the subject vehicle on a map. The stopping vehicle information acquisition unit acquires a relative position of the stopping vehicle with respect to the subject vehicle and a position of the subject vehicle on the map. The parking determination unit specifies a position of the stopping vehicle on the map, based on the position of the subject vehicle acquired by the subject vehicle position acquisition unit and the relative position of the stopping vehicle acquired by the stopping vehicle information acquisition unit. The parking determination unit determines whether the stopping vehicle is the street parking vehicle by comparing a position of a roadside on the map and the position of the stopping vehicle on the map.

According to the above-described vehicle device, a server collects information on a point where there is a possibility that a parking-stopping vehicle may exist on a road. Therefore, the server can detect a parking-stopping point, based on the information collected from multiple vehicles. That is, an existence location of a parking-stopping vehicle and an existence state of the vehicles can be recognized on a real-time basis.

Hereinafter, an embodiment of the present disclosure will be described below with reference to the drawings. FIG. 1 is a figure illustrating an example of a schematic configuration of a street parking information distribution system 100 according to the present disclosure. As illustrated in FIG. 1, the street parking information distribution system 100 includes multiple in-vehicle systems 1 built in each of multiple vehicles Ma and Mb, and a map server 2. The street parking information distribution system 100 is a system in which the map server 2 distributes information on a point where a street parking vehicle exists on a normal road. Here, the street parking vehicle indicates a parking-stopping vehicle along a road shoulder/roadside of the normal road. The description of parking-stopping can be read as parking or stopping the vehicle. A street parking point which is a point where the street parking vehicle exists corresponds to a parking-stopping point.

In the present disclosure, a vehicle temporarily stopped to wait for a signal will be referred to as a temporary stopping vehicle in order to distinguish the temporary stopping vehicle from the street parking vehicle. When the street parking vehicle and the temporary stopping vehicle are not distinguished, both of these will be referred to as a stopping vehicle or a stopping vehicle. That is, a concept of the stopped/stopping vehicle includes both the street parking vehicle and the temporary stopping vehicle. A temporary stopping vehicle is a vehicle which stops to wait for a signal, pedestrian/animal crossing, or oncoming vehicle/train passing (hereafter, waiting for the signal or the like). A temporary stopping vehicle indicates a vehicle which maintains a ready-to-move state and can be expected to move to another point within a few minutes, or within five minutes at most. On the other hand, the street parking vehicle is conceptually a vehicle which is expected to continue to stop at the same point for 5 minutes or longer. For example, the street parking vehicle indicates a vehicle in a state where no occupant exists inside a vehicle cabin. Whereas the street parking vehicle may correspond to a stopping vehicle which a subject vehicle avoids without lining up behind the vehicle while the subject vehicle needs to continuously move, the temporary stopping vehicle may correspond to a stopping vehicle for which the subject vehicle needs to line up behind the vehicle. With regard to an end of a traffic congestion, as an example here, the end of the traffic congestion will be similarly regarded as the temporary stopping vehicle, but the configuration is not limited thereto. When only some lanes such as a right-turn only lane or a left-turn only lane are congested, and when the subject vehicle does not need to travel on the lane, the vehicle located at the end of the traffic congestion can be included in the street parking vehicle serving as an avoidance target. The end of the traffic congestion can be treated as a parking-stopping point.

Here, on an assumption that the street parking information distribution system 100 is used in a left-hand traffic area as an example, a leftmost lane in lanes having the same traveling direction will be referred to as a first lane. Accordingly, when a parking-stopping vehicle exists on a road which is not one way, it is assumed that the parking-stopping vehicle exists along a left side roadside in the traveling direction. When used in a right-hand traffic area, the configuration of the present disclosure can be achieved by reversing the above-described right and left directions. For example, in the right-hand traffic area, the first lane indicates a rightmost lane in the lanes having the same traveling direction. The street parking information distribution system 100 described below can be changed and changed to conform to traffic regulations of an area where the street parking information distribution system 100 is used. A parking-stopping position on a one-way road is not limited to either the right side or the left side of the road.

In FIG. 1, for convenience, only two vehicles of the vehicle Ma and the vehicle Mb are illustrated as vehicles on which the in-vehicle system 1 is mounted, but actually, three or more vehicles exist. The in-vehicle system 1 can be mounted on a vehicle that can travel on a road, and the vehicles Ma and Mb may be a two-wheeled vehicle or a three-wheeled vehicle in addition to a four-wheeled vehicle. A motorized bicycle can also be included in the two-wheeled vehicle. Hereinafter, when viewed from the in-vehicle system 1, a vehicle on which the system (that is, the system itself) is mounted will also be referred to as a subject vehicle.

<Overview of Overall Configuration>

The in-vehicle system 1 mounted on each vehicle is configured to be wirelessly connectable to a wide area communication network 3. Here, the wide area communication network 3 indicates a public communication network provided by a telecommunication carrier, such as a cellular phone network and the Internet. A base station 4 illustrated in FIG. 1 is a wireless base station for the in-vehicle system 1 to be connected to the wide area communication network 3.

Each in-vehicle system 1 transmits a vehicle condition report which is a communication packet indicating a condition of the subject vehicle, to the map server 2 via the base station 4 and the wide area communication network 3 at a predetermined cycle. The vehicle condition report includes transmission source information indicating the vehicle which transmits the communication packet (that is, a transmission source vehicle), a generation time of the data, and a current position of the transmission source vehicle. The transmission source information is identification information (so-called vehicle ID) previously allocated to the transmission source vehicle to distinguish the transmission source vehicle from other vehicles. In addition to the above-described information, the vehicle condition report may include a traveling direction of the subject vehicle, a traveling lane ID, a traveling speed, acceleration, and a yaw rate. The traveling lane ID indicates whether the subject vehicle travels on any number lane from a left end or right end roadside. Furthermore, the vehicle condition report may include information such as a lighting state of a direction indicator and whether the vehicle travels across a lane boundary.

Each in-vehicle system 1 uploads a communication packet (hereinafter, referred to as a street parking point report) indicating information related to the street parking point notified from the map server 2, to the map server 2. The information related to the street parking point is information used as a determination criterion for the map server 2 to determine an existence state of the street parking vehicle. The street parking point report may be included in the vehicle condition report. The street parking point report and the vehicle condition report may be separately transmitted.

The map server 2 detects a position where the street parking vehicle exists, or a point where the street parking vehicle has disappeared, based on the street parking point report uploaded from each vehicle. The information related to the appearance/disappearance of the street parking vehicle is distributed by using a multicast method to the vehicles to which the information needs to be distributed.

The map server 2 has a function of managing the current position of each vehicle, as a sub-function for determining a distribution destination of information on the appearance/disappearance of the street parking vehicle. Management of the current position of each vehicle may be realized by using a vehicle position database which is a predetermined database. In the database, the current position of each vehicle is stored in association with a vehicle ID. Each time the map server 2 receives the vehicle condition report, the map server 2 indicates contents of the vehicle condition report, and updates the current position of the transmission source vehicle registered in the database. For example, in the configuration for pull-based distribution of the street parking point information, a configuration for determining the distribution destination of the street parking point information such as a vehicle position database is not necessarily required. The function of managing a position of each vehicle for determining the distribution destination is an optional element. Transmitting the vehicle condition report in the in-vehicle system 1 is also an optional element.

<Overview of In-Vehicle System 1>

Figure 2:
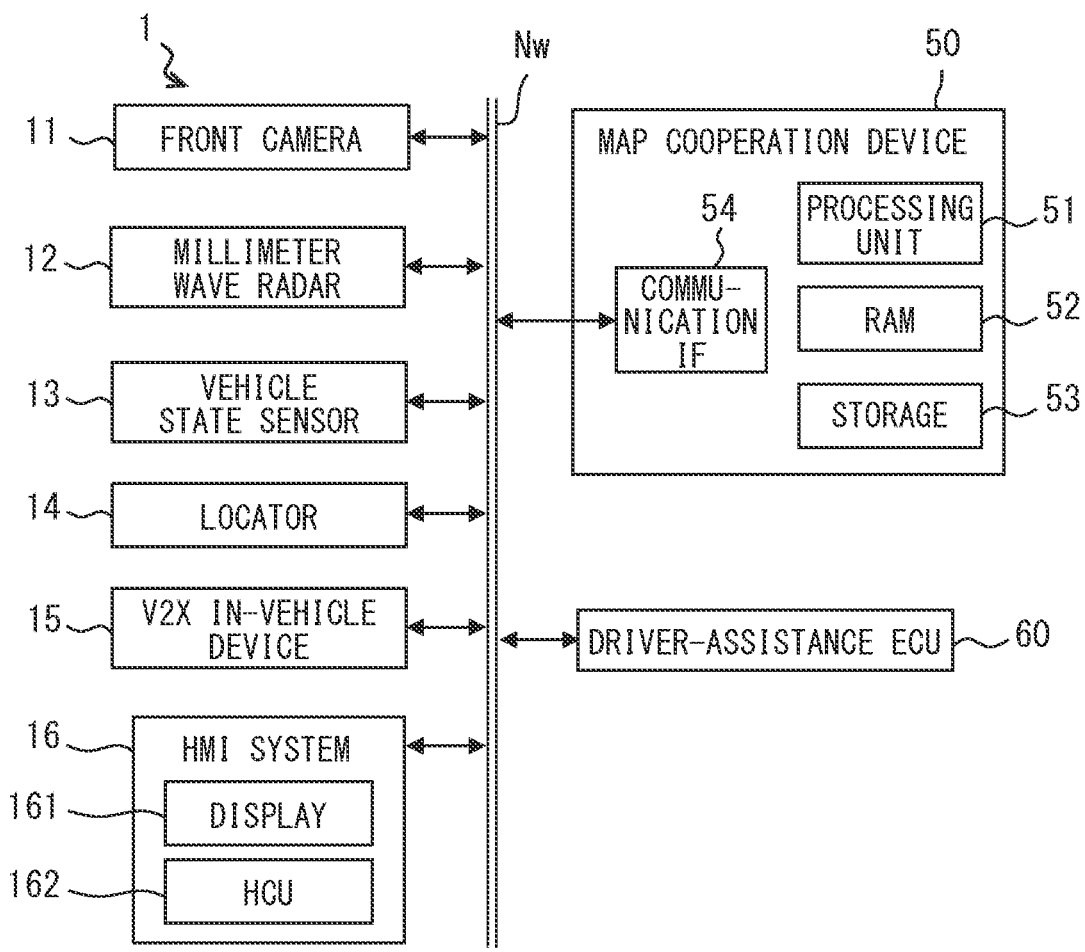
FIG. 2 is a block diagram illustrating the configuration of the in-vehicle system.

As illustrated in FIG. 2, the in-vehicle system 1 includes a front camera 11, a millimeter wave radar 12, a vehicle state sensor 13, a locator 14, a V2X in-vehicle device 15, an HMI system 16, a map cooperation device 50, and a driver-assistance ECU 60. The ECU in a member name is an abbreviation for an electronic control unit, and means an electronic control device. The HMI is an abbreviation for a human machine interface. The V2X is an abbreviation for vehicle to X (everything), and indicates a communication technology for connecting various things to a vehicle.

Various devices or sensors forming the in-vehicle system 1 are connected as nodes to an in-vehicle network Nw serving as a communication network built inside the vehicle. The nodes connected to the in-vehicle network Nw can communicate with each other. Specific devices may be configured to be capable of directly communicating with each other without using the in-vehicle network Nw. For example, the map cooperation device 50 and the driver-assistance ECU 60 may be directly and electrically connected to each other by using a dedicated line. Although the in-vehicle network Nw is configured to be a bus type in FIG. 2, the configuration is not limited thereto. The network topology may be a mesh type, a star type, or a ring type. A network shape can be changed as appropriate. For example, various standards such as the controller area network (hereinafter, CAN: registered trademark), the Ethernet (Ethernet is a registered trademark), and FlexRay (registered trademark) can be adopted as standards of the in-vehicle network Nw.

Hereinafter, a driver's seat occupant who is an occupant seated in a driver's seat of the subject vehicle will also referred to as a user. In the following description, each of front-rear, left-right, and up-down directions is defined with reference to the subject vehicle. Specifically, the front-rear direction corresponds to a longitudinal direction of the subject vehicle. The left-right direction corresponds to a width direction of the subject vehicle. The up-down direction corresponds to a vehicle height direction. From another viewpoint, the up-down direction corresponds to a direction perpendicular to a plane parallel to a plane defined by the front-rear direction and the left-right direction.

<Each Configuration Element of In-Vehicle System 1>

The front camera 11 is a camera that captures a forward image of the vehicle with a predetermined angle of view. The front camera 11 is disposed, for example, in an upper end portion of a front windshield on a vehicle interior side, a front grille, or a roof top. The front camera 11 includes a camera body portion that generates an image frame, and an ECU that detects a predetermined detection target object by performing recognition processing on the image frame. The camera body portion includes at least an image sensor and a lens, and generates and outputs captured image data at a predetermined frame rate (for example, 60 fps). The camera ECU is configured to include an image processing chip, as a main part, including a CPU and a GPU, and includes an identification device as a functional block. For example, the identification device identifies a type of an object, based on a feature amount vector of an image.

The front camera 11 detects a predetermined detection target object, and specifies a relative position of the detection object with respect to the subject vehicle. For example, the detection target object includes a pedestrian, other vehicles, a feature as a landmark, roadside, and a road surface mark. Other vehicles include a bicycle, a motorized bicycle, and a motorcycle. The landmark is a three-dimensional structure installed along a road. For example, a structure installed along the roads includes a guard rail, a curb, a tree, a utility pole, a road sign, and a traffic light. The road sign includes a guide sign such as a direction sign and a road name sign. The feature as the landmark is used for a localization process (to be described later). The road surface mark indicates a paint drawn on a road surface for traffic control and traffic regulation. For example, the road surface marking includes a lane mark (so-called lane mark) that indicate a lane boundary, a pedestrian crossing, a stop line, a zebra zone, a safety zone, and a regulation arrow. The lane mark includes those realized by a road tack such as a chatter bar and Botts' Dots, in addition to a paint formed in a dashed line shape or in a continuous line shape by using a yellow or white paint. The lane marking is also called a lane mark or lane marker.

When detecting the vehicle, the front camera 11 determines whether the vehicle has been stopped (stopping vehicle), based on a relative speed of the detected vehicle. For example, the front camera 11 outputs information indicating a position of the stopping vehicle on the road or a relative position with respect to the subject vehicle. It is preferable that the front camera 11 is configured to be capable of detecting not only the lane on which the subject vehicle travels, but also the stopping vehicle existing in a region corresponding to an adjacent lane. Here, as an example, it is assumed that the front camera 11 is configured to be capable of detecting the vehicle on the subject vehicle traveling lane and the vehicle on right and left adjacent lanes.

An image processor provided in the front camera 11 separates and extracts a background and a detection target object from a captured image, based on image information including a color, luminance, and contrast related to the color and the luminance. For example, based on the image, the front camera 11 calculates a relative distance and direction (that is, a relative position) of the detection target object, such as a lane boundary, a roadside, and the vehicle, from the subject vehicle and a travel speed by using a structure from motion (SfM) process. The relative position of the detection object with respect to the subject vehicle may be specified, based on a size and a degree of inclination of the detection object inside the image. Detection result data indicating the position or the type of the detection object is sequentially provided to the map cooperation device 50 and the driver-assistance ECU 60.

The millimeter wave radar 12 is a device that detects a relative position and a relative speed of the object with respect to the subject vehicle by transmitting millimeter waves or quasi-millimeter waves forward of the vehicle, and analyzing received data of the reflected waves returned after reflecting the transmission waves from the object. For example, the millimeter wave radar 12 is installed in a front grille or a front bumper. The millimeter wave radar 12 incorporates a radar ECU that identifies a type of the detection object, based on a size, a travel speed, and reception strength of the detection object. As a detection result, the radar ECU outputs data indicating the type, the relative position (direction and distance), and the reception strength of the detection object to the map cooperation device 50. The millimeter wave radar 12 is configured to be capable of detecting some or all of the above-described street parking vehicles. For example, the millimeter wave radar 12 detects the stopping vehicle, based on the position, the travel speed, the size, and reflection intensity of the detection object.

For example, in addition to data indicating a recognition result, the front camera 11 and the millimeter wave radar 12 are configured to provide observation data used for object recognition such as image data to the driver-assistance ECU 60 via the in-vehicle network Nw. For example, the observation data for the front camera 11 indicates an image frame. The observation data of the millimeter wave radar indicates data indicating the reception strength and the relative speed for each detection direction and distance, or data indicating the relative position and the reception strength of the detection object. The observation data corresponds to unprocessed data observed by the sensor or data before recognition processing is performed. Both the front camera 11 and the millimeter wave radar 12 correspond to sensors that sense an outside of the vehicle. Therefore, when the front camera 11 and the millimeter wave radar 12 are the same, both of the front camera 11 and the millimeter wave radar 12 will also be referred to as surrounding monitoring sensors.

Object recognition processing based on the observation data generated by the surrounding monitoring sensor may be executed by an ECU other than the sensor, such as the driver-assistance ECU 60. A part of functions of the front camera 11 and the millimeter wave radar 12 may be provided in the driver-assistance ECU 60. In this case, the camera as the front camera 11 and the millimeter wave radar may provide the driver-assistance ECU 60 with the observation data such as image data and distance measurement data as detection result data.

The vehicle state sensor 13 is a sensor that detects a state amount related to traveling control of the subject vehicle. For example, the vehicle state sensor 13 includes an inertial sensor such as a three-axis gyro sensor and a three-axis acceleration sensor. The three-axis acceleration sensor is a sensor that detects acceleration acting on the subject vehicle in the front-rear, left-right, and up-down directions. The gyro sensor detects a rotation angular velocity around a detection axis, and the three-axis gyro sensor has three detection axes orthogonal to each other. The vehicle state sensor 13 can also include a shift position sensor, a steering angle sensor, and a vehicle speed sensor. The shift position sensor is a sensor that detects a position of a shift lever. The steering angle sensor is a sensor that detects a rotation angle of a steering wheel (so-called steering angle). The vehicle speed sensor is a sensor that detects a traveling speed of the subject vehicle.

The vehicle state sensor 13 outputs data indicating a current value (that is, a detection result) of the physical state amount of a detection target to the in-vehicle network Nw. The output data of each vehicle state sensor 13 is acquired by the map cooperation device 50 via the in-vehicle network Nw. The types of sensors used by the in-vehicle system 1 as the vehicle state sensor 13 may be appropriately designed, and it is not necessary to provide all of the above-described sensors.

Figure 3:
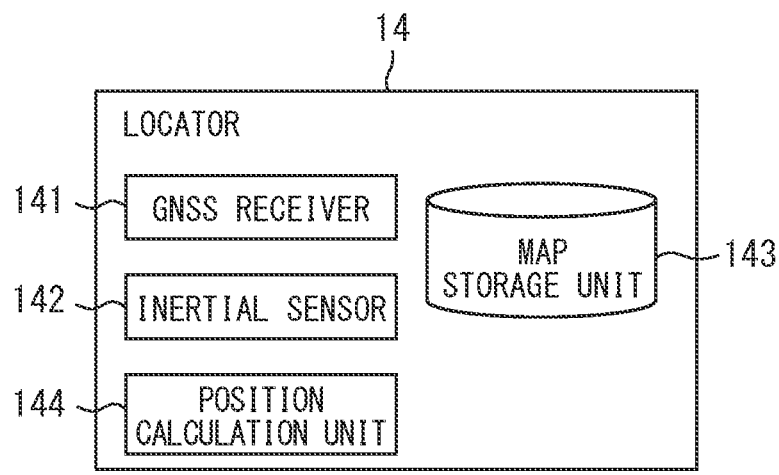
FIG. 3 is a block diagram illustrating a configuration of a locator.

The locator 14 is a device that generates highly accurate position information of the subject vehicle through complex positioning for combining multiple information. For example, as illustrated in FIG. 3, the locator 14 is realized by using a GNSS receiver 141, an inertial sensor 142, a map storage unit 143, and a position calculation unit 144.

The GNSS receiver 141 is a device that sequentially detects current positions of the GNSS receiver 141 by receiving navigation signals transmitted from positioning satellites forming a global navigation satellite system (GNSS). For example, when the GNSS receiver 141 receives the navigation signals from four or more positioning satellites, the GNSS receiver 141 outputs positioning results every 100 milliseconds. As the GNSS, the GPS, the GLONASS, the Galileo, the IRNSS, the QZSS, or the Beidou can be adopted. For example, the inertial sensor 142 is the three-axis gyro sensor and the three-axis acceleration sensor.

The map storage unit 143 is a non-volatile memory that stores high accuracy map data. The high accuracy map data here corresponds to map data indicating a road structure, and a position coordinate regarding the feature installed along the road with accuracy that can be used for autonomous driving. For example, the high accuracy map data includes three-dimensional shape data of the road, lane data, or feature data. The three-dimensional shape data of the road described above includes node data related to a point (hereinafter, referred to as node) at which multiple roads intersect, merge, or branch, and link data related to the road (hereinafter, referred to as a link) connecting the points. The link data may include data indicating a road type such as whether the road is a motorway or a normal road. The motorway here indicates a road on which entrance of a pedestrian or a bicycle is prohibited, and indicates a toll road such as an expressway. The road type may include attribute information indicating whether autonomous traveling is allowed on the road. The lane data indicates the number of lanes, installation position coordinates of the lane mark (so-called lane marker), a traveling direction for each lane, and branching/merging points in a lane level. The feature data includes position and type information of the road surface display such as a stop line, or position, shape, and type information of the landmark. The landmark includes a three-dimensional structure installed along the road, such as a traffic sign, a traffic light, a pole, and a commercial signboard.

The position calculation unit 144 sequentially performs positioning on the subject vehicle by combining a positioning result of the GNSS receiver 141 and a measurement result of the inertial sensor 142. For example, when the GNSS receiver 141 cannot receive a GNSS signal inside a tunnel, the position calculation unit 144 performs dead reckoning (autonomous navigation) by using a yaw rate and a vehicle speed. The yaw rate used for the dead reckoning may be calculated by the front camera 11 by using the SfM technique, or may be detected by a yaw rate sensor. The vehicle position information obtained by positioning is output to the in-vehicle network Nw, and is used by the map cooperation device 50. The position calculation unit 144 specifies the ID of the subject vehicle traveling lane (hereinafter, referred to as a traveling lane) on the road, based on the subject vehicle position coordinates specified by the above-described configuration.

The locator 14 may be configured to be capable of perform a localization process. The localization process indicates a process for specifying a detailed position of the subject vehicle by collating the coordinates of the landmark specified based on the image captured by the front camera 11 with the coordinates of the landmark registered in the high accuracy map data. The localization process may be performed by collating three-dimensional detection point cloud data output by a light detection and ranging/laser Imaging detection and ranging (LiDAR) with three-dimensional map data. The locator 14 may be configured to specify the traveling lane, based on a distance from the roadside detected by the front camera 11 or the millimeter wave radar 12. Some or all of functions provided to the locator 14 may be provided to the map cooperation device 50 or the driver-assistance ECU 60.

The V2X in-vehicle device 15 is a device for the subject vehicle to perform wireless communication with other devices. The "V" of V2X indicates an automobile serving as the subject vehicle, and the "X" indicates various presences other than the subject vehicle, such as the pedestrian, other vehicles, a road facility, the network, or the server. The V2X in-vehicle device 15 includes a wide area communication unit and a short range communication unit as communication modules. The wide area communication unit is a communication module for performing wireless communication conforming to a predetermined wide area wireless communication standard. For example, various standards such as Long Term Evolution (LTE), 4G, and 5G can be adopted as the wide area wireless communication standard here. In addition to communication via a wireless base station, the wide area communication unit may be configured to be capable of performing wireless communication directly with other devices without using the base station, by a method conforming to the wide area wireless communication standard. That is, the wide area communication unit may be configured to execute cellular V2X. Since the V2X in-vehicle device 15 is mounted, the subject vehicle functions as a connected car that can be connected to the Internet. For example, the map cooperation device 50 can download latest high accuracy map data from the map server 2, and can update the map data stored in the map storage unit 143 in cooperation with the V2X in-vehicle device 15.

The short range communication unit provided in the V2X in-vehicle device 15 is a communication module for directly performing wireless communication with other moving objects or roadside devices existing around the subject vehicle in accordance with a communication standard in which a communication distance is limited within several hundred meters (hereinafter, referred to as a short range communication standard). The other moving objects are not limited to the vehicle, and may include the pedestrian or the bicycle. Any optional standard such as the wireless access in vehicular environment (WAVE) standard disclosed in IEEE 1709 or the dedicated short range communications (DSRC) standard can be used as the short range communication standard. For example, the short range communication unit broadcasts vehicle information on the subject vehicle to surrounding vehicles at a predetermined transmission cycle, and receives the vehicle information transmitted from other vehicles. The vehicle information includes a vehicle ID, a current position, a traveling direction, a travel speed, an operation state of a direction indicator, and a time stamp.

The HMI system 16 is a system that provides an input interface function for accepting a user operation and an output interface function for presenting information to the user. The HMI system 16 includes a display 161 and an HMI control unit (HCU) 162. In addition to the display 161, a speaker, a vibrator, or an illumination device (for example, an LED) can be adopted as means for presenting the information to the user.

The display 161 is a device that displays an image. For example, the display 161 is a so-called center display provided in an uppermost portion of a central part (hereinafter, referred to as a central region) of the instrument panel in the vehicle width direction. The display 161 can perform a full-color display, and can be realized by using a liquid crystal display, an organic light emitting diode (OLED) display, or a plasma display. As the display 161, the HMI system 16 may include a head-up display that projects a virtual image on a portion of the front windshield in front of the driver's seat. The display 161 may be a meter display.

Figure 4:
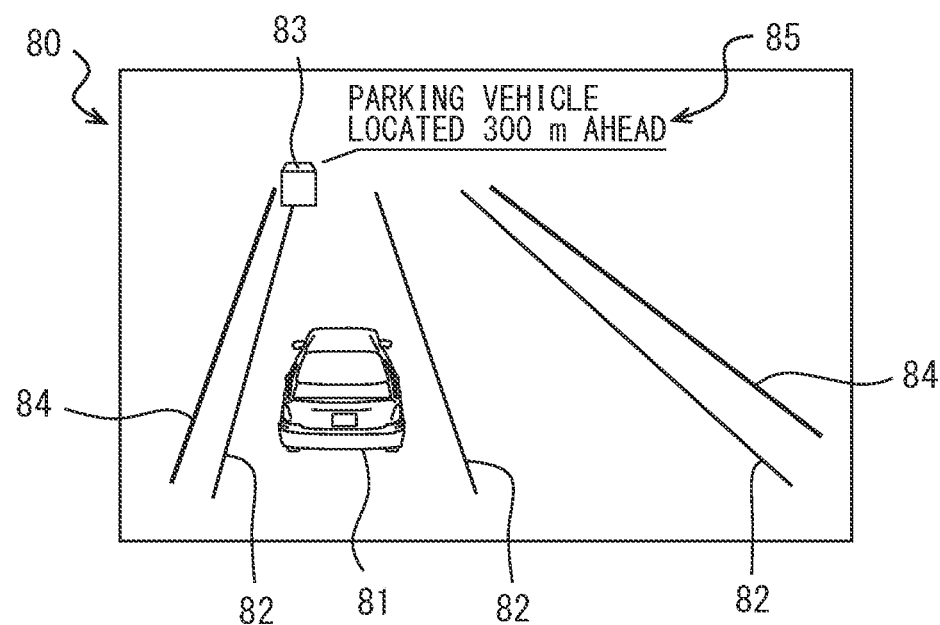
FIG. 4 is a figure illustrating an example of a street parking vehicle notification image.

The HCU 162 is configured to comprehensively control information presentation to the user. The HCU 162 is realized by using a processor such as a CPU and a GPU, a RAM, or a flash memory. The HCU 162 controls a display screen of the display 161, based on information provided from the map cooperation device 50 or a signal from an input device (not illustrated). For example, the HCU 162 displays a street parking vehicle notification image 80 illustrated in FIG. 4 on the display 161, based on a demand from the map cooperation device 50 or the driver-assistance ECU 60.

The street parking vehicle notification image 80 is an image for notifying the user of information related to the street parking vehicle. For example, it is preferable that the street parking vehicle notification image 80 includes information on the distance to the street parking vehicle, the characteristics of the street parking vehicle (vehicle type or body color), and a protrusion degree of the street parking vehicle protruding to the lane. An image 81 in FIG. 4 indicates the subject vehicle, and an image 82 indicates the lane boundary. An image 83 indicates the street parking vehicle, and an image 84 indicates the roadside. It is preferable that the color of the image 83 indicating the street parking vehicle is similar to the color of the actual street parking vehicle. The street parking vehicle notification image 80 may include an image 85 indicating a remaining distance to the point where the street parking vehicle exists. The street parking vehicle notification image 80 indicating the position of the street parking vehicle may be displayed on a head-up display to overlap the real world viewed by the driver's seat occupant.

The map cooperation device 50 is a device that acquires map data including street parking point information from the map server 2, and uploads information on the street parking vehicle detected by the subject vehicle, to the map server 2. Details of functions of the map cooperation device 50 will be separately described later. The map cooperation device 50 is configured to mainly include a computer including a processing unit 51, a RAM 52, a storage 53, a communication interface 54, and a bus connecting these. The processing unit 51 is hardware for calculation processing coupled with the RAM 52. The processing unit 51 has a configuration including at least one arithmetic core such as a central processing unit (CPU). The processing unit 51 accesses the RAM 52 to perform various processes for determining the existence/disappearance of the street parking vehicle. The storage 53 is configured to include a non-volatile storage medium such as flash memory. The storage 53 stores a street parking vehicle report program which is a program executed by the processing unit 51. Executing the street parking vehicle report program in the processing unit 51 corresponds to executing a parking-stopping point management method corresponding to the street parking vehicle report program. The communication interface 54 is a circuit for communicating with other devices via the in-vehicle network Nw. The communication interface 54 may be realized by using an analog circuit element or an IC.

For example, the map cooperation device 50 may be included in a navigation device. The map cooperation device 50 may be included in the driver-assistance ECU 60 or the autonomous driving ECU. The map cooperation device 50 may be included in the V2X in-vehicle device 15. The functional disposition of the map cooperation device 50 can be changed as appropriate. The map cooperation device 50 corresponds to the vehicle device.

The driver-assistance ECU 60 is an ECU that assists a driving operation of the driver's seat occupant, based on the detection results of the surrounding monitoring sensors such as the front camera 11 and the millimeter wave radar 12 or the map information acquired by the map cooperation device 50. For example, the driver-assistance ECU 60 presents driver-assistance information such as a street parking vehicle notification image indicating the position of the street parking vehicle. The driver-assistance ECU 60 controls traveling actuators which are traveling actuators, based on the detection result of the surrounding monitoring sensor and the map information acquired by the map cooperation device 50, thereby performing a part or all of the driving operation, on behalf of the driver's seat occupant. For example, the traveling actuator includes a brake actuator, an electronic throttle, and a steering actuator.

As one of vehicle control functions, the driver-assistance ECU 60 provides a function of automatically changing lanes (hereinafter, referred to as an autonomous lane change function). For example, when the vehicle reaches a scheduled lane change point on a separately generated traveling plan, the driver-assistance ECU 60 cooperates with the HMI system 16 to transmit an enquiry as to whether to change lanes to the driver's seat occupant. When it is determined that the input device is operated by the driver's seat occupant to instruct the lane change, a steering force is generated in a direction toward a target lane in view of a traffic condition of the target lane, and a traveling position of the subject vehicle is changed to the target lane. The scheduled lane change point can be defined as a section having a certain length.

As in the map cooperation device 50, the driver-assistance ECU 60 is configured to mainly include a computer including the processing unit, the RAM, the storage, the communication interface, and the bus connecting all of these. Each element is omitted in the illustration. The storage provided in the driver-assistance ECU 60 stores a driver-assistance program which is a program executed by the processing unit. Executing the driver-assistance program in the processing unit corresponds to executing a method corresponding to the driver-assistance program.

<Details of Map Cooperation Device 50>

Figure 5:
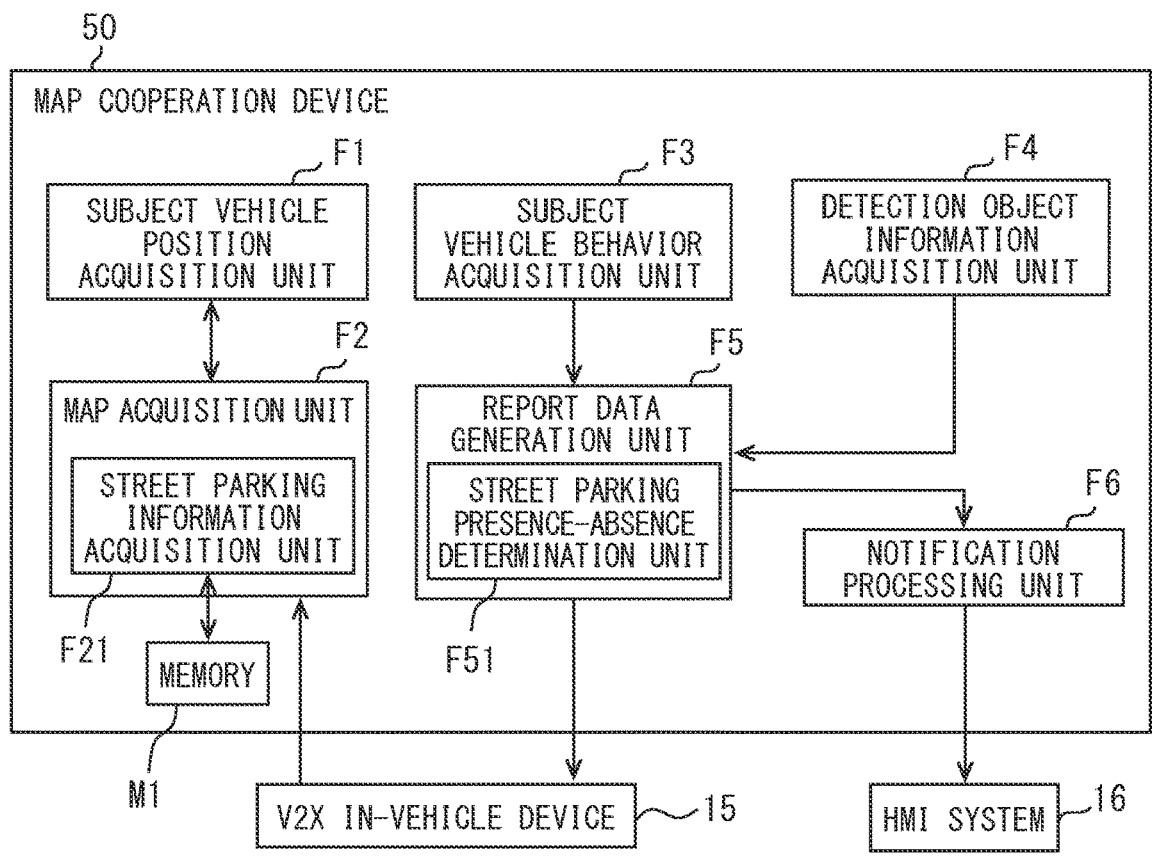
FIG. 5 is a block diagram illustrating a configuration of a map cooperation device.

Here, a function and an operation of the map cooperation device 50 will be described with reference to FIG. 5. The map cooperation device 50 provides functions corresponding to various functional blocks illustrated in FIG. 5 by executing the street parking vehicle report program stored in the storage 53. That is, as the functional blocks, the map cooperation device 50 includes a subject vehicle position acquisition unit F1, a map acquisition unit F2, a subject vehicle behavior acquisition unit F3, a detection object information acquisition unit F4, a report data generation unit F5, and a notification processing unit F6. The map acquisition unit F2 includes a street parking information acquisition unit F21. The report data generation unit F5 includes a street parking presence-absence determination unit F51.

The subject vehicle position acquisition unit F1 acquires position information of the subject vehicle from the locator 14. A traveling lane ID is acquired from the locator 14. Some or all of the functions of the locator 14 may be provided in the subject vehicle position acquisition unit F1.

The map acquisition unit F2 reads map data in a predetermined range determined based on the current position from map storage unit 143. The map acquisition unit F2 acquires street parking point information existing within a predetermined distance ahead of the subject vehicle from the map server 2 via the V2X in-vehicle device 15. The street parking point information is data regarding the point where the street parking vehicle exists as will be separately described later, and includes position coordinates on which the street parking vehicle exists or a type of the street parking vehicle. A configuration for acquiring the street parking point information from the map server 2 corresponds to the street parking information acquisition unit F21.

The street parking information acquisition unit F21 can acquire the street parking point information by requesting the map server 2 for the street parking point information corresponding to a subject vehicle position. This distribution aspect is also called pull-based distribution. The map server 2 may automatically distribute the street parking point information to the vehicle existing in the vicinity of the street parking vehicle. This distribution aspect is also called push-based distribution. That is, the street parking point information may be acquired by either the pull-based distribution or the push-based distribution. Here, as an example, a configuration is adopted as follows. The map server 2 selects a vehicle serving as a distribution target, based on the position information of each vehicle, and perform the push-based distribution on the distribution targets.

The street parking point information acquired by the map acquisition unit F2 is temporarily stored in the memory M1 realized by using the RAM 52. The street parking point information stored in the memory M1 may be deleted when the vehicle passes through the point indicated by the data or when a prescribed time elapses. For convenience, the street parking point information acquired from the map server 2 will also be referred to as on-map street parking point information.

The subject vehicle behavior acquisition unit F3 acquires data indicating the behavior of the subject vehicle from the vehicle state sensor 13. For example, the traveling speed, the yaw rate, lateral acceleration, or vertical acceleration is acquired. The subject vehicle behavior acquisition unit F3 acquires information indicating whether the vehicle travels across the lane boundary, from the front camera 11, and an offset amount in which the traveling position is offset to the right or to the left from a center of the lane. Here, the vertical acceleration corresponds to acceleration in the front-rear direction, and the lateral acceleration corresponds to acceleration in the left-right direction.

The detection object information acquisition unit F4 acquires information on a stopping vehicle detected by the front camera 11 or the millimeter wave radar 12 (hereinafter, referred to as stopping vehicle detection information). The detection object information acquisition unit F4 corresponds to a stopping vehicle information acquisition unit. For example, the stopping vehicle detection information includes an existence position, a type, and a size of the stopping vehicle. For example, the detection position of the stopping vehicle can be expressed in any optional absolute coordinate system such as the World Geodetic System 1984 (WGS 84). The absolute position of the detected stopping vehicle can be calculated by combining current position coordinates of the subject vehicle and relative position information of the stopping vehicle with respect to the subject vehicle detected by the surrounding monitoring sensor. The detection object information acquisition unit F4 can acquire not only recognition results from various surrounding monitoring sensors, but also observation data such as image data captured by the front camera 11. The detection object information acquisition unit F4 can also be called an external information acquisition unit.

It is preferable that the detection position information of the stopping vehicle includes distance information from the roadside to the stopping vehicle and relative position information of the stopping vehicle with respect to the lane boundary. For example, the detection position information may include information indicating whether the stopping vehicle protrudes to the lane, and a protrusion degree of the stopping vehicle protruding into the lane. Alternatively, the detection position information may include a lateral position of an end portion of the stopping vehicle inside the lane. The lateral position information of the end portion of the stopping vehicle inside the lane can be used as information indicating how many lanes are blocked by the street parking vehicle, when the stopping vehicle is the street parking vehicle.

Various data sequentially acquired by the subject vehicle position acquisition unit F1, the subject vehicle behavior acquisition unit F3, and the detection object information acquisition unit F4 are stored in a memory such as the RAM 52, and are used for the reference by the map acquisition unit F2 and the report data generation unit F5. For example, various types of information are classified according to each type and stored in the memory after a time stamp indicating an acquisition time of the data is assigned. The time stamp has a function of linking different types of information at the same time. Since the time stamp is used, for example, the map cooperation device 50 can specify the vehicle behavior synchronized with a vehicle outside video. The time stamp may be an output time or a generation time of the data in an output source, instead of the acquisition time. When the output time or the generation time is adopted as the time stamp, it is preferable that time information of each in-vehicle device is synchronized. For example, various types of information acquired by the map cooperation device 50 can be sorted and stored to show latest data first. The data in which a prescribed time elapses after acquisition can be discarded.

The report data generation unit F5 is configured to generate a data set to be transmitted to the map server 2 and output the data set to the V2X in-vehicle device 15. For example, the report data generation unit F5 generates the vehicle condition report described at the beginning of a predetermined interval, and uploads the vehicle condition report to the map server 2 via the V2X in-vehicle device 15. The report data generation unit F5 generates the street parking point report, and uploads the street parking point report to the map server 2 as an upload processing (to be separately described later). The report data generation unit F5 corresponds to a report processing unit.

The street parking presence-absence determination unit F51 is configured to determine whether the street parking vehicle exists, based on the stopping vehicle detection information acquired by the detection object information acquisition unit F4 and the subject vehicle behavior data acquired by the subject vehicle behavior acquisition unit F3. For example, the street parking presence-absence determination unit F51 recognizes the stopping vehicle as the street parking vehicle, when the stopping vehicle detected by the surrounding monitoring sensor satisfies a street parking vehicle condition. The street parking vehicle condition is a condition for distinguishing temporarily stopping vehicle inside the lane due to waiting for a traffic signal or a traffic congestion from a parking-stopping vehicle on the road shoulder.

For example, as the street parking vehicle condition, (a) a condition that an intersection or a traffic light does not exist within a predetermined first distance from the stopping vehicle on a side in a road traveling direction, and (b) a condition that a distance from the roadside to the stopping vehicle is shorter than a predetermined second distance can be adopted. For example, the first distance can be 10 m. For example, the second distance can be 0.75 m. A positional relationship with the intersection can be specified by referring to the map data. A distance in the lateral direction from the roadside to the stopping vehicle can be determined, based on the detection result of the surrounding monitoring sensor such as the front camera 11. The street parking presence-absence determination unit F51 may specify the distance from the roadside to the stopping vehicle by using the map data. For example, the street parking presence-absence determination unit F51 specifies the position of the stopping vehicle on the map by combining the subject vehicle position determined as a result of a localization process and a relative position of the stopping vehicle with respect to the subject vehicle which is acquired by the detection object information acquisition unit F4. The distance in the lateral direction from the roadside to the stopping vehicle may be specified, based on the position information on the roadside indicated by the map data and the position information of the stopping vehicle.

The street parking vehicle condition may include (c) a condition that the point is a no-parking zone. As the street parking vehicle condition, (d) a condition that the stopping vehicle turns on the hazard flasher, (e) a condition that the stopping vehicle does not turn on the brake lamp, (f) a condition that a door of the stopping vehicle is open, and (g) a condition that the vehicle travels across the lane boundary may be used as a determination criterion for determining whether the vehicle is the street parking vehicle. In order to distinguish the street parking from the traffic congestion for waiting to turn right or left, the street parking vehicle condition may include (h) a condition that a row is not connected to the intersection when multiple stopping vehicles form the row. The no-parking zone can be determined, based on a recognition result of the front camera 11 with respect to a road sign, a road surface marking, or a color of a curb stone as the roadsides. Whether the point is the no-parking zone may be determined by using the map data. A lighting state of the hazard flasher and the brake lamp or an opening/closing state of the door can be determined, based on the recognition result of the front camera 11. The street parking vehicle condition does not need to include all of (a) to (h). Some of (a) to (h) or a viewpoint other than the above-described conditions can be adopted as condition for determining the street parking vehicle.

In one aspect, the street parking presence-absence determination unit F51 corresponds to a configuration for identifying whether the stopping vehicle detected based on an input signal from the surrounding monitoring sensor, which is the vehicle stopped on the road, corresponds to the street parking vehicle, or corresponds to the temporary stopping vehicle. The street parking presence-absence determination unit F51 corresponds to a parking determination unit.

The street parking presence-absence determination unit F51 may determine whether the street parking vehicle exists, based on whether the subject vehicle has performed the avoidance action for avoiding the stopping vehicle, in a status where the surrounding monitoring sensor detects the stopping vehicle in the vicinity of the subject vehicle traveling lane.

Here, for example, the avoidance action is the vehicle behavior for avoiding the street parking vehicle, and for example, the avoidance action indicates a change in the traveling position. Here, changing the traveling position indicates changing a position in the lateral direction of the vehicle on the road. The change in the traveling position includes not only the lane change, but also moving the traveling position inside the same lane to either a right corner or a left corner, or the form of traveling across the lane boundary. In order to clarify a difference from a normal lane change, it is preferable that the avoidance action is changing/steering of the traveling position accompanied by deceleration and acceleration thereafter. For example, changing the traveling position accompanied by a deceleration operation or changing the traveling position accompanied by deceleration to a predetermined speed or lower can be regarded as the avoidance action. Description on the avoidance action indicates a concept of the avoidance action assumed in the present disclosure. Whether the traveling position is changed as the avoidance action can be determined, based on a traveling trajectory, a change pattern of lateral acceleration, and an operation history of the direction indicator, as will be separately described later.

When the street parking presence-absence determination unit F51 determines that the stopping vehicle detected by the surrounding monitoring sensor is the street parking vehicle, stopping vehicle detection information acquired by the detection object information acquisition unit F4 for the street parking vehicle is stored as street parking vehicle detection information. The street parking vehicle detection information has the same data structure as that of the stopping vehicle detection information, and includes the existence position or the vehicle type of the street parking vehicle, for example. The street parking vehicle detection information may include the color of the street parking vehicle, the distance from the roadside to the street parking vehicle, and the relative position information of the street parking vehicle with respect to the lane boundary. Furthermore, the street parking vehicle detection information may include image data of the street parking vehicle imaged by the front camera 11. At least one of the street parking vehicle detection information and the stopping vehicle detection information corresponds to sensing information of the surrounding monitoring sensor.

The notification processing unit F6 is configured to notify the driver's seat occupant of the information regarding the street parking vehicle existing in front of the vehicle in cooperation with the HMI system 16, based on the on-map street parking information. For example, the notification processing unit F6 generates a street parking vehicle notification image illustrated in FIG. 4, based on the on-map street parking information, and causes the display 161 to display street parking vehicle notification image. The driver's seat occupant may be notified of the street parking vehicle by using a voice message. The driver-assistance ECU 60 may include the notification processing unit F6.

<Upload Processing>

Figure 6:
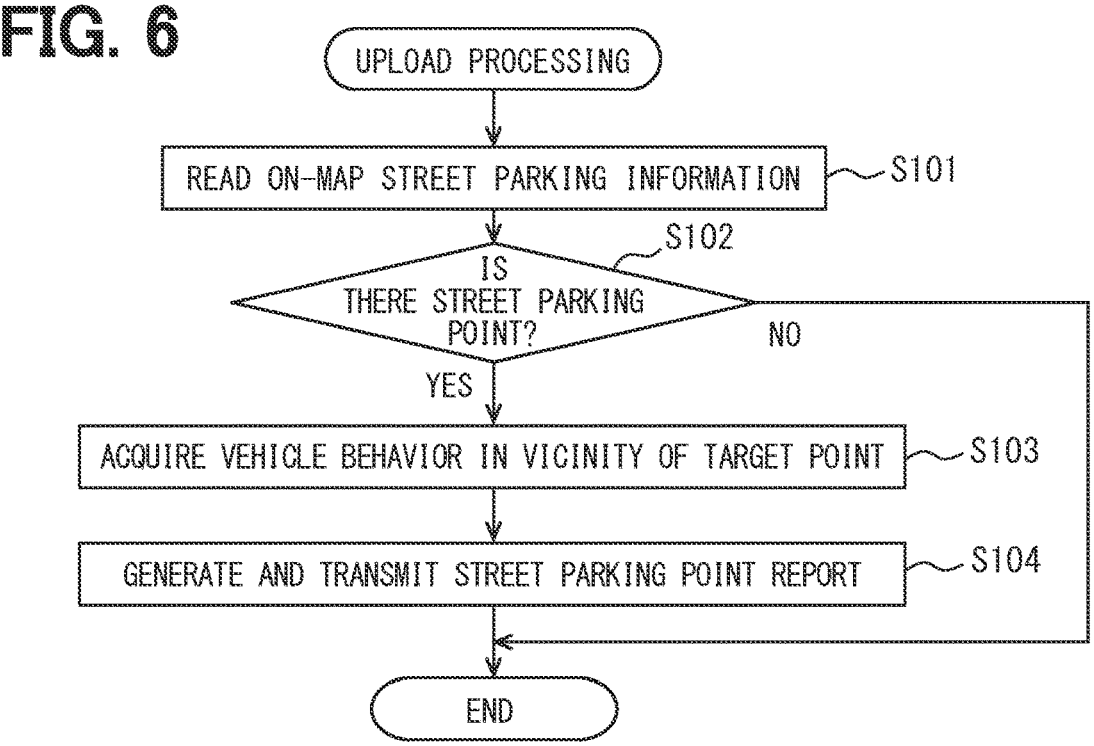
FIG. 6 is a flowchart illustrating an example of an upload processing.

Here, an upload processing performed by the map cooperation device 50 will be described by using a flowchart illustrated in FIG. 6. Processes in the flowchart illustrated in FIG. 6 are performed while a traveling power supply of the vehicle is turned on, for example, at predetermined cycles such as every 100 milliseconds. The traveling power supply is, for example, a power supply that enables the vehicle to travel, and is an ignition power supply in an engine vehicle. In an electric vehicle, a system main relay corresponds to the traveling power supply. The upload processing includes Steps S101 to S104 as an example.

In Step S101, the report data generation unit F5 reads the on-map street parking point information stored in the memory M1, and the process proceeds to Step S102. In Step S102, based on the on-map street parking point information, it is determined whether the street parking vehicle exists within the predetermined distance (hereinafter, referred to as a reference distance) in front of the vehicle. For example, the reference distance is 200 m or 300 m. It is preferable that the reference distance is longer than a limit value of a distance at which the front camera 11 can recognize the object. The reference distance may be changed depending on the traveling speed of the vehicle. For example, the reference distance may be set to be longer as the traveling speed of the vehicle increases. For example, the distance which the vehicle reaches within a predetermined time such as 30 seconds may be calculated depending on the speed of the subject vehicle, and the calculated distance may be adopted as the reference distance.

In Step S102, when the street parking vehicle recognized by the map server 2 does not exist within the reference distance, this flow ends. On the other hand, when the street parking vehicle exists within the reference distance, Step S103 is performed.

In Step S103, the vehicle behavior when the vehicle travels within a predetermined report target distance before and after the on-map street parking point is acquired, and the process proceeds to Step S104. In Step S104, a data set including time-series data of the vehicle behavior acquired in Step S103, transmission source information, and report target point information is generated as a street parking point report. The report target point information is information indicating whether the street parking point report relates to any point. For example, in the report target point information, position coordinates of the on-map street parking point are set.

Figure 7:
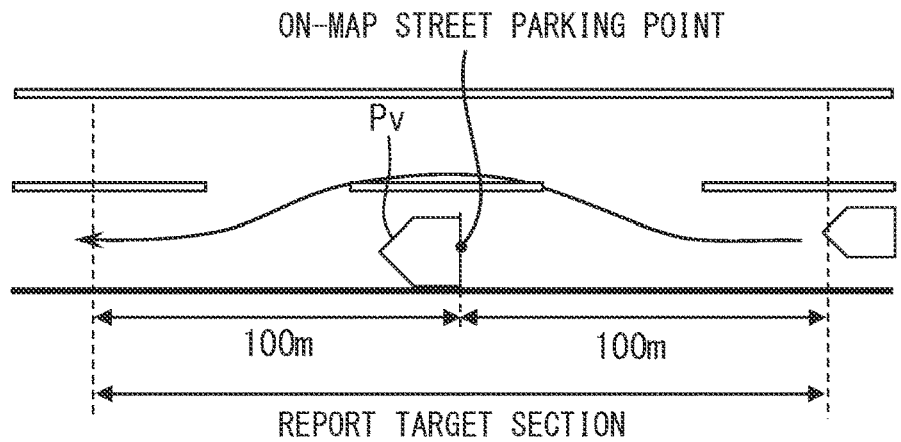
FIG. 7 is a figure describing a range of vehicle behavior data included in a street parking point report.

It is preferable that the report target distance is set to a distance at which the driver's seat occupant or the surrounding monitoring sensor can recognize a status of the on-map street parking point. For example, the report target distance is set to 100 m before and after the on-map street parking point as illustrated in FIG. 7. In this case, for example, the street parking point report is a data set indicating the vehicle behavior within 100 m before and after the on-map street parking point. A section within the report target distance before and after the on-map street parking point will also be referred to as a report target section.

The vehicle behavior data included in the street parking point report is data indicating whether the subject vehicle traveling on the lane on which the street parking vehicle exists performs a movement to avoid the street parking vehicle (that is, the avoidance action). For example, as the data indicating the vehicle behavior, it is possible to adopt vehicle position coordinates, a traveling direction, a traveling speed, vertical acceleration, lateral acceleration, and a yaw rate at each time point when the vehicle passes through the vicinity of the on-map street parking point. For example, the vicinity of the on-map street parking point indicates a range within 20 m of the on-map street parking point. The range within 50 m or 100 m before and after the on-map street parking point may be considered as the vicinity of the on-map street parking point. The range considered as the vicinity of the on-map street parking point may be changed depending on a road type or a legal upper speed limit. The above-described report target distance is determined accordingly depending on which range is considered as the vicinity of the on-map street parking point. The data indicating the vehicle behavior can include a steering angle, a shift position, an operation state of a direction indicator, a lighting state of a hazard flasher, whether the vehicle has crossed the lane boundary, whether a lane change is performed, and an offset amount from the lane center.

It is preferable that the street parking point report includes a traveling lane ID at each time point when the vehicle passes through the vicinity of the on-map street parking point. The reason is shown as below. Since the traveling lane ID is provided, the map server 2 can determine whether the report is transmitted from the vehicle traveling on the lane affected by the street parking vehicle (that is, the first lane). As a matter of course, the map server 2 may determine whether the report is transmitted from the vehicle traveling on the lane affected by the street parking vehicle, based on time-series data of position coordinates included in the street parking point report.

It is preferable that the street parking point report includes not only the vehicle behavior up to the on-map street parking point but also the vehicle behavior information after the vehicle passes through the on-map street parking point. The reason is shown as below. When a certain vehicle changes the lane or performs steering to avoid the street parking vehicle, there is a high possibility that the vehicle may return to the original lane after passing through the street parking vehicle. That is, since the vehicle behavior after the vehicle passes through the on-map street parking point is included in the street parking point report, determination accuracy can be improved by determining whether the movement performed by the vehicle is to avoid the street parking vehicle, and whether the street parking vehicle really exists.

For example, the street parking point report can be data indicating a vehicle condition in every 100 milliseconds while the vehicle travels in the report target section. A sampling interval of the vehicle behavior is not limited to 100 milliseconds, and may be 200 milliseconds. As the sampling interval becomes shorter, a data size increases. Therefore, in order to reduce the amount of communication, it is preferable to set the sampling interval to be long enough to analyze the movement of the vehicle.

When the report target distance is extremely short, for example, only the data after performing the avoidance action is collected in the map server 2, it is unclear whether the avoidance action is performed. On the other hand, when the report target distance is set to be too long, the data indicating the avoidance action is likely to be omitted, but the data size increases. It is preferable that the report target distance is set to include a point where the avoidance action is assumed to be performed in order to avoid the street parking vehicle. For example, it is preferable that the report target distance is set to 25 m or longer.

The length of the report target distance may be changed depending on whether the road is a normal road or a motorway. The motorway is a road on which entrance of a pedestrian or a bicycle is prohibited, and includes a toll road such as an expressway. For example, the report target distance in the normal road may be set to be shorter than the report target distance in the motorway. Specifically, whereas the report target distance for the motorway may be set to 100 m or longer, the report target distance for the normal road may be set to 50 m or shorter, such as 30 m. The reason is shown as below. The motorway has better forward visibility than the normal road, and there is a possibility that the avoidance action may be performed from a point away from a point where the street parking vehicle exists.

The sampling interval may be changed depending on the road type, such as whether the road is the motorway or the normal road. The sampling interval for the motorway may be shorter than the sampling interval for the normal road. The data size can be reduced by lengthening the sampling interval. Alternatively, as the report target distance is longer, a configuration to have a sparse sampling interval is more likely to be adopted. According to this configuration, the data size of the street parking point report can fall within a prescribed range.

The report target distance or the sampling interval may be dynamically determined by an instruction signal from the map server 2. Information types (in other words, items) included in the street parking point report may be dynamically determined by the instruction signal from the map server 2.

The report target distance, the sampling interval, and the items included in the street parking point report may be changed depending on a type or a size of the street parking vehicle and a blocked degree of the lane. For example, in a case where the lane change is essential as the avoidance action, such as when the street parking vehicle blocks more than half of the lane, the street parking point report may be limited to information for determining whether the report vehicle has changed lanes. Whether a lane change has been performed can be determined, based on a traveling trajectory and whether the traveling lane ID has changed.

The street parking point report may include detection result information indicating whether the street parking vehicle is detected by the surrounding monitoring sensor. The street parking vehicle detection result can be each detection result of the front camera 11 and the millimeter wave radar 12. The detection result of the street parking vehicle may be the determination result of the street parking presence-absence determination unit F51. When the street parking vehicle is detected, the street parking point report may include at least one of street parking vehicle detection information and stopping vehicle detection information, as the sensing information of the surrounding monitoring sensor. For example, the street parking point report may include image data captured by the front camera 11 at a predetermined distance (for example, 10 m before) from the on-map street parking point.

Figure 8:
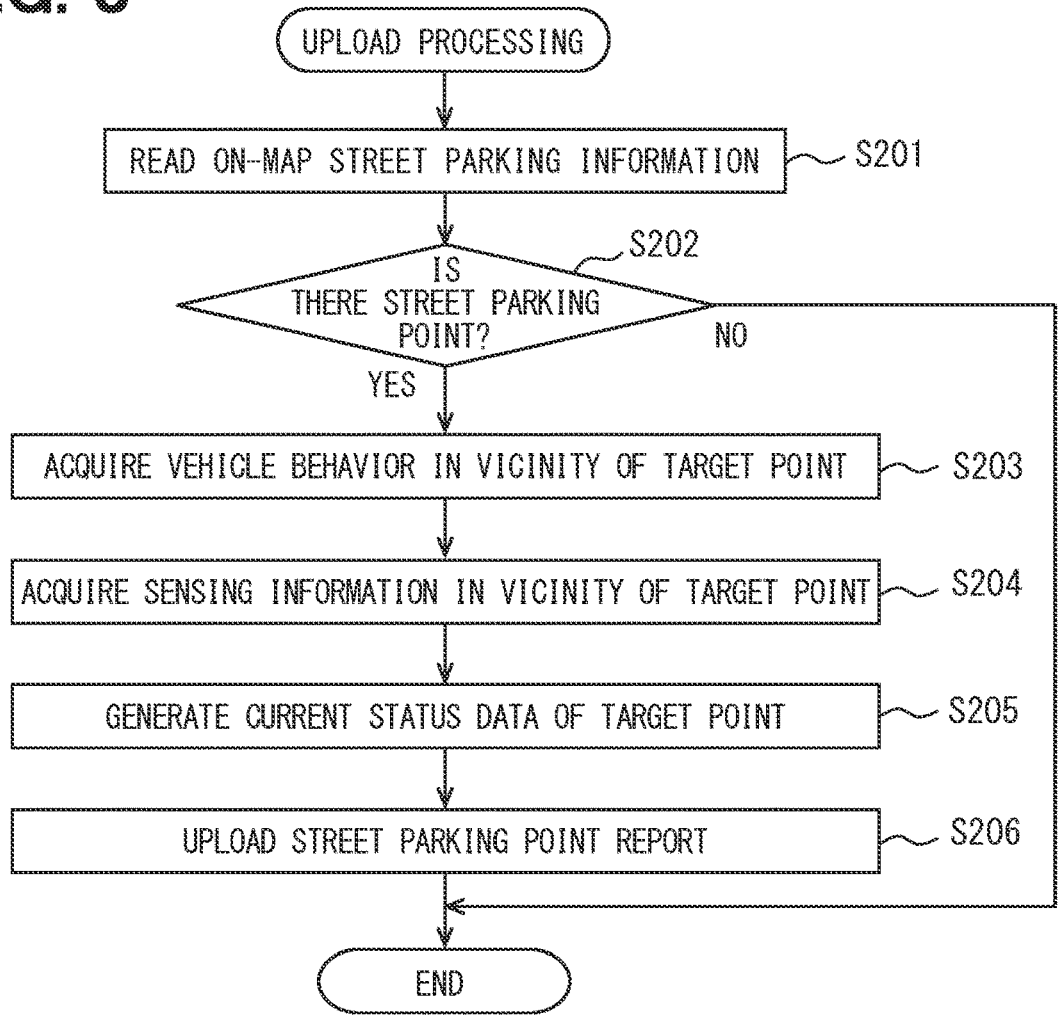
FIG. 8 is a flowchart illustrating an example of an upload processing.

An aspect of the upload processing is not limited to the contents described above. For example, the upload processing may be configured to include Steps S201 to S206 as illustrated in FIG. 8. Steps S201 to S203 illustrated in FIG. 8 are the same as Steps S101 to S101 described above. When Step S203 is completed, Step S204 is performed.

In Step S204, the sensing information is acquired from at least one of the front camera 11 and the millimeter wave radar 12 when the vehicle passes through the vicinity of the on-map street parking point. The sensing information here includes observation data in addition to a recognition result based on the observation data. Here, as an example, the recognition results related to the stopping vehicle which are obtained by the front camera 11 and the millimeter wave radar 12, and the captured image of the front camera 11 are acquired. The stopping vehicle here corresponds to a candidate for the street parking vehicle. For example, as in the vehicle behavior information, a collection period of the sensing information can be a period until the on-map street parking point is located behind the report target distance after the vehicle passes through a point where a remaining distance to the on-map street parking point is equal to or shorter than the report target distance. When the vehicle does not include the surrounding monitoring sensor whose detection range is behind the vehicle, the collection period of the sensing information may be a period until the vehicle passes through the on-map street parking point after the remaining distance to the on-map street parking point is equal to or shorter than the report target distance. When Step S204 is completed, Step S205 is performed.

In Step S205, based on the sensing information collected in Step S204, current status data indicating the current status of the on-map street parking point is generated. For example, the current status data includes the recognition result of the surrounding monitoring sensor in every 250 milliseconds during the collection period of the sensing information. When the stopping vehicle is detected by the front camera 11 within the period, the current status data includes at least one frame of image data for detecting the stopping vehicle. Since the current status data includes at least one image frame in which the on-map street parking point is shifted, analytic performance of the map server 2 can be improved.

The image frames included in the current status data may be all frames captured during the collection period of the sensing information, or may be image frames captured at an interval of 200 milliseconds. As the number of image frames included in the current status data increases, the analytic performance of the map server 2 is improved, whereas the amount of communication also increases. The amount of the image frames included in the current status data may be selected to have the amount of data which is equal to or smaller than a predetermined upper limit value. Instead of all of the image frames, only an image region to which the street parking vehicle is imaged may be extracted and included in the current status data.

When Step S205 is completed, Step S206 is performed. In Step S206, a data set including data indicating the vehicle behavior acquired in Step S203 and the current status data generated in Step S205 is generated as the street parking point report, and is uploaded to the map server 2.

According to the above-described configuration, the map server 2 can collect not only the vehicle behavior, but also the recognition result of the surrounding monitoring sensor or the image data. As a result, it is possible to more accurately verify whether the street parking vehicle still exists or has disappeared. A second lane traveling vehicle which is a vehicle traveling on the second lane does not perform the avoidance action on the street parking vehicle. However, the street parking vehicle can be observed by the front camera 11 or the millimeter wave radar 12 of the vehicle. That is, the street parking vehicle can be observed by the second lane traveling vehicle. The vehicle traveling on the third lane or the fourth lane can similarly observe the street parking vehicle, although the probability or the accuracy is lower. According to the above-described configuration, the map server 2 can collect the sensing information collected by the vehicle traveling along the lateral part of the street parking vehicle. Therefore, it is possible to more accurately verify whether the street parking vehicle exists.

The present publication is not limited to the upload processing that uploads the street parking point report when the vehicle travels in the vicinity of the on-map street parking point in front of the subject vehicle. The map cooperation device 50 may be configured to upload the street parking point report, even when the on-map street parking point does not exist, for example, when the vehicle behavior or the sensing information indicating the existence of the street parking vehicle is obtained.

Figure 9:
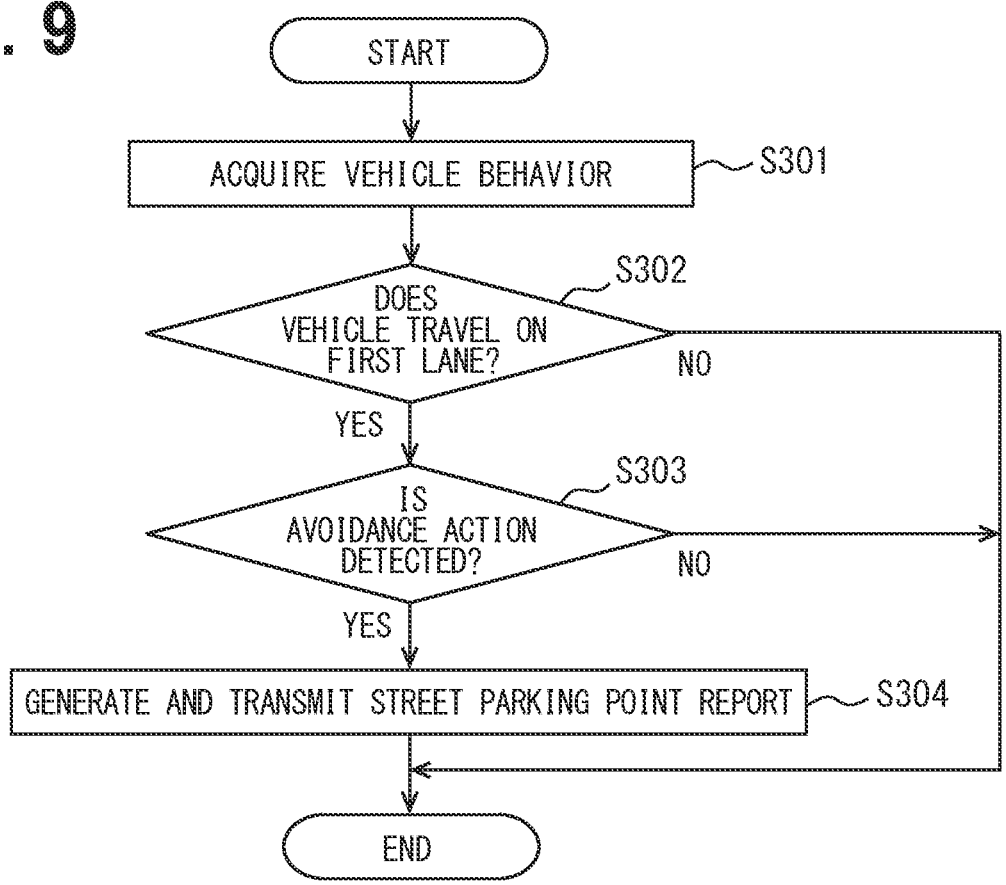
FIG. 9 is a flowchart illustrating an operation example of the map cooperation device.

For example, as illustrated in FIG. 9, the map cooperation device 50 may be configured to perform the processes including Steps S301 to S304. For example, the process flow illustrated in FIG. 9 is performed independently of the upload processing at a predetermined performance interval. For example, the process flow illustrated in FIG. 9 may be performed when the upload processing determines that the on-map street parking point does not exist (Step S102 or Step S202: NO).

In Step S301, the subject vehicle behavior acquisition unit F3 acquires the vehicle behavior data for a latest predetermined time (for example, 10 seconds) which is provided from the vehicle state sensor 13 and the front camera 11, and performs Step S302. In Step S302, it is determined whether a time point at which the vehicle travels on the first lane exists in the above-described time period. When the time point at which the vehicle travels on the first lane does not exist, a negative determination is made in Step S302, and this flow ends. On the other hand, when the time point at the vehicle travels on the first lane exists, an affirmative determination is made in Step S302 and the process proceeds to Step S303.

In Step S303, whether the avoidance action is performed is determined by analyzing the time-series data of the vehicle behavior data acquired in Step S301. For example, it is determined that the avoidance action is performed when the traveling position accompanied by deceleration or stopping is changed, or when sudden steering is performed. Whether the traveling position is changed may be determined, based on the trajectory of the subject vehicle position, or can be determined based on the yaw rate, the steering angle, the time-dependent change in the lateral acceleration, or the lighting state of the direction indicator. Whether the traveling position is changed may be determined, based on whether the vehicle has crossed the lane boundary. Whether the avoidance action is performed may be determined, based on a fact that the yaw rate, the steering angle, or the lateral acceleration is equal to or greater than a predetermined value.

When it is determined that the avoidance action has been performed in Step S302, the process proceeds to Step S303, and the street parking point report is generated and transmitted in the same manner as that in Steps S103 and S206 described above. Since the street parking vehicle basically exists on the road shoulder or on the first lane, the vehicle traveling on the first lane is directly affected by the street parking vehicle. Performing the avoidance action while the vehicle travels on the first lane indicates the existence of the street parking vehicle. The street parking point report transmitted in Step S303 corresponds to data indicating the existence of the street parking vehicle which is not yet recognized by the map server 2.

The report point information of the street parking point report generated in Step S303 should be set as the vehicle position immediately before determining the avoidance action has been performed. Since the vehicle position before the avoidance action has been performed is set, it is possible to reduce a risk of misspecifying the lane on which the street parking vehicle exists. A point located on a side in the traveling direction at a predetermined distance (for example, 20 m) from the vehicle position before the avoidance action is performed may be set as the report point.

Figure 10:
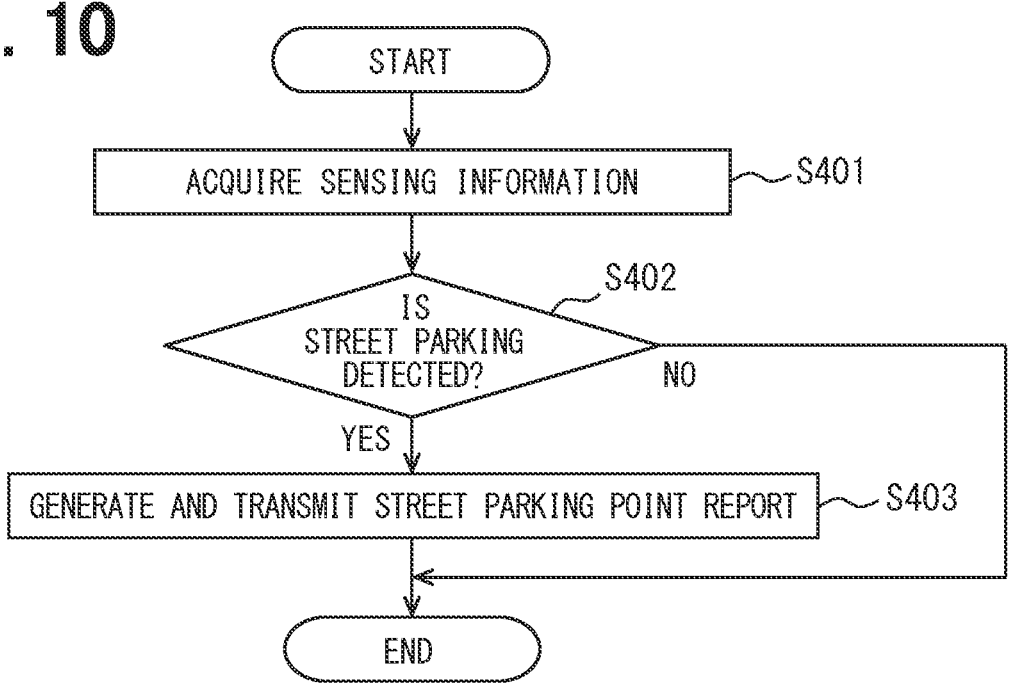
FIG. 10 is a flowchart illustrating an operation example of the map cooperation device.

As illustrated in FIG. 10, the map cooperation device 50 may be configured to perform the processes including Steps S401 to S403. For example, the process flow illustrated in FIG. 10 may be performed at a predetermined performance interval independently to the upload processing, or may be performed when it is determined in the upload processing that the on-map street parking point does not exist (Step S102 or Step S202: NO).

In Step S401, the sensing information for a latest predetermined time (for example, 5 seconds) is acquired, and Step S402 is performed. In Step S402, the street parking presence-absence determination unit F51 determines whether the street parking vehicle exists by analyzing the sensing information acquired in Step S401 and the behavior history of the subject vehicle. When it is determined that the street parking vehicle exists, the street parking point report is prepared and uploaded in the same manner as that in Step S206. For example, the sensing information included in the street parking point report uploaded in Step S403 can be the recognition result and the image frame of each surrounding monitoring sensor when it is determined that the street parking vehicle exists. Similar to the street parking point report transmitted in Step S303, the street parking point report transmitted in Step S403 also corresponds to data indicating the existence of the street parking vehicles which is not yet recognized by the map server 2.

<Configuration of Map Server 2>

Next, a configuration of the map server 2 will be described. The map server 2 is configured to detect appearance or disappearance of the street parking vehicle, based on the street parking point reports transmitted from the multiple vehicles, and to distribute the detection result to the vehicles as the street parking point information. The map server 2 corresponds to a parking-stopping point management device. The description of the vehicle as a communication partner of the map server 2 can be read as the in-vehicle system 1 or the map cooperation device 50.

Figure 11:
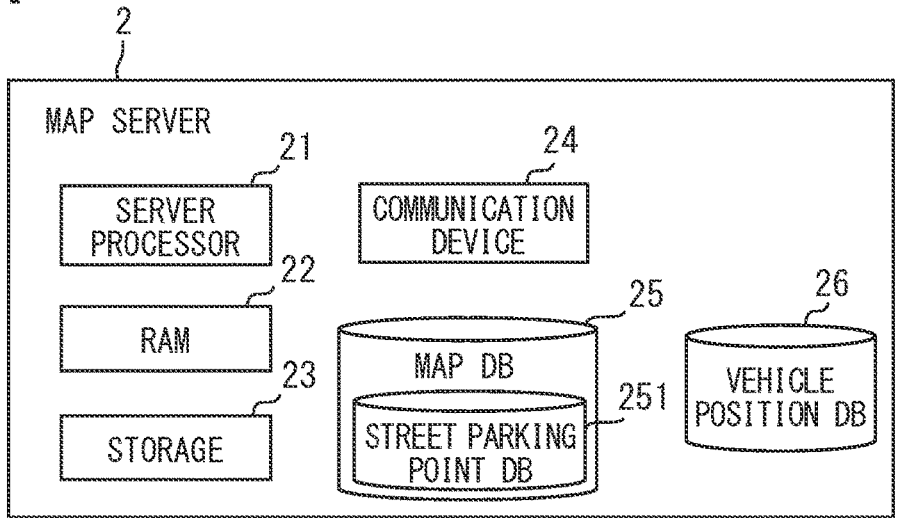
FIG. 11 is a block diagram illustrating a configuration of a map server.

As illustrated in FIG. 11, the map server 2 includes a server processor 21, a RAM 22, a storage 23, a communication device 24, a map DB 25, and a vehicle position DB 26. The DB in the member name indicates a database. The server processor 21 is hardware for calculation processing coupled with the RAM 52. The server processor 21 is configured to include at least one arithmetic core such as a central processing unit (CPU). The server processor 21 accesses the RAM 22 to perform various processes such as determining an existence state of the street parking vehicle. The storage 23 is configured to include a non-volatile storage medium such as a flash memory. The storage 23 stores a street parking information management program which is a program executed by the server processor 21. Executing a street parking information generation program by the server processor 21 corresponds to executing a parking-stopping point management method corresponding to the street parking information management program. The communication device 24 is a device for communicating with other devices such as each in-vehicle system 1 via the wide area communication network 3.

The map DB 25 is a database that stores high accuracy map data, for example. The map DB 25 includes a street parking point DB 251 that stores information related to the point where the street parking vehicle is detected. The map DB 25 and the street parking point DB 251 are databases realized by using a rewritable non-volatile storage medium. The map DB 25 and the street parking point DB 251 adopt a configuration in which the server processor 21 can write, read, and delete data.

The street parking point DB 251 stores data indicating a point where the street parking vehicle is detected (hereinafter, referred to as street parking point data). The street parking point data indicates the position coordinates of each street parking point, the lane on which the street parking vehicle exists, and the type, the size, the protruding amount to the first lane, the appearance time, or the latest existence determination time of the street parking vehicle. For example, data regarding a certain street parking point is periodically updated by the street parking information management unit G3, based on the street parking point report from the vehicle with respect to the point. The data for each street parking point forming the street parking point data may be held in any optional data structure such as a list format. For example, the data for each street parking point may be separately stored for each predetermined section. A section unit may be a mesh of the high accuracy map, may be an administrative section unit, or may be another section unit. For example, the section unit may be a road link unit. The mesh of the map indicates multiple small regions obtained by dividing the map in accordance with a prescribed rule. The mesh can also be called a map tile.

The vehicle position DB 26 is a database realized by using a rewritable non-volatile storage medium. The vehicle position DB 26 adopts a configuration in which the server processor 21 can write, read, and delete data. The vehicle position DB 26 stores data indicating a current status including a position of each vehicle forming the street parking information distribution system 100 (hereinafter, referred to as vehicle position data) in association with the vehicle ID. The vehicle position data indicates the position coordinates, the traveling lane, the traveling direction, and the traveling speed of each vehicle. Data regarding a certain vehicle is updated by a vehicle position management unit G2 (to be described later), each time the vehicle condition report is received from the vehicle. The data for each vehicle which forms the vehicle position data may be held by any optional data structure such as a list format. For example, data for each vehicle may be separately stored for each predetermined section. The section unit may be the mesh of the map, may be the administrative section unit, or may be another section unit (for example, a road link unit).

Figure 12:
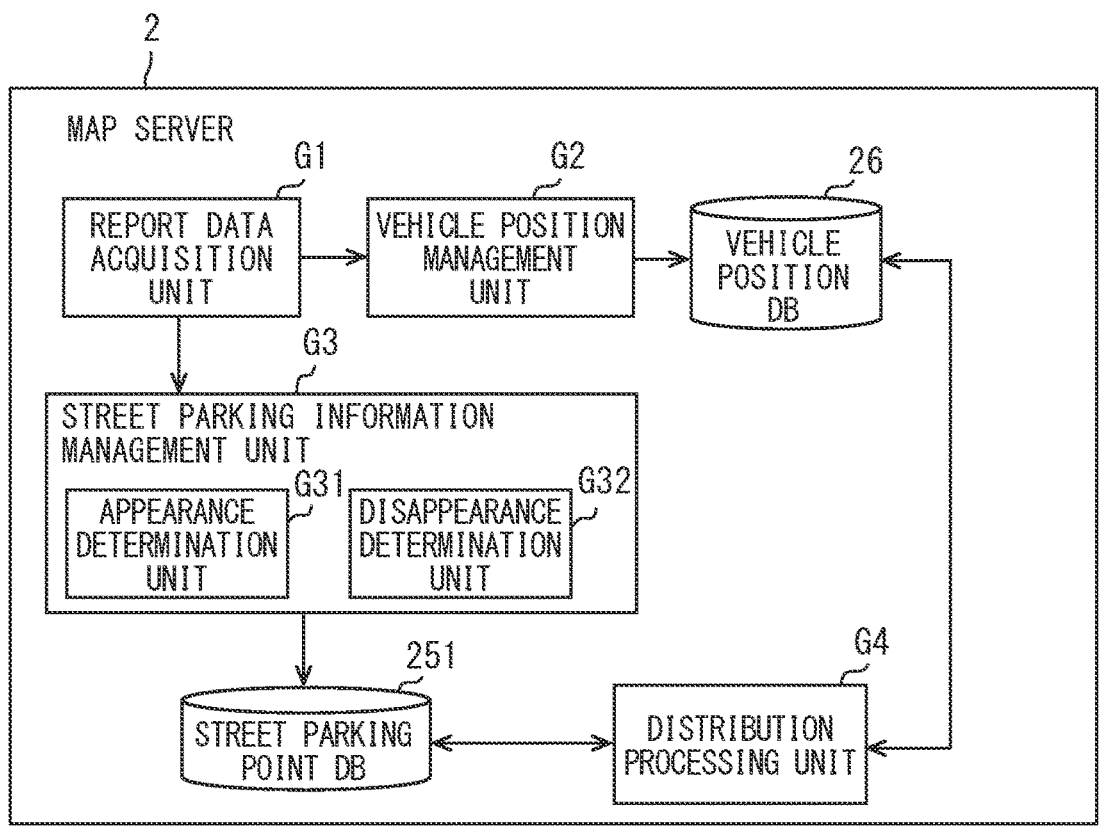
FIG. 12 is a block diagram illustrating a function of the map server which is provided by a server processor.

The map server 2 provides functions corresponding to various functional blocks illustrated in FIG. 12 by the server processor 21 executing the street parking information generation program stored in the storage 23. That is, as the functional blocks, the map server 2 includes a report data acquisition unit G1, a vehicle position management unit G2, a street parking information management unit G3, and a distribution processing unit G4. The street parking information management unit G3 includes an appearance determination unit G31 and a disappearance determination unit G32.

The report data acquisition unit G1 acquires the vehicle condition report and the street parking point report which are uploaded from the in-vehicle system 1 via the communication device 24. The report data acquisition unit G1 provides the vehicle condition report acquired from the communication device 24 to the vehicle position management unit G2. The report data acquisition unit G1 provides the street parking point report acquired from the communication device 24 to the street parking information management unit G3. The report data acquisition unit G1 corresponds to a determination criterion acquisition unit.

The vehicle position management unit G2 updates the position information of each vehicle which is stored in the vehicle position DB 26, based on the vehicle condition report transmitted from each vehicle. That is, each time when the report data acquisition unit G1 receives the vehicle condition report, the vehicle position management unit G2 updates predetermined management items such as the position information on the transmission source of the vehicle condition report, the traveling lane, the traveling direction, and the traveling speed which are stored in the vehicle position DB 26.

The street parking information management unit G3 updates the data for each street parking point stored in the street parking point DB 251, based on the street parking point report transmitted from each vehicle. Both the appearance determination unit G31 and the disappearance determination unit G32 which are included in the street parking information management unit G3 are elements for updating data for each street parking point. The appearance determination unit G31 is configured to detect the appearance of the street parking vehicle. The disappearance determination unit G32 is configured to determine whether the street parking vehicle detected by the appearance determination unit G31 still exists, in other words, whether the detected street parking vehicle has disappeared. The disappearance determination unit G32 corresponds to a configuration that determines an existence state of the street parking vehicle at the parking-stopping point, based on the vehicle behavior data or the sensing information received after the parking-stopping point is registered. Details of the appearance determination unit G31 and the disappearance determination unit G32 will be separately described later. The appearance determination unit G31 corresponds to a parking-stopping point detection unit, and the disappearance determination unit G32 corresponds to an existence state determination unit.

The distribution processing unit G4 is configured to distribute the street parking point information. For example, the distribution processing unit G4 performs a street parking point notification process. The street parking point notification process is a process for distributing a street parking point notification packet which is a communication packet indicating information regarding a point where the street parking vehicle exists (that is, a street parking point), to a vehicle scheduled to pass through the street parking point. The street parking point notification packet indicates the position coordinates of the street parking vehicle and the characteristics (type or color) of the street parking vehicle. A destination of the street parking point notification packet can be the vehicle scheduled to pass through the street parking point within a predetermined time, for example, such as 1 minute, 2 minutes, or 5 minutes. For example, whether the vehicle is scheduled to travel through the street parking point may be determined by acquiring a traveling schedule path of each vehicle. The vehicle traveling on the road/lane which is the same as or connected to the road/lane on which the street parking vehicle exists may be selected as the vehicle scheduled to pass through the street parking point. A time required for reaching the street parking point can be calculated, based on a distance from the current position of the vehicle to the street parking point and the traveling speed of the vehicle.

The distribution processing unit G4 selects the destination of the street parking point notification packet by using a road link or height information. Accordingly, it is possible to reduce a risk of misdistribution to the vehicle traveling on a road annexed on the upper/lower side of the road where the street parking vehicle exists. In other words, it is possible to reduce a risk of misspecifying a distribution target in a road segment having an elevated road or a double-deck structure. The distribution target may be extracted, based on the position information or the traveling speed of each vehicle registered in the vehicle position DB 26.

Unnecessary distribution can be restricted by adding a time condition until the vehicle reaches the street parking point to an extraction condition of the distribution target. Since an existence state of the street parking vehicle can be dynamically changed, for example, even when the street parking point notification packet is distributed to a vehicle whose arrival time at the street parking point has 30 minutes or longer left, there is a high possibility that the street parking vehicle may disappear when the vehicle reaches the street parking point. The time condition until the vehicle reaches the street parking point can be any optional element, and may not be included in the extraction condition of the distribution target.

The distribution target may be determined in units of the lane. For example, the vehicle traveling on the first lane is affected by the street parking vehicle. The vehicle traveling and/or scheduled to travel on the first lane is included in the distribution target. On the other hand, the vehicle traveling on the third lane or the fourth lane separated from the first lane is less likely to be affected by the street parking vehicle. Therefore, the vehicle scheduled to travel on the lane which is not adjacent to the first lane, such as the third lane, may be excluded from the distribution target. The vehicle traveling on the second lane needs to be aware about an interruption from the first lane. Therefore, the vehicle may be included in the distribution target.

For example, the street parking point notification packet can be distributed to multiple vehicles that satisfy conditions of the above-described distribution target by using a multicast method. The street parking point notification packet may be distributed by using a unicast method. When the street parking point notification packet is distributed by using the unicast method, the street parking point notification packet may be preferentially and sequentially transmitted from the vehicle closest to the street parking point or the vehicle having an earliest arrival time in view of the vehicle speed. Even when the position of the street parking vehicle is notified, a vehicle close to the street parking point may not reflect the notification on the control, or the notification may not be made in time. Therefore, the vehicle may be excluded from the distribution target.

Alternatively, the distribution processing unit G4 may be configured to transmit the street parking point notification packet via a roadside device. In the configuration, the roadside device broadcasts the street parking point notification packet received from the distribution processing unit G4 to the vehicle existing inside a communication area of the roadside device by means of short range communication. The street parking point notification packet may be distributed to the vehicle within the predetermined distance from the obstacle registration point by using a geocast method. Various methods can be adopted as the information distribution method.

The distribution processing unit G4 performs a disappearance notification process. The disappearance notification process is a process for distributing a communication packet indicating that the street parking vehicle has disappeared (hereinafter, referred to as a disappearance notification packet). For example, the disappearance notification packet can be distributed by using a multicast method to the vehicle to which the street parking point notification packet is transmitted. The disappearance notification packet is distributed as quickly as possible when the disappearance determination unit G32 determines that the street parking vehicle has disappeared. The disappearance notification packet may be distributed by using the unicast method, as in the street parking point notification packet. When the disappearance notification packet is distributed by using the unicast method, the disappearance notification packet may be preferentially and sequentially transmitted from the vehicle closest to the street parking point or the vehicle having an earliest arrival time in view of the vehicle speed. Even when a fact that the street parking vehicle has disappeared is notified, a vehicle close to the street parking point may not reflect the notification on the control, or the notification may not be made in time. Therefore, the vehicle may be excluded from the distribution target. The distribution target of the disappearance notification packet is limited to the vehicle notified of the existence of the street parking vehicle. Therefore, the distribution target is selected by using a road link or height information.

The distribution processing unit G4 may manage information on the vehicle to which the street parking point notification packet is transmitted, in the street parking point DB 251. Since the vehicle to which the street parking point notification packet is transmitted is managed, the distribution target of the disappearance notification packet can be easily selected. Similarly, the distribution processing unit G4 may manage the information on the vehicle which transmits the disappearance notification packet in the street parking point DB 251. Since whether the street parking point notification packet and/or disappearance notification packet are notified is managed by the map server 2, it is possible to reduce a possibility of repeatedly distributing the same information. Whether the street parking point notification packet and/or the disappearance notification packet are acquired may be managed by using a flag in the vehicle. The street parking point notification packet or the disappearance notification packet corresponds to street parking point information.

<Server-Side Processing>

Figure 13:
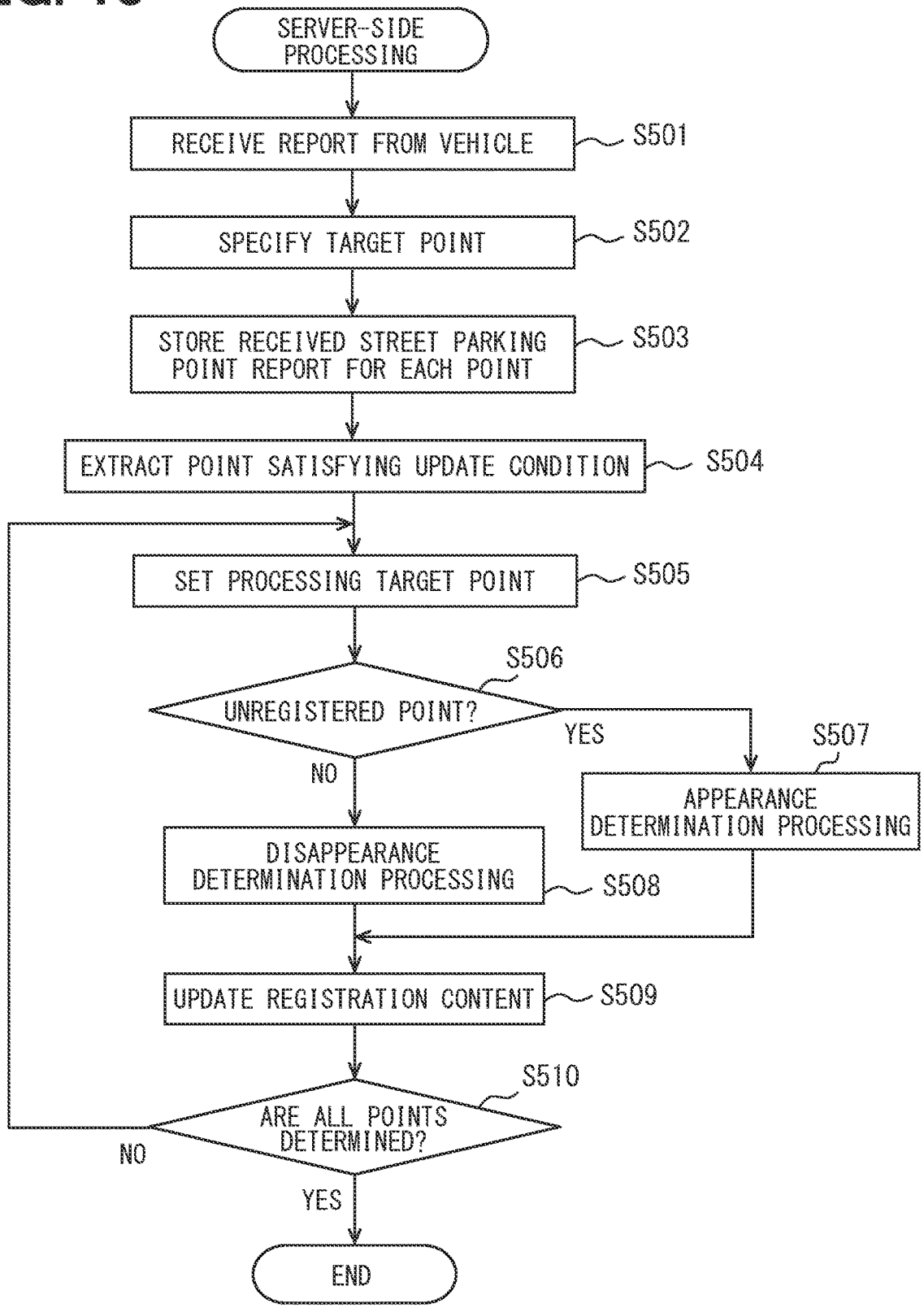
FIG. 13 is a flowchart for describing a process in the map server.

A street parking point registration process performed by the map server 2 will be described with reference to a flowchart illustrated in FIG. 13. The flowchart illustrated in FIG. 13 may be performed, for example, at a predetermined update cycle. It is preferable to set the update cycle to a relatively short time such as 5 minutes or 10 minutes.

In the map server 2, the server processor 21 repeats a process for receiving the street parking point report transmitted from the vehicle at a prescribed cycle (Step S501). Step S501 corresponds to a determination criterion acquisition step. When the server processor 21 receives the street parking point report, the server processor 21 specifies a point serving as a report target of the received street parking point report (Step S502), classifies the received street parking point report for each point, and stores the street parking point report (Step S503). Considering that the position information reported in the street parking point report varies, the street parking point report may be stored for each section having a predetermined length.

The server processor 21 extracts the point satisfying a predetermined update condition (Step S504). For example, the point where the number of reports received within a predetermined time is equal to or greater than a predetermined threshold value and where a predetermined waiting time elapses after the street parking vehicle presence-absence determination processing, is extracted as an update target point. For example, the waiting time can be relatively short, such as 3 minutes or 5 minutes. The update condition may be a point where the number of received reports is equal to or greater than the predetermined threshold value, or may be a point where the predetermined waiting time elapses after the previous update.

A condition for performing appearance determination processing (to be described later) and a condition for performing disappearance determination processing may be different. The number of received reports for performing the appearance determination processing may be less than the number of received reports receptions for performing the disappearance determination processing. For example, whereas the number of received reports for performing the appearance determination processing may be set to 3 times, the number of received reports for performing the disappearance determination processing may be doubled to 6 times. According to this configuration, the appearance of the street parking vehicle can be quickly detected, and determination accuracy can be improved in determining the disappearance of the street parking vehicle.

When the update target points are completely extracted, any one of the update target points is set as a processing target (Step S505), and it is determined whether the point is registered as the street parking point or whether the point is unregistered. When the processing target point is unregistered as the street parking point, the appearance determination unit G31 performs the appearance determination processing (Step S507). Step S507 corresponds to a parking-stopping point detection step. On the other hand, when the processing target point is registered as the street parking point, the disappearance determination unit G32 performs the disappearance determination processing (Step S508). Step S508 corresponds to an existence determination step. Based on the determination result of the appearance determination processing or the disappearance determination processing, registered contents of the street parking point DB 251 are updated (Step S509).

For example, information on the point where appearance of the street parking vehicle is determined is additionally registered in the street parking point DB 251. For the point where disappearance of the street parking vehicle is determined, the point information is deleted from the street parking point DB 251, or a disappearance flag indicating that the street parking vehicle has disappeared is set. The data of the street parking point for which the disappearance flag is set may be deleted at a timing when a predetermined time (for example, one hour) elapses after the flag is set. A change in the registration contents for the point where an existence state is not changed can be omitted. For the point where the existence state is not changed, only time information at which the determination is made may be updated to latest information (that is, a current time).

When the appearance determination processing or the disappearance determination processing is completed for all of the update target points extracted in Step S504, this flow ends. On the other hand, when the unprocessed point remains, the unprocessed point is set as the target point, and the appearance determination processing or disappearance determination processing is performed (Step S510).

<Appearance Determination Processing>

Here, the appearance determination processing performed by the appearance determination unit G31 will be described. The appearance determination unit G31 determine whether the street parking vehicle has appeared at a determination target point by using a lane change, a change pattern of acceleration/deceleration of a vehicle in a traffic flow, a camera image, a street parking vehicle detection result obtained by the in-vehicle system 1, and a change pattern of a traffic volume for each lane. The expression of the point here includes a concept of a section having a predetermined length.

For example, the appearance determination unit G31 determines that the street parking vehicle exists at the point where the number of lane changes from the first lane to the second lane within a prescribed time which is equal to or greater than a predetermined threshold value. Whether the lane is changed may be determined by using a determination result or a report in the vehicle, or may be detected from a traveling trajectory of the vehicle. The appearance determination unit G31 may determine that the street parking vehicle exists at the point where the lanes are consecutively changed for a predetermined number of vehicles (for example, three vehicles) or more.

For example, the position of the street parking vehicle based on the lane change can be determined, based on a traveling trajectory Tr1 whose lane change timing is latest in traveling trajectories of multiple vehicles whose lanes are changed as illustrated in FIG. 14. For example, it is determined that a street parking vehicle Pv exists at a point in the traveling direction by a predetermined distance (for example, 5 m) further from a separation point (hereinafter, referred to as a rearmost separation point) Pd1 located on the closest side in the traveling direction in the first lane. The separation point may be a point where a steering angle exceeds a predetermined threshold value, or may be a point where the offset amount from the lane center is equal to or greater than a predetermined threshold value. Alternatively, the separation point may be a point where the vehicle starts crossing the lane boundary. In order to allow a certain degree of errors, the street parking point here has a predetermined width in the front-rear direction. The front-rear direction here corresponds to an extending direction of the road.

The position of the street parking vehicle may be determined, based on a position of a return point (hereafter, referred to as a frontmost return point) Pe1 closest to the rearmost separation point Pd1. For example, the position of the obstacle may be an intermediate point between the rearmost separation point Pd1 and the frontmost return point Pe1. The return point can be a point where the steering angle of the lane changed vehicle enters the first lane from the second lane is smaller than a predetermined threshold value. The return point may be a point where the offset amount from the lane center of the lane changed vehicle entering the first lane is smaller than a predetermined threshold value. Instead of the steering angle, an angle of a vehicle body with respect to a road extending direction may be adopted. Alternatively, the position of the street parking vehicle may be determined, based on the detection position information included in the street parking point report. When the detection position information of the street parking vehicle for the same street parking point can be acquired from multiple vehicles, an average position thereof may be adopted as the position of the street parking vehicle.

Incidentally, as the avoidance action to avoid the street parking vehicle, a set of changing the traveling position from the first lane to the second lane (hereinafter, referred to as an avoiding position change) and changing the position to return to the lane center of the first lane. (hereinafter, referred to as a returning position change) may be performed in many cases. However, as indicated by a traveling trajectory Tr1, a vehicle having changed the lane to the second lane to avoid the street parking vehicle does not always return to the first lane. For example, when the vehicle is scheduled to turn right after passing along the lateral part of the street parking vehicle, or when a vacant space for returning to the original lane does not exist due to other vehicles, the vehicle does not return to the first lane. In a manual driving vehicle, whether to return to the first lane depends on a mood or a habit of the driver's seat occupant. As illustrated a traveling trajectory Tr2, it is conceivable that the vehicle traveling on the second lane changes the lane to the first lane after passing along the lateral part of the street parking vehicle. Without counting the number of vehicles which perform both the separating position change and the returning position change, the server processor 21 of the present disclosure can more quickly detect the appearance of the street parking vehicle by extracting locations where each type of the position changes is concentrated as the street parking point. As a matter of course, as another aspect, the street parking point may be detected, based on the number of vehicles which perform both the separating position change and the returning position change.

As illustrated in FIG. 14, the point where the street parking vehicle exists appears on the map, as a region (hereinafter, referred to as a trackless region Sp) where the traveling trajectory of the vehicle temporarily does not exist in the vicinity of the right and left roadsides. The appearance determination unit G31 may determine the presence or absence of the trackless region Sp, based on the traveling trajectories of multiple vehicles within a predetermined time. The appearance determination unit G31 may set the point which is the trackless region Sp, as the obstacle point. That is, the appearance determination unit G31 may detect that the street parking vehicle has appeared, based on occurrence of the trackless region Sp.

The appearance determination unit G31 may detect the appearance of the street parking vehicle, based on the image data included in the street parking point report. For example, it may be determined that the street parking vehicle exists, based on confirmation from camera images of multiple vehicles that the street parking vehicle exists on the lane. The appearance determination unit G31 may determine that the street parking vehicle exists, based on the detection result of the street parking vehicle detected by the street parking presence-absence determination unit F51, which is included in the street parking point report. For example, when the number of reports indicating that the street parking vehicle exists within a latest predetermined time is equal to or greater than a predetermined threshold value, it may be determined that the street parking vehicle exists at the point from which the report is transmitted. Alternatively, the appearance determination unit G31 may determine that the street parking vehicle exists, based on the detection result of the stopping vehicle detected by the surrounding monitoring sensor, which is included in the street parking point report. For example, based on the detection results of multiple vehicles, the stopping vehicle staying at the same location for 5 minutes or longer may be determined as the street parking vehicle.

Alternatively, the appearance determination unit G31 may detect a point where a predetermined acceleration/deceleration pattern occurs in the first lane, as the street parking point. Normally, the driver's seat occupant and/or the autonomous driving system recognizing the existence of the street parking vehicle in front of the vehicle decelerates the vehicle once, and accelerates the vehicle again after the traveling position is changed. That is, it is assumed that the acceleration/deceleration pattern, such as accelerating again after decelerating, can be observed in the vicinity of the street parking point. Paradoxically, an area in which an occurrence frequency and/or the number of consecutive occurrences of the acceleration/deceleration pattern is equal to or greater than a predetermined threshold value within a latest predetermined time may be extracted as the street parking point. The change in the traveling position here includes not only the lane change, but also moving the traveling position inside the first lane to the second lane, or traveling across the lane boundary between the first lane and the second lane.

For example, even when a moving object such as a bird, a pedestrian, or a wild animal exists as a momentary street parking vehicle, an acceleration/deceleration pattern in which the vehicle is accelerated again after decelerated once can be observed. In view of the circumstances, it is preferable the street parking point is detected by using the acceleration/deceleration pattern while the street parking points accompanied by the change in the traveling position are used as a population. In other words, it is preferable that the appearance determination unit G31 detects an area where the predetermined acceleration/deceleration pattern can be observed together with the change in the traveling position, as the street parking point.

Hitherto, an aspect is disclosed in which the acceleration in the front-rear direction is used to detect the street parking point. However, when the traveling position is changed to avoid the street parking vehicle, it is assumed that a predetermined pattern also occurs in the acceleration in the lateral direction. For example, an area in which an occurrence frequency and/or the number of consecutive occurrences of the predetermined acceleration/deceleration pattern in the left-right direction within the latest predetermined time is equal to or greater than a predetermined threshold value may be extracted as the street parking point.

When the street parking vehicle exists, the traffic volume in the first lane is expected to be smaller than the traffic volume in the second lane. When the traffic volume in the first lane in the latest predetermined time is decreased by a predetermined value and/or a predetermined ratio, compared to the traffic volume before a predetermined time, and when the traffic volume in the second lane in the same time period is increased, it may be determined that the street parking vehicle exists in the first lane. A location of the street parking vehicle on the first lane detected by using the above-described method may be specified, based on the traveling trajectory of the vehicle traveling on the lane.

The appearance determination unit G31 may detect the street parking point, based on a fact that the autonomous driving device transfers the authority to the driver's seat occupant or a fact that the driver's seat occupant overrides the authority. For example, the appearance of the street parking vehicle may be detected by acquiring and analyzing the image of the front camera 11 when the autonomous driving device transfers the authority to the occupant or when it is detected that the driver's seat occupant overrides the authority, and determining whether the cause is the street parking vehicle.

Hitherto, multiple viewpoints for determining that the street parking vehicle has appeared have been described as examples. However, the appearance determination unit G31 may determine that the street parking vehicle has appeared by using any one of the above-described viewpoints. It may be determined that the street parking vehicle has appeared by complexly combining multiple viewpoints. When determining that the street parking vehicle has appeared by complexly combining multiple viewpoints, the appearance of the street parking vehicle may be determined by applying a weight corresponding to a type of determination criteria. For example, when the weight for the avoidance action is set to 1, the recognition result in the camera alone may be set to 1.2, and the recognition result obtained by sensor fusion may be set to 1.5.

As illustrated in FIG. 15, as a result of analyzing the image provided from the vehicle by the server processor 21, depending on whether the existence of the street parking vehicle can be confirmed, a threshold value regarding the number of vehicles already performed the avoidance action to determine the existence of the street parking vehicle may be changed. Avoidance action here means the behavior of moving the traveling position from the first lane to the second lane, and the number of vehicles already performed the avoidance action is the number of vehicles traveling on the first lane until approaching the street parking point is counted as a population. An operator may confirm the existence of the street parking vehicle based on the image. Depending on whether the street parking vehicle is detected by the surrounding monitoring sensor of the vehicle or the street parking presence-absence determination unit F51, the number of vehicles already performed the avoidance action required for determining that the street parking vehicle exists may be changed. A column for the number of vehicles in FIG. 15 can be replaced with a ratio of the number of vehicles already performed the avoidance action, or the number of consecutively received street parking point reports indicating that the avoidance action is performed. As a result of the image analysis, when it is confirmed that the street parking vehicle is completely located in the road shoulder region outside the lane, it may be determined that the street parking vehicle has appeared even when there is no vehicle behavior data indicating the avoidance action. However, in this case, it is preferable to register the information in the street parking point DB 251 in association with a fact that the protruding amount to the lane is 0.

<Disappearance Determination Processing>

Here, the disappearance determination processing performed by the disappearance determination unit G32 will be described. The disappearance determination unit G32 is configured to periodically determine whether the street parking vehicle still exists at the street parking point detected by the appearance determination unit G31, based on the street parking point report. As a determination criterion for determining that the street parking vehicle has disappeared, it is possible to adopt the presence or absence of the lane change, the traveling trajectory of the vehicle, the change pattern of acceleration/deceleration of the vehicle in a traffic flow, the camera image, the recognition result of the street parking vehicle recognized by the in-vehicle system 1, and the change pattern of the traffic volume in each lane.

For example, the disappearance determination unit G32 can determine the disappearance of the street parking vehicle, based on a decrease in the number of lane changes at the street parking point. For example, when the number of lane changes in the vicinity of the street parking point is smaller than a predetermined threshold value, it may be determined that the street parking vehicle has disappeared. The disappearance determination unit G32 may determine that the street parking vehicle has disappeared, when a statistically significant difference has appeared by comparing a decrease in the number of lane changes in the vicinity of the street parking point as the vehicle behavior with a time point when the street parking vehicle is detected.

The disappearance determination unit G32 may determine that the street parking vehicle has disappeared, based on a fact that the number of vehicles traveling across the boundary line between the first lane and the second lane decreases in the vicinity of the street parking point. The disappearance determination unit G32 may determine that the street parking vehicle has disappeared, based on a fact that an average value of the offset amount from the lane center in the first lane to the second lane is equal to or smaller than a predetermined threshold value. That is, the disappearance determination unit G32 may determine that the street parking vehicle has disappeared, when the change amount of the lateral position of the vehicle passing through the vicinity of the street parking point is equal to or smaller than a predetermined threshold value.

The disappearance determination unit G32 may determine that the street parking vehicle has disappeared, based on the appearance of a vehicle that continues to pass through the street parking point (that is, straightly travels) without performing the avoidance action such as the lane change. For example, the appearance of the vehicle traveling to the street parking point can be determined, based on the traveling trajectory. More specifically, it may be determined that the street parking vehicle has disappeared, when the traveling trajectory of a certain vehicle passes through the street parking point. Alternatively, it may be determined that the street parking vehicle has disappeared, when the number of vehicles exceeds a predetermined threshold value.

When the street parking point report includes the camera image, the disappearance determination unit G32 may analyze the camera image to determine whether the street parking vehicle still exists. The disappearance determination unit G32 may statistically process an analysis result of the image data transmitted from multiple vehicles to determine whether the street parking vehicle still exists. The statistical processing here includes majority voting or averaging.

When the street parking point report includes the determination result of the street parking presence-absence determination unit F51, the disappearance determination unit G32 may statistically process the street parking presence-absence determination results of multiple vehicles to determine whether the street parking vehicle still exists or has disappeared. For example, when the number of received reports indicating that the street parking vehicle does not exist is equal to or greater than a predetermined threshold value, it may be determined that the street parking vehicle has disappeared. When the street parking point report includes the detection result of the stopping vehicle detected by the surrounding monitoring sensor, the disappearance determination unit G32 may statistically process the detection results of the stopping vehicle detected by multiple vehicles to determine whether the street parking vehicle still exists or has disappeared.

The disappearance determination unit G32 may determine that the street parking vehicle has disappeared, when a predetermined acceleration/deceleration pattern is no longer observed as the behavior of the vehicle passing through the vicinity of the street parking point. It may be determined that the street parking vehicle has disappeared, based on a fact that there is no longer a significant difference in the traffic volume between the first lane and the second lane, a fact that the difference is narrowed, or a fact that the traffic volume in the first lane increases. For example, the traffic volume can be the number of vehicles in a traffic flow per unit time in a road segment from the street parking point to 400 m in front of the street parking point.

Multiple viewpoints for determining that the street parking vehicle has disappeared have been described as an example. However, the disappearance determination unit G32 may determine that the street parking vehicle has disappeared by using any one of the above-described viewpoints, or may determine that the street parking vehicle has disappeared by complexly combining and using the multiple viewpoints. When determining that the street parking vehicle has disappeared by complexly combining and using the multiple viewpoints, the disappearance of the street parking vehicle may be determined by applying a weight corresponding to a type of determination criteria.

As illustrated in FIG. 16, as a result of analyzing the image provided from the vehicle by the server processor 21, depending on whether the disappearance of the street parking vehicle can be confirmed, a threshold value regarding the number of vehicles straightly traveling to the target point to determine the disappearance of the street parking vehicle may be changed. The analysis of the image (image confirmation) may be performed by an operator instead of the server processor 21. Depending on whether the street parking vehicle is detected by the surrounding monitoring sensor of the vehicle or the street parking presence-absence determination unit F51, a threshold value for the number of vehicles straightly traveling to the point to determine the disappearance of the street parking vehicle may be changed. The term "straight traveling" here indicates traveling along the first lane so far without changing the traveling position from the first lane to the second lane. The straight traveling here does not necessarily indicate traveling while the steering angle is maintained at 0°. The number of vehicles straightly traveling may be counted as a population of vehicles traveling on the first lane. A column for the number of vehicles in FIG. 16 can be replaced with a ratio of the number of vehicles straightly traveling to the point, or the number of consecutively received street parking point reports indicating that the street parking vehicle does not exist.

Although presence of the street parking vehicle is confirmed as a result of the street parking point by the server processor 21, when many vehicles straightly travel to the point, the street parking information management unit G3 may determine that the street parking vehicle is located in a roadside zone and does not protrude to the first lane. The roadside zone here indicates a region outside the lane. The roadside zone can include a concept of a road shoulder.

<Supplement of Method for Determining Appearance and Disappearance of Street Parking Vehicle>

Static map elements such as a road structure are map elements having insufficient time-dependent changes. Therefore, many traveling trajectories accumulated within a predetermined period such as one week or one month can be used to update the map data regarding the map elements. According to a configuration in which the map data is updated while the reports from many vehicles are used as a population, it is expected that accuracy is improved.

However, the street parking vehicle corresponds to a dynamic map element whose existence state is changed in a relatively short time, compared to the road structure. Therefore, detecting the appearance and the disappearance of the street parking vehicle requires better real-time performance. In order to improve accuracy of information on the existence state and the position of the street parking vehicle, it is preferable that the reports transmitted from many vehicles are used as a population. However, it takes a lot time to collect more reports from the vehicles, and thus, the real-time performance is impaired. That is, in the configuration for detecting the existence/disappearance of the street parking vehicle, in order to ensure the real-time performance, compared to when the static map is generated, it is necessary to determine and distribute the information as accurately as possible, based on a smaller number of vehicle reports.

Under the above-described circumstances, for example, the above-described appearance determination unit G31 detects the street parking point, based on the street parking point report acquired within a predetermined first time period from the current time. The disappearance determination unit G32 determines the disappearance/existence of the street parking vehicle, based on the street parking point report acquired within a predetermined second time period. For example, it is preferable that both the first time period and the second time period are set to a time shorter than 90 minutes, in order to ensure the real-time performance. For example, the first time period is set to 10 minutes, 20 minutes, or 30 minutes. The second time period can also be set to 10 minutes, 20 minutes, or 30 minutes. The first time period and the second time period may have the same length, or may have different lengths. The first time period and the second time period may be 5 minutes or one hour.

In a certain viewpoint, the information indicating that the street parking vehicle has appeared is more useful for traveling control, compared to the information indicating that the street parking vehicle has disappeared. The reason is shown as below. When the information on the lane on which the street parking vehicle exists can be acquired in advance as the map data, the avoidance action can be planned and performed with a sufficient time margin. Consequently, a demand for detecting and distributing the existence of the street parking vehicle earlier is assumed. Under the above-described circumstances, the first time period may be set to be shorter than the second time period in order to quickly start detecting and distributing the existence of the street parking vehicle.

A demand for avoiding erroneous determination and erroneous distribution of a notification of a disappearance of the street parking vehicle even though the street parking vehicle still exists is also assumed. In view of the demand, the second time period may be set to be longer than the first time period. According to the configuration in which the second time period is set to be longer than the first time period, the occurrence of the street parking vehicle can be quickly notified, and a possibility of erroneously determining that the street parking vehicle has disappeared can be reduced.

For example, the appearance determination unit G31 and the disappearance determination unit G32 may be configured to preferentially use information indicated in the report whose acquisition time is latest by, for example, increasing the weight, and to determine an appearance/existence state of the street parking vehicle. For example, when the weight of the information acquired within 10 minutes is set to 1, the statistical processing may be performed by applying a weighting coefficient corresponding to freshness of the information, such as setting the weight of the information acquired within 30 minutes and 10 minutes or longer in the past to 0.5, and setting the weight of the information acquired earlier in the past to 0.25. According to this configuration, a latest state can be better reflected on the determination result, and the real-time performance can be improved.

The street parking information management unit G3 may apply the weight according to the characteristics of the report source, may perform statistical processing on the reports from multiple vehicles, and may determine the appearance and the disappearance of the street parking vehicle. For example, the weight for the report from the autonomous driving vehicle may be set to be higher than the weight for the report from a manual driving vehicle. It can be expected that the millimeter wave radar 12, the front camera 11, and the LiDAR which have relatively high-performance are mounted on the autonomous driving vehicle. There is a low possibility that the autonomous driving vehicle may unnecessarily change the traveling position. There is a high possibility that the changing the traveling position in the autonomous driving vehicle may be a movement to relatively avoid the street parking vehicle. Therefore, determination accuracy in determining the presence or absence of the street parking vehicle can be improved by preferentially using the report from the autonomous driving vehicle.

The appearance determination unit G31 and the disappearance determination unit G32 may adopt a configuration as follows. A report from an unstable traveling position vehicle which is a vehicle frequently changing the traveling position such as the lane change may be regarded as noise, and may not be used in the determination processing. The unstable traveling position vehicle may be specified by the vehicle position management unit G2, based on sequentially uploaded vehicle condition reports, and may be managed by using a flag. According to this configuration, it is possible to reduce a risk of misdetermining the presence or absence of the street parking vehicle, based on a report from a vehicle driven by a user who frequently changes lanes. Various conditions can be applied to conditions for regarding the vehicle as the unstable traveling position vehicle. For example, a vehicle in which the number of lane changes within a prescribed time is equal to or greater than a predetermined threshold value may be extracted as the unstable traveling position vehicle. It is preferable that the threshold value here is set to 3 times or more in order to exclude the lane changes (two times, separating and returning) for avoiding the street parking vehicle. For example, the unstable traveling position vehicle can be a vehicle changing the lane four times or more within a prescribed time, such as 10 minutes.

As illustrated in FIGS. 15 and 16, a condition for determining that the street parking vehicle has appeared (for example, a threshold value) and a condition for determining that the street parking vehicle has disappeared may be different from each other. For example, the condition for determining that the street parking vehicle has disappeared may be set to be stricter than the condition for determining that the street parking vehicle has appeared. The determination criterion for determining that the street parking vehicle has appeared and the determination criterion for determining that the street parking vehicle has disappeared may be different from each other. The weight for each information type may be different between the time when determining the appearance and the time when determining the disappearance. For example, whereas the weight of the analysis result of the camera image may be set to be higher than the weight of the vehicle behavior data when determining that the street parking vehicle has appeared, the weight of the vehicle behavior data may be set to be higher than the weight of the analysis result of the camera image when determining that the street parking vehicle has disappeared. The reason is shown as below. Whereas the camera image is suitable for verifying the existence of the object, the camera image is less reliable for verifying the absence of the object, for example, in view of a possibility that an image may be captured at another place.

<Vehicle Control Processing>

Figure 17:
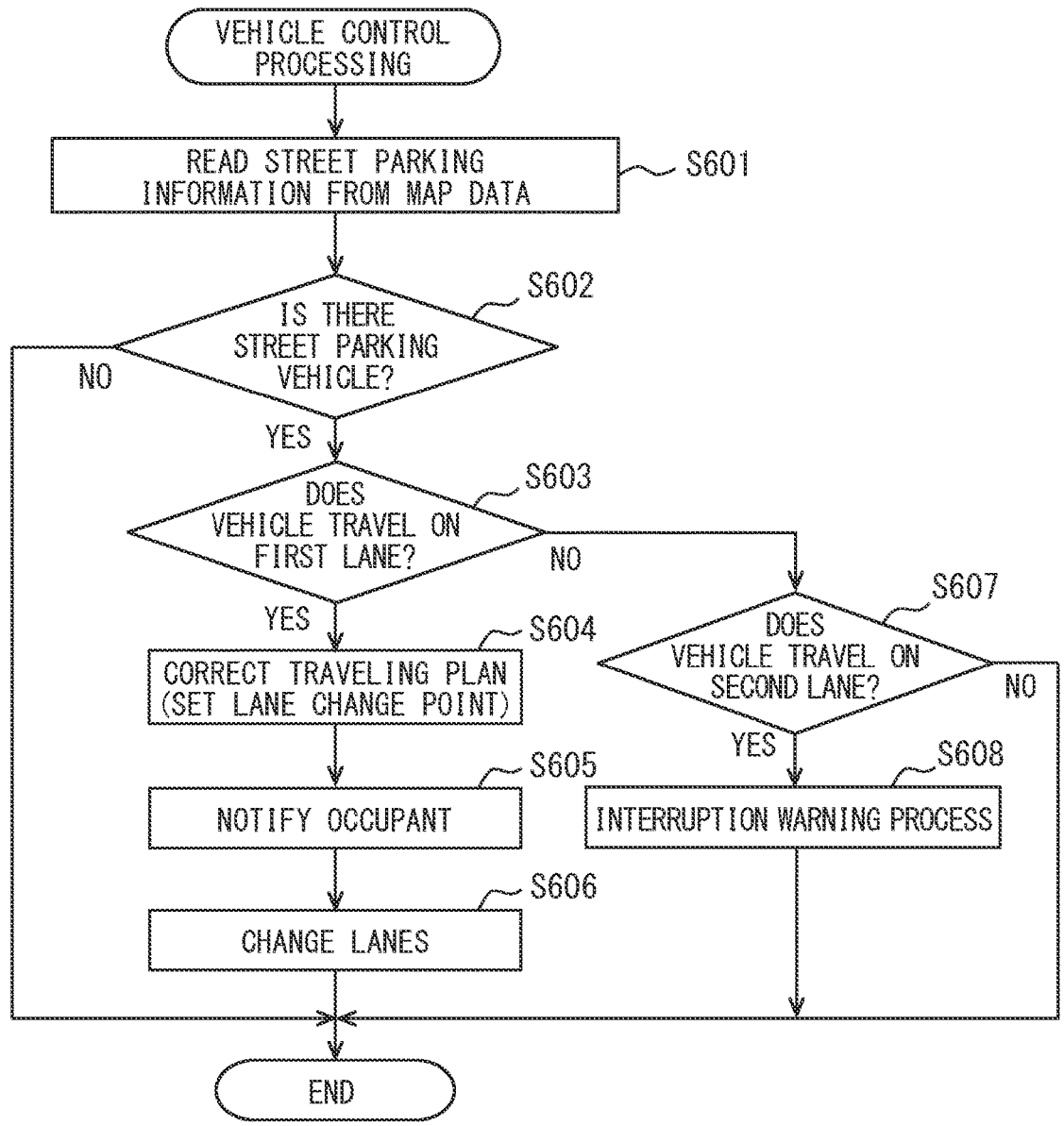
FIG. 17 is a flowchart illustrating an example of vehicle control using street parking point information.

Next, a vehicle control example of using the street parking information will be described with reference to FIG. 17. For example, a process in FIG. 17 may be performed independently of the above-described upload processing. For example, vehicle control processing illustrated in FIG. 17 may be performed at a predetermined cycle, when an autonomous lane change function of the driver-assistance ECU 60 is activated based on a user operation. A state where the autonomous lane change function is activated includes a state during autonomous driving in which the vehicle autonomously travels in accordance with a predetermined traveling plan. As an example, the vehicle control processing illustrated in FIG. 17 includes Steps S601 to S608. Steps S601 to S608 are performed in cooperation with the driver-assistance ECU 60 and the map cooperation device 50.

First, in Step S601, the map cooperation device 50 reads the on-map street parking information stored in the memory M1, provides the on-map street parking information to the driver-assistance ECU 60, and the process proceeds to Step S602. In Step S602, the driver-assistance ECU 60 determines whether the street parking vehicle exists within a predetermined forward distance on the traveling lane of the subject vehicle, based on the on-map street parking information. When the street parking vehicle does not exist, the determination in Step S602 is negative, and this flow ends. In this case, the traveling control based on the separately prepared traveling plan is continued. On the other hand, when the street parking vehicle exists, the determination in Step S602 is affirmative, and Step S603 is performed.

In Step S603, based on an output signal of the front camera 11, it is determined whether the subject vehicle travels on the first lane. When the subject vehicle travels on the first lane, the determination in Step S603 is affirmative, and Step S604 is performed. On the other hand, when the subject vehicle does not travel on the first lane, a result of the determination in Step S603 is negative, and Step S607 is performed.

In Step S604, the traveling plan is corrected to have a traveling trajectory for avoiding the street parking vehicle. For example, the traveling plan including the lane change from the first lane to the second lane is prepared. The corrected traveling plan includes the setting of a separating point from the first lane to the second lane (that is, a lane change point). When Step S604 is completed, Step S605 is performed. In Step S605, in cooperation with the HMI system 16, information related to the corrected traveling plan is presented. For example, the occupant is notified of performing the lane change for avoiding the street parking vehicle. When Step S605 is completed, the process proceeds to Step S606. In Step S606, the lane is changed, and this flow ends.

In Step S607, based on the output signal of the front camera 11, it is determined whether the subject vehicle travels on the second lane. When the subject vehicle travels on the second lane, a result of the determination in Step S607 is affirmative, and Step S608 is performed. On the other hand, when the subject vehicle does not travel on the second lane, the result of the determination in Step S607 is negative, and this flow ends. In Step S608, an interruption warning process is performed. For example, as the interrupt warning process, in cooperation with the HMI system 16, information is presented to call attention to the interruption from the first lane. As the interruption warning process, an inter-vehicle distance from a preceding vehicle may be set to be longer so that the vehicle traveling on the first lane can easily enter the second lane.

Hitherto, a configuration is disclosed in which no particular process is performed when the subject vehicle traveling lane is neither the first lane nor the second lane. However, the present disclosure is not limited thereto. The existence of the street parking vehicle may be notified even when the traveling position of the subject vehicle is the third lane. It is preferable that an aspect of presenting the information regarding the street parking vehicles is weakened as the traveling lane is separated from the first lane. The reason is shown as below. As the traveling lane is separated from the first lane, the subject vehicle is less likely to be affected by the street parking vehicle, and the information is less useful for the user. As the traveling lane is separated from the first lane, the aspect of presenting the information regarding the street parking vehicle is weakened. In this manner, it is possible to reduce a possibility of annoying the user.

<Regarding Operation of System and Example of Advantageous Effect>

According to the system configuration described above, first, the map cooperation device 50 uploads the street parking point report while detecting the street parking vehicle is used as a trigger. The map server 2 detects the point where the street parking vehicle exists (that is, a street parking point), based on the information uploaded from the vehicle. The existence of the street parking vehicle is notified to the vehicle scheduled to travel through the vicinity of the street parking point. The map cooperation device 50 transmits at least one of the vehicle behavior data indicating the behavior of the subject vehicle when the subject vehicle passes through the vicinity of the street parking point notified from the map server 2, and the sensing information, to the map server 2.

Here, when the street parking vehicle still remains and the subject vehicle travels on a lane affected by the street parking vehicle, such as the first lane, the vehicle behavior data transmitted to the map server 2 by the map cooperation device 50 indicates that the avoidance action is performed. Even when the subject vehicle travels on a lane on which the street parking vehicle does not exist, the subject vehicle may be decelerated to avoid a collision with a vehicle changing lanes to avoid the street parking vehicle. That is, the behavior which is not observed during cruising, such as deceleration and re-acceleration for avoiding the collision with an interruption vehicle, may be observed. On the other hand, when the street parking vehicle has disappeared, the vehicle behavior for avoiding the street parking vehicle or the interruption vehicle is no longer observed. That is, the vehicle behavior data when the vehicle passes through the vicinity of the registration point of the street parking vehicle functions as an index indicating whether the street parking vehicle remains.

When the street parking vehicle remains, information indicating that the stopping vehicle is detected or the sensing information including the image of the street parking vehicle is transmitted to the map server 2. On the other hand, when the street parking vehicle has disappeared, the above-described information is not included in the sensing information. Therefore, the sensing information also functions as an index indicating whether the street parking vehicle remains. That is, the vehicle behavior data or the sensing information when the vehicle passes through the vicinity of the street parking point function as an index indicating whether the street parking vehicle remains.

Therefore, based on at least one of the vehicle behavior data and the sensing information provided from multiple vehicles, the map server 2 can specify whether the street parking vehicle still remains or has disappeared at the street parking point. When the disappearance of the street parking vehicle is detected based on the report from the vehicle passing through the street parking point, the street parking information is distributed to the vehicle to which the vehicle behavior data or the sensing information is distributed. According to the above-described configuration, the existence location and the existence state of the parking-stopping vehicle can be recognized on a real-time basis. The map server 2 may detect that the parking-stopping vehicle is moved, based on a fact that the street parking point report from the vehicle is no longer received.

Figure 18:
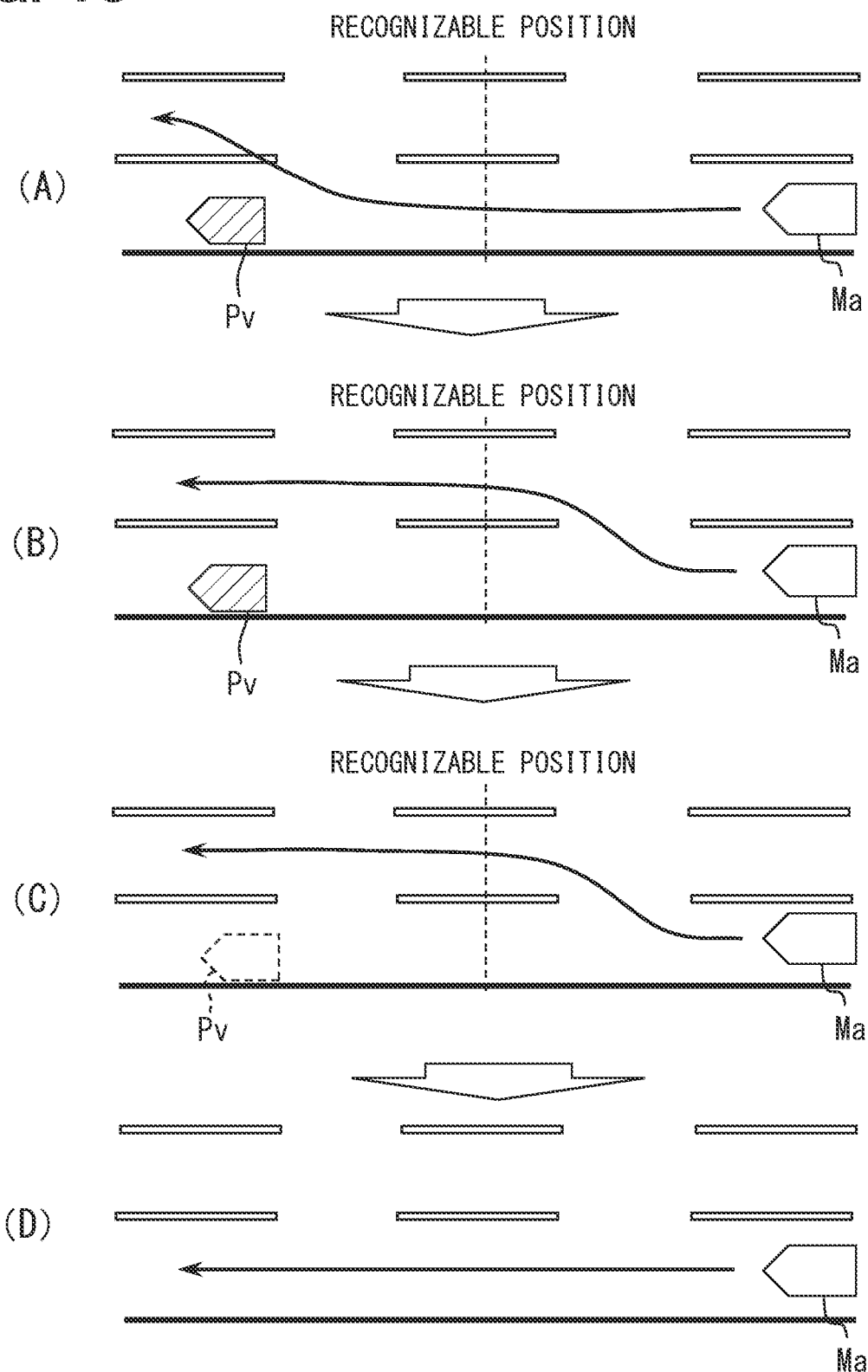
FIG. 18 is a figure describing an advantageous effect of the street parking information distribution system.

FIG. 18 is a view conceptually illustrating a change in the vehicle behavior depending on the presence or absence of the on-map street parking point information. When the on-map street parking point information does not exist, as illustrated in (A) in FIG. 18, after the front camera 11 reaches a position where the street parking vehicle can be recognized, the avoidance action such as the lane change is performed. The map server 2 collects the vehicle behavior. In this manner, the map server 2 detects the existence/appearance of the street parking vehicle, and starts to distribute the detection result as the street parking point information. A recognizable position may vary depending on the performance of the front camera 11 or the millimeter wave radar 12, and the size of the street parking vehicle. For example, the recognizable position is a point of approximately 100 m to 200 m in front of the street parking vehicle in a good environment such as fine weather.

FIG. 18(B) conceptually illustrates the behavior of the vehicle having the acquired street parking point information from the map server 2. The vehicle acquiring the street parking point information from the map server 2 as the map data can change lanes before reaching the recognizable position, as illustrated in FIG. 18(B). That is, it is possible to take measures such as the lane change and a handover with a sufficient time margin in advance.

On the other hand, the street parking vehicle moves and has disappeared with the lapse of time. In the real world, there is a predetermined time difference (that is, a delay) between when the street parking vehicle has disappeared and when the map server 2 detects the disappearance of the street parking vehicle. Therefore, immediately after the street parking vehicle has disappeared in the real world, as illustrated in FIG. 18(C), even though the street parking vehicle does not actually exist, in some cases, the vehicle having changed lanes may pass, based on the on-map street parking information.

However, the map server 2 of the present disclosure is configured to be capable of acquiring the street parking point report from the vehicle passing through the vicinity of the street parking point. Therefore, the disappearance of the street parking vehicle can be quickly recognized, based on the street parking point report. As a result, the disappearance of the street parking vehicle can be quickly distributed to the vehicle, and it is possible to reduce a possibility that the vehicle may unnecessarily change lanes or may perform the handover. FIG. 18(D) illustrates a state after the disappearance of the street parking vehicle is confirmed by the map server 2.

The map server 2 of the present disclosure verifies whether the street parking vehicle truly has disappeared, based on the reports from multiple vehicles and/or from multiple viewpoints. According to this configuration, it is possible to reduce a risk of misdistributing the disappearance of the street parking vehicle even though the street parking vehicle actually exists.

According to the configuration of the present disclosure, when a determination result that the street parking vehicle has disappeared is obtained as an analysis result of the image uploaded from the vehicle, a threshold value for determining that the street parking vehicle has disappeared is reduced with respect to the number of vehicles which does not perform the avoidance action. When a determination result that the street parking vehicle has disappeared is obtained by performing statistical processing on the sensing information in the surrounding monitoring sensors of multiple vehicles, a threshold value for determining that the street parking vehicle has disappeared is reduced with respect to the number of vehicles which does not perform the avoidance action.

For example, when it is confirmed that the street parking vehicle has disappeared, as a result of analyzing the image in the server processor 21, it may be determined that the street parking vehicle has disappeared, based on the vehicle behavior information of one or several vehicles. According to the configuration, it is possible to more quickly confirm the determination that the street parking vehicle has disappeared. As a result, for example, a transition period from FIG. 18(C) and FIG. 18(D) can be shortened. According to the configuration in which the existence state of the street parking vehicle is determined by combining the vehicle behavior and the image analysis, it is possible to achieve both real-time performance and information reliability.

As an example, the map server 2 may confirm the determination that the street parking vehicle has disappeared, as a condition that the vehicle does not perform the avoidance action. According to this configuration, the determination is not based on the image alone. Therefore, it is possible to reduce a risk of misdetermining of disappearance of the street parking vehicle when the street parking vehicle is not unintentionally imaged by the camera.

In the above-described configuration, a parked vehicle on a normal road (that is, the street parking vehicle) is detected. The street parking vehicle on the normal road may exist to block approximately half of the first lane, and may interfere with an autonomous driving function and/or a driver-assistance function. For example, when the street parking vehicle blocks the first lane, there is a possibility of interrupting an autonomous driving service. According to the configuration for distributing the position of the street parking vehicle as described above, it is possible to performs a handover with a sufficient time margin in advance, or to adopt a path where the street parking vehicle does not exist.

Unlike the stationary objects such as the fallen object from the vehicle, the parking vehicle on the normal road is caused to restart a movement by a user of the vehicle. Therefore, the existence state may be relatively dynamically changed, compared to the fallen object. That is, detecting the parking-stopping vehicle and/or determining the disappearance requires more excellent real-time performance, compared to the fallen object.

In an urban area, the street parking vehicle more frequently has appeared than the fallen object. In particular, the street parking vehicle is likely to appear around a station or a facility. A new street parking vehicle has appeared before and after a certain street parking vehicle, and a range affected by the street parking vehicle expands and contracts with the lapse of time. Whereas the street parking vehicle is likely to appear during the daytime when people's movements are active, the street parking vehicle is less likely to appear from late night to early morning. Whereas the street parking vehicle does not appear due to regulations such as laws during the daytime, it is assumed that there may be an area in which the street parking vehicle is likely to appear due to lifted regulations at midnight. That is, in some time periods or some places, the street parking vehicle is likely to appear, and as an obstacle, the characteristics of the street parking vehicle are different from those of the fallen object.

The street parking vehicle is just a vehicle. Therefore, determining whether the vehicle is the street parking vehicle or a temporary stopping vehicle waiting for a traffic signal is difficult by using the image alone. In contrast, according to a configuration for detecting the street parking vehicle by using information indicating a relative positional relationship of the stopping vehicle with respect to a road structure, such as a distance from the roadside or a distance from the traffic light, it is possible to improve accuracy in determining whether the vehicle is the street parking vehicle or a vehicle waiting for a traffic signal.

According to the above-described configuration, based on the distribution information from the map server 2, the in-vehicle system 1 can detect in advance that the street parking vehicle exists in a place which is likely to be a blind spot of the surrounding monitoring sensor, such as a place after a right or left turn at an intersection or a place in the vicinity of a curve exit. As a result, the autonomous driving device or the driver-assistance ECU 60 can prepare a proper path plan. Specifically, as a path plan for turning left at the intersection, an autonomous driving device is assumed to have a path plan for entering the first lane after the left turn is prepared as a basic path plan. In this autonomous driving device, when the first lane after the left turn is blocked by the street parking vehicle, it is necessary to change the path plan inside the intersection. For example, a path for entering the second lane is generated instead of the first lane.

When the information on the street parking vehicle cannot be acquired as the map data, the above-described autonomous driving device suddenly changes the path plan after detecting the street parking vehicle after exiting the intersection, and thus, there is a possibility that a user may feel uncomfortable lateral acceleration. Alternatively, there is a possibility that a driver of the surrounding vehicle may be confused due to a sudden change in the traveling position. In order to solve this problem, the autonomous driving device using the street parking information distribution system of the present disclosure can prepare a path plan in advance in view of the existence of the street parking vehicle after the left turn. Therefore, it is possible to reduce a risk of feeling lateral acceleration equal to or greater than a predetermined value by the user, or reduce the risk of confusing the driver of the surrounding vehicle. Hitherto, an advantageous effect of preparing the path plan by the autonomous driving device has been described. However, the same applies to a case where a person performs a driving operation on the vehicle. Since the driver is notified by the HMI system 16 that the street parking vehicle exists in a blind spot after the right or left turn, the driver can perform a driving operation on the vehicle in view of the notification. That is, according to the system of the present disclosure, it is possible to improve stability or user convenience of the vehicle control by the autonomous driving device or the driver.

According to the above-described configuration, the in-vehicle system 1 can acquire information as to whether the road shoulder is blocked by the street parking vehicle. The autonomous driving device is equipped with a function to evacuate and travel to a place where the vehicle can be safely stopped, such as the road shoulder by performing minimum risk maneuver (MRM), when it is difficult to continue the autonomous driving. On the normal road, there is a possibility that a place where the vehicle can be safely stopped may be temporarily unusable due to the street parking vehicle. The parking point information distributed by the street parking information distribution system 100 can be used for setting a destination during the MRM. For example, when there is a parking vehicle at a closest safe stopping place when the MRM is performed, the in-vehicle system 1 can take measures such as searching for another place or stopping the vehicle with slow deceleration on the current traveling lane.

Hitherto, while the embodiment of the present disclosure has been described, the present disclosure is not limited to the embodiment described above, and various supplementary items or modification examples to be described below are included in the technical scope of the present disclosure, and can be executed by various changes within a scope not departing from the spirit described below. For example, various configurations to be described below can be executed in combination as appropriate within a scope that does not cause technical inconsistency. The members having the same functions as those described in the embodiment described above are denoted by the same reference numerals, and the description of the same members will be omitted. When referring to only a part of the configuration, the configuration of the embodiment described above can be applied to other portions.

<Supplement of Appearance/Disappearance Determination Processing of Street Parking Point>

When the map cooperation device 50 recognizes multiple vehicles stopped in a row on the road, based on the camera image, it may be difficult to determine whether a row of temporary stopping vehicles is a row of vehicles waiting for a traffic signal or a row of street parking vehicles. However, when vehicles with vehicle body orientations (directions) opposite to those of other vehicles are present in the detected row of the vehicles, there is an extremely small possibility that the row of the vehicles may be the row of temporary stopping vehicles. It may be determined that a row of vehicles whose orientation are not aligned is a row of parking vehicles instead of the row of vehicles waiting for a traffic signal. The orientation of the vehicle can be specified by image analysis. In this way, when a row of stopping vehicles is detected, the street parking presence-absence determination unit F51 may determine whether each vehicle corresponds to the street parking vehicle, based on whether the vehicle body orientations are aligned with each other. The street parking presence-absence determination unit F51 may determine that a stopping vehicle having a retracted side mirror is the street parking vehicle.

Figure 19:
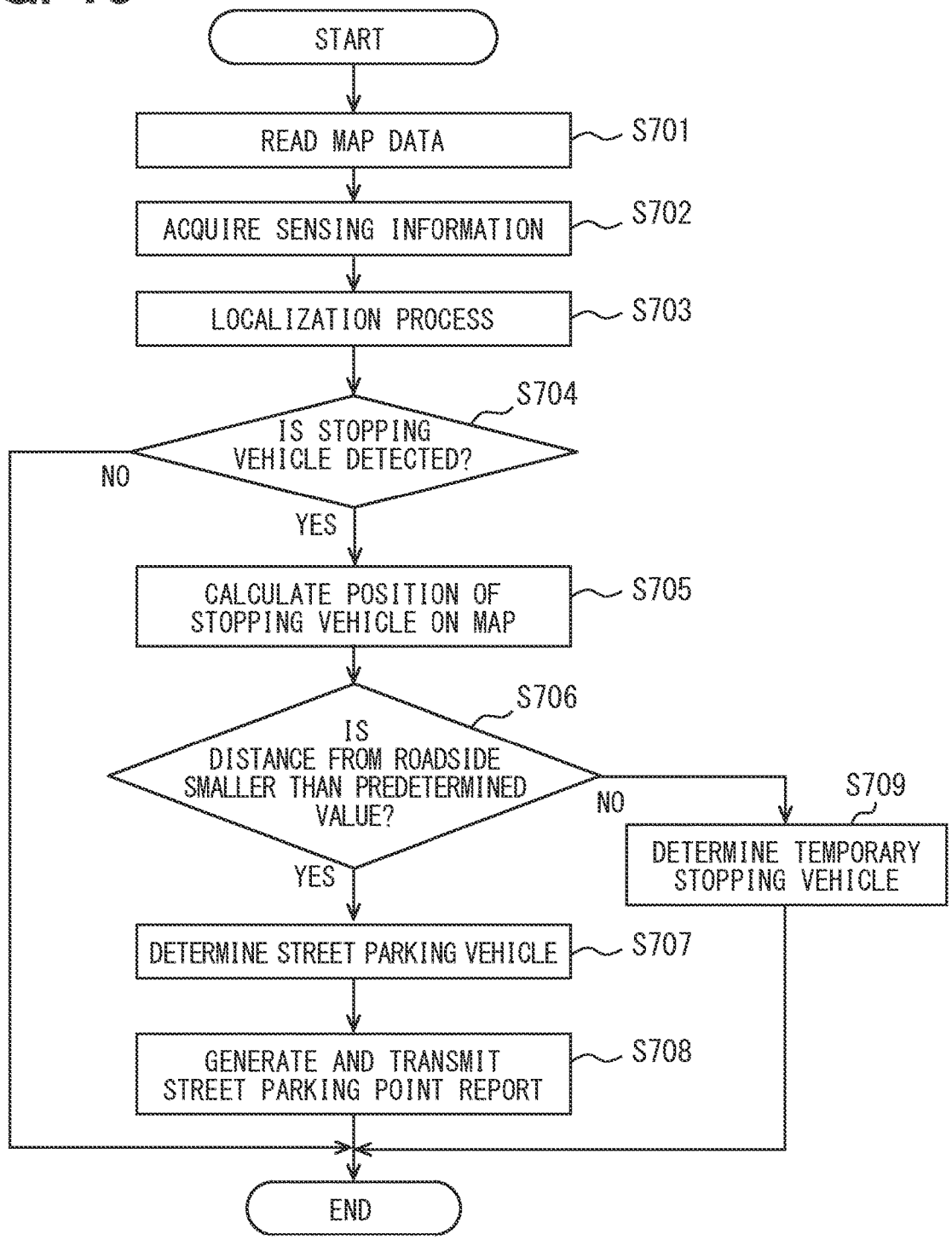
FIG. 19 is a flowchart for describing a process for determining whether a detected stopping vehicle corresponds to a street parking vehicle by using map data.

As described above, the street parking presence-absence determination unit F51 may identify whether the stopping vehicle is the street parking vehicle or the temporary stopping vehicle waiting for a traffic signal, by specifying the position on the map data of the stopping vehicle detected by the surrounding monitoring sensor. More specifically, according to a procedure illustrated in FIG. 19, the street parking presence-absence determination unit F51 may identify whether the detected stopping vehicle is the temporary stopping vehicle waiting for the traffic signal or the street parking vehicle. A flowchart illustrated in FIG. 19 includes Steps S701 to S709 as an example. The number of steps included in the flowchart or a processing order can be changed as appropriate. The process flow can be performed in parallel with, in combination with, or in place of various processes described above.

First, in Step S701, the map acquisition unit F2 acquires map data in a predetermined range determined based on the current position from the map storage unit 143 disposed inside or outside the vehicle, and the process proceeds to Step S702. The map data read here may include at least information indicating the position of the roadside.

In Step S702, the detection object information acquisition unit F4 acquires the sensing information from the surrounding monitoring sensor, and the process proceeds to Step S703. In Step S703, the subject vehicle position acquisition unit F1 performs a localization process, based on information on a landmark included in the sensing information and map data, and the process proceeds to Step S704. Step S704 may be a process for acquiring a positioning result of the GNSS receiver.

In Step S704, the street parking presence-absence determination unit F51 determines whether the stopping vehicle is detected, based on the sensing information acquired in Step S702. When the stopping vehicle is not detected, a result of the determination in Step S704 is negative, and this flow ends. On the other hand, when the stopping vehicle is detected, the process proceeds to Step S705. In Step S705, the position of the stopping vehicle on the map is specified, based on a relative position of the detected stopping vehicle with respect to the subject vehicle and the position information of the subject vehicle specified in Step S703, and the process proceeds to Step S706. According to the process, a distance from the roadside to the stopping vehicle can be calculated by using the map data.

In Step S706, based on a calculation result in Step S705, it is determined whether the distance from the roadside to the stopping vehicle is smaller than a predetermined parking determination threshold value. Here, the parking determination threshold value is a parameter for determining whether the detected stopping vehicle is the street parking vehicle or the temporary stopping vehicle waiting for the traffic signal, and corresponds to the above-described second distance. For example, the parking determination threshold value can be set to 0.75 m or 1 m.

When the distance from the roadside to the stopping vehicle is smaller than the parking determination threshold value, it is determined in Step S707 that the stopping vehicle is the street parking vehicle, and the process proceeds to Step S708. In Step S708, the street parking point report including the information on the street parking vehicle is generated and transmitted to the map server 2, and this flow ends.

On the other hand, when the distance from the roadside to the stopping vehicle is equal to or greater than the parking determination threshold value, it is determined in Step S709 that the stopping vehicle is the temporary stopping vehicle waiting for the traffic signal instead of the street parking vehicle, and this flow ends.

In one aspect, the above-described configuration corresponds to the following configuration. The map data is used to estimate whether the stopping vehicle is separated from the roadside by a predetermined distance or longer distance. Based on the estimation result, whether the detected stopping vehicle corresponds to the street parking vehicle is identified. In general, when only approximately one stopping vehicle exists, or when there is a sufficient space before and after the stopping vehicle, it can be expected that the surrounding monitoring sensor recognizes the roadside. On the other hand, when the stopping vehicle forms a row at a narrow interval, it may be difficult for the surrounding monitoring sensor to detect road information outside the row of the stopping vehicle. The reason is shown as below. The stopping vehicle acts as an obstruction object, and the surrounding monitoring sensor cannot detect the roadside. Therefore, it may be difficult to calculate the distance from the roadside to the stopping vehicle only with the surrounding monitoring sensor.

In order to solve this problem, according to the configuration using the static map data including the position information on the roadside as described above, even in a status where the position of the roadside cannot be detected and/or is less likely to be detected by the surrounding monitoring sensor, it is possible to improve determination accuracy in determining whether the detected stopping vehicle corresponds to the street parking vehicle. Here, the term "outside the row of the stopping vehicle" indicates a side opposite to the subject vehicle when viewed from the row of the stopping vehicle. Road surface information indicates position information of lane marking or the roadside.

Alternatively, the street parking presence-absence determination unit F51 may be configured to determine whether the stopping vehicle detected by the surrounding monitoring sensor corresponds to the street parking vehicle, by using the position information on the intersection as follows. That is, whereas there is a possibility that a vehicle stopped on the road on the entrance side of the intersection may be stopped to wait for the traffic signal, there is a low possibility that a vehicle stopped on the exit side of the intersection (in other words, on the exiting side) may wait for the traffic signal. Therefore, whether the stopping vehicle is the street parking vehicle may be determined, based on whether the stopping position is on the exit side or the entrance side of the intersection. For example, whereas a vehicle stopped on the road shoulder on the entrance side of the intersection may not be determined as the street parking vehicle, a vehicle stopped on road shoulder on the exit side of the intersection may be determined as the street parking vehicle. In other words, the entrance side of the intersection corresponds to a front side of the intersection.

As described above, in some time periods or some places, the street parking vehicle as the obstacle is likely to appear. Based on the detection history in the past, the map server 2 may specify/learn the time period or the place where the street parking vehicle is likely to appear, and based on the specified result, the map server 2 may adjust a condition for detecting the street parking vehicle. For example, at a point and a time period that satisfy the condition that the street parking vehicle is likely to appear, a condition for determining that the street parking vehicle has appeared may be alleviated. For example, a threshold value for the number of vehicles already performed the avoidance action may be reduced. Setting the threshold value to 0 is also considered as reducing the threshold value. According to the above, the appearance of the street parking vehicle can be quickly and additionally registered in the street parking point DB 251.

In a place where the street parking vehicle is likely to appear, there is a high possibility that another vehicle may be soon parked on the road even when the street parking vehicle has disappeared. Even when the vehicle is replaced, there is no change in the existence of the street parking vehicle at the point. Therefore, at a point where the street parking vehicle is likely to appear, the condition for determining that the street parking vehicle has disappeared may be more severely set than the condition at other points. For example, a threshold value for the number of vehicles which does not perform the avoidance action may be set to be higher. According to the configuration, it is possible to reduce a possibility that the map server 2 may more frequently rewrite the registration contents of the street parking point DB 251 due to the replacement of the street parking vehicle.

It is difficult for the map server 2 to simultaneously determine street parking status for all of the normal roads. It is necessary to perform the processes by giving a priority to the points that satisfy the update condition. For example, the vehicle control is greatly affected by the street parking on the exit side of the intersection. Therefore, a configuration may be adopted as follows. The appearance determination processing or the disappearance determination processing may be preferentially performed on the point located within a predetermined distance (for example, 50 m) from the exit of the intersection. A configuration may be adopted as follows. The appearance/disappearance determination may be preferentially performed from a point on the road having a heavy traffic volume or from a point close to a station or a large-scale commercial facility. A relatively low priority may be set for updating the street parking point information in a rural area or on a road where the average traffic volume is equal to or smaller than a predetermined threshold value. According to this configuration, the registration contents are preferentially updated from an area where the street parking point information is highly useful, and the real-time performance can be easily ensured. As a result, the street parking information distribution system 100 can be more useful.

Alternatively, the disappearance determination unit G32 may determine whether a vehicle passing through the street parking point has appeared without changing the traveling position, based on the vehicle condition report, and may determine whether the street parking vehicle has disappeared, based on a fact that a vehicle straightly traveling to the street parking point has appeared. According to this configuration, it is not necessary to transmit the street parking point report separately from the vehicle condition report. As a result, a vehicle-side process is simplified. That is, in the configuration in which the vehicle condition report is transmitted by each vehicle, the contents of the vehicle condition report can be used as the vehicle behavior data. Therefore, the street parking point report is an optional element.

<Supplement Regarding Determination Criterion for Determining Detection/Disappearance of Street Parking Vehicle>

Hitherto, a configuration in which the in-vehicle system 1 detects the street parking vehicle by using the front camera 11 has been disclosed. However, the present disclosure is not limited thereto. The street parking vehicle may be configured to be detected by using a lateral camera that captures a lateral image of the vehicle or a rear camera that captures a rear image of the vehicle. Similarly, the street parking vehicle may be configured to be detected by a lateral millimeter wave radar that transmits probe waves toward the lateral part of the vehicle or a rear lateral millimeter wave radar whose detection range is the rear lateral part corresponding to an obliquely rear part.

For example, the in-vehicle system 1 or the map server 2 may determine the presence or absence of the street parking vehicle by using an image of the lateral camera. When the street parking vehicle blocks the first lane, the vehicle is expected to change the first lane to the second lane. However, the vehicle does not travel on the second lane after changing lanes. Therefore, the front camera 11 is less likely to image the street parking vehicle. As a result, after the lane change, there is a possibility of determining that the street parking vehicle does not exist. According to the configuration in which the image data of the lateral camera located on the part where the street parking vehicle exists is used to determine the presence or absence of the street parking vehicle, it is possible to reduce a risk of having the street parking vehicle out of sight when the vehicle passes along the lateral part of the street parking vehicle. The lateral camera may be provided on a side mirror for viewing the rear lateral part. The lateral camera and the front camera 11 may be complementarily used. For example, the report data generation unit F5 may be configured to upload the street parking point report including an image captured by the front camera 11 while approaching the street parking point and an image captured by the lateral camera after the traveling position is changed.

When the vehicle includes multiple cameras, the cameras used for recognizing the street parking vehicle and the camera images to be uploaded may be switched according to a surrounding environment of the vehicle. For example, when a forward inter-vehicle distance is smaller than a predetermined threshold value and a rearward inter-vehicle distance is equal to or greater than a predetermined threshold value, instead of the image of the front camera 11, the in-vehicle system 1 or the map server 2 may use the image of the rear camera or the lateral camera as a determination criterion for determining the presence or absence of the street parking vehicle. Similarly, when the preceding vehicle is a large vehicle such as a truck or a fire engine and the following vehicle is a small vehicle such as a light vehicle, the rear camera or the lateral camera may be adopted as the camera used for determining the presence or absence of the street parking vehicle. That is, depending on whether a front view is open, the cameras may be separately used to determine the presence or absence of the street parking vehicle. Similarly in the millimeter wave radar, when multiple millimeter wave radars are provided, the multiple millimeter wave radars may be separately used according to the surrounding environment.

As a device for detecting the street parking vehicle, LiDAR or sonar may be used. The devices are included in the surrounding monitoring sensors. The millimeter wave radar, the LiDAR, or the sonar can be called a distance measuring sensor. The map cooperation device 50 may be configured to detect the street parking vehicle by jointly using multiple types of the surrounding monitoring sensors.

For example, the map cooperation device 50 may detect the street parking vehicle by sensor fusion.

Figure 20:
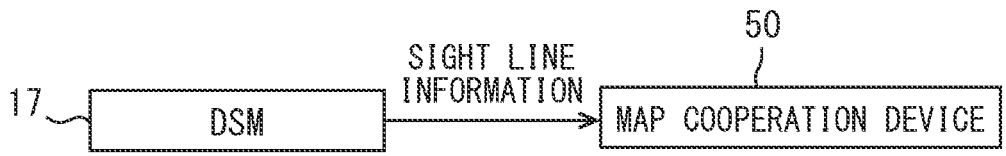
FIG. 20 is a figure describing a configuration in which a sight line of a driver's seat occupant is used as a determination criterion for determining the presence or absence of the street parking vehicle.

The street parking presence-absence determination unit F51 or the street parking information management unit G3 may determine the presence or absence of the street parking vehicle, based on an eye movement of the driver's seat occupant which is detected by a driver status monitor (DSM) 17 as illustrated in FIG. 20. The DSM 17 is a device that images a face portion of the driver's seat occupant by using a near-infrared camera, and performs image recognition processing on the captured image. In this manner, the DSM 17 sequentially detects an orientation of the face, a sight line direction, and an opening degree of eyelids of the driver's seat occupant. For example, in order to image the face of the driver's seat occupant, while adopting a posture when the near-infrared camera faces a headrest portion of the driver's seat, the DSM 17 is disposed on an upper surface of a steering column cover, an upper surface of an instrument panel, or in an inner rearview mirror.

For example, when passing along the lateral part of the street parking vehicle, the street parking presence-absence determination unit F51 or the street parking information management unit G3 may determine that the street parking vehicle exists, based on a fact that the sight line of the driver's seat occupant is directed in a direction in which it is determined that the street parking vehicle exists. The reason is shown as below. When the street parking vehicle exists, the driver's seat occupant can be expected to direct the sight line toward the street parking vehicle to confirm whether a person jumps out of the shadow of the street parking vehicle. It may be determined that the street parking vehicle has disappeared, based on a fact that the occupant of the vehicle traveling on the second lane no longer views an existence direction of the street parking vehicle. That is, an eye movement of the driver's seat occupant when the vehicle passes along the lateral part of the street parking vehicle can also be used as the determination criterion for determining the presence or absence of the street parking vehicle. The in-vehicle system 1 may upload time-series data in a sight line direction of the driver's seat occupant when the vehicle passes along the lateral part of the street parking vehicle, as the street parking point report. The in-vehicle system 1 may upload the determination result indicating whether the sight line of the driver's seat occupant is directed to the on-map street parking point when the vehicle passes along the lateral part of the street parking vehicle. The street parking information management unit G3 may determine whether the street parking vehicle exists, based on sight line information of the occupant.

The map cooperation device 50 may upload the behavior of the surrounding vehicle to the map server 2, as a determination criterion for determining whether the street parking vehicle exists. For example, when it is detected that the preceding vehicle has changed the traveling position to the second lane while traveling on the first lane, information indicating that the preceding vehicle has changed the traveling position to the second lane may be uploaded. Specifically, the front camera 11 may generate data of the offset amount of the vehicle traveling ahead with respect to the lane center, may determine whether the vehicle has changed lanes in front of the on-map street parking point, and may transmit the street parking point report including the determination result. Simultaneous Localization and Mapping (SLAM) can be used as a technique for determining the behavior of the vehicle traveling ahead of the subject vehicle. Not only the preceding vehicle, whether the following vehicle has changed lanes may also be uploaded. Not only the lane change, the behavior of the surrounding vehicle to be uploaded may also be a change in the traveling position within the first lane. When the subject vehicle travels on the second lane, the interruption from the first lane may be uploaded to the map server 2 as an index indicating that the street parking vehicle exists. Data indicating the behavior of the surrounding vehicle corresponds to other vehicle behavior data. Hereinafter, the vehicle behavior data regarding the subject vehicle will also be referred to as subject vehicle behavior data in order to distinguish subject vehicle behavior data from the other vehicle behavior data.

Incidentally, when an equipped vehicle which is a vehicle equipped with the map cooperation device 50 can acquire the street parking point information from the map server 2, it is assumed as follows. The equipped vehicle changes the lane to the second lane in advance, and thereafter, passes along the lateral part of the street parking vehicle. Therefore, in a state where the map server 2 recognizes that the street parking vehicle exists at a certain point, the equipped vehicle is less likely to perform the avoidance action in the vicinity of the street parking point. In a status where the map server 2 recognizes the street parking vehicle and the existence of the street parking vehicle starts to be distributed toward each equipped vehicle, a vehicle which performs the avoidance action immediately before the street parking point set as a notification target can be a non-equipped vehicle which is not equipped with the map cooperation device 50 at most. As a matter of course, even after the information on the street parking vehicle starts to be distributed, the equipped vehicle may also show the behavior indicating the existence of the street parking vehicle, for example, such as deceleration resulting from the interruption of the non-equipped vehicle. However, deceleration with respect to the interruption vehicle is not always performed. After the information indicating that the street parking vehicle exists at a certain point starts to be distributed, usability of the subject vehicle behavior data of the equipped vehicle at the point is relatively lower than usability before the information starts to be distributed.

Based on the above-described circumstances, when passing through the vicinity of the street parking point notified in advance from the map server 2, as the street parking point report, the map cooperation device 50 may transmit the behavior data of the surrounding vehicle and the detection result of the surrounding monitoring sensor in preference to the subject vehicle behavior data. For example, at least one of the behavior data of the surrounding vehicle and the detection result of the surrounding monitoring sensor may be transmitted without transmitting the subject vehicle behavior data. Here, it is preferable that the surrounding vehicle serving as the report target is the other vehicle traveling on the first lane. The reason is shown as below. The first lane is most likely to be affected by the street parking vehicle, and is highly useful as an index indicating whether the street parking vehicle remains. According to the above-described configuration, with regard to detecting the disappearance of the street parking vehicle, it is possible to restrict uploading of less useful information. More useful information can be preferentially collected in the map server 2 when the disappearance of the street parking vehicle is detected.

Even when the equipped vehicle previously acquires the street parking point information, the equipped vehicle may travel on the first lane, based on a driver's instruction. The map cooperation device 50 may upload the subject vehicle behavior data in preference to the behavior data of other vehicles, when the subject vehicle traveling lane is the first lane at a determination point located by the predetermined distance in front of the street parking point notified from the map server 2. Whereas the map cooperation device 50 may transmit a data set including the subject vehicle behavior data as the street parking point report when the subject vehicle traveling lane at the determination point is the first lane, the map cooperation device 50 may transmit a data set which does not include the subject vehicle behavior data when the subject vehicle traveling lane is not the first lane. Specifically, when the subject vehicle traveling lane at the determination point is the first lane, the map cooperation device 50 transmits a data set including the subject vehicle behavior data and the captured image of the front camera 11, as the street parking point report. On the other hand, when the subject vehicle traveling lane is not the first lane while the vehicle passes through the determination point, a data set including the behavior of other vehicles traveling on the first lane and the detection result of the surrounding monitoring sensor may be transmitted. For example, the determination point can be set at a point on the side of the subject vehicle which is separated by a report target distance from the registered street parking point.

When the subject vehicle traveling lane at the determination point is not the first lane, compared to the information amount of the subject vehicle behavior data when the subject vehicle traveling lane at the determination point is the first lane, the map cooperation device 50 is configured to reduce an information amount of the subject vehicle behavior data included in the street parking point report transmitted when passing through the vicinity of the received street parking point. For example, size reduction of the subject vehicle behavior data can be realized by lengthening a sampling interval or reducing the number of items to be transmitted as the subject vehicle behavior data. An aspect of reducing the information amount of the subject vehicle behavior included in the street parking point report includes a case where the street parking point report does not include the subject vehicle behavior data at all. The above-described configuration corresponds to a configuration for changing the content to be transmitted as the street parking point report depending on whether the vehicle travels on the first lane when passing through the determination point.

The map cooperation device 50 may be configured to change contents of the data set to be transmitted to the map server 2, when the street parking vehicle which is not notified from the map server 2 is found, or when the vehicle passes through the street parking point notified from the map server 2. For convenience, a data set as the street parking point report transmitted when the street parking vehicle which is not notified from the map server 2 is found will also be referred to as an unregistered point report. A data set as the street parking point report transmitted to the map server 2 when the vehicle passes through the street parking vehicle point notified from the map server 2 will also be referred to as a registered point report. For example, whereas the unregistered point report is a data set including the subject vehicle behavior data and input data from the surrounding monitoring sensor, the registered point report is a data set including the other vehicle behavior data and input data from the surrounding monitoring sensor. For example, the registered point report can be a data set in which the size of the subject vehicle behavior data is reduced to be equal to or smaller than half of the size of the unregistered point report. According to this configuration, information corresponding to respective characteristics of the appearance determination and the disappearance determination of the street parking vehicle can be efficiently collected in the map server 2.

In the configuration for uploading the behavior of the surrounding vehicle, there is a possibility that the behavior of the same vehicle may be reported to the map server 2 multiple times. In order to prevent counting the same vehicle multiple times by the map server 2, it is preferable to upload the behaviors of the subject vehicle and the surrounding vehicle in association with each vehicle ID. The vehicle ID of the surrounding vehicle may be acquired via inter-vehicle communication, or may be acquired by image recognition of a license plate.

The map cooperation device 50 may be configured to transmit information indicating that the subject vehicle is parked and information indicating that the vehicle starts, to the map server 2. For convenience, a data set indicating that the subject vehicle is parked will be referred to as a subject vehicle parking report, and a data set indicating that the subject vehicle starts will be referred to as a subject vehicle start report. The subject vehicle parking report is a data set including at least position information where the subject vehicle is parked. The subject vehicle start report is a data set including at least position information where the subject vehicle is parked, and corresponds to a data set indicating that the parking vehicle has disappeared from the point. The subject vehicle parking report and the subject vehicle start report can be understood as one type of the street parking point report or the vehicle condition report.

In a configuration in which the map cooperation device 50 does not transmit the subject vehicle parking report, even when the subject vehicle is parked on the road, the map server 2 cannot recognize the parking of the subject vehicle until another vehicle detects the parking of the subject vehicle and the street parking point report related to the subject vehicle is transmitted to the map server 2. In contrast, according to the configuration in which the map cooperation device 50 voluntarily transmits the subject vehicle parking report, the map server 2 can recognize the street parking point derived from the behavior of the subject vehicle on a real-time basis. According to the configuration in which the map cooperation device 50 transmits the subject vehicle start report, the map server 2 can recognize a point where the subject vehicle as the street parking vehicle has disappeared on a real-time basis without waiting for a report from the other vehicle.

For example, a fact that the subject vehicle is parked can be specified, based on a fact that the vehicle speed is zero. The parking of the subject vehicle may be specified, based on a fact that a traveling power supply is set to be turned off. The start of the subject vehicle can be detected, based on a fact that the vehicle speed is equal to or greater than a predetermined threshold value (for example, 10 km/h) after the traveling power supply is turned on. Various methods can be adopted as a method for determining whether the subject vehicle is parked and whether the subject vehicle starts.

Figure 21:
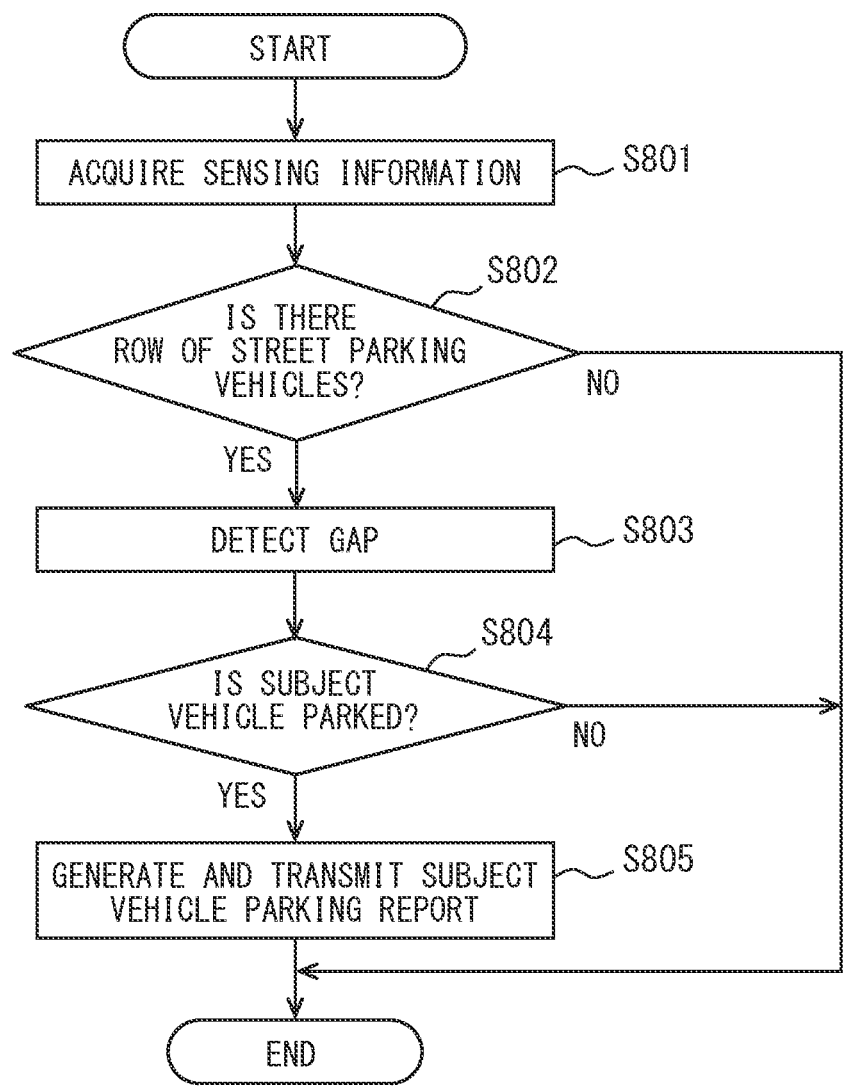
FIG. 21 is a flowchart illustrating an operation example when a subject vehicle is parked in a gap of a parking row.

The street parking presence-absence determination unit F51 may be configured to report to the map server 2 that the subject vehicle is parked in a gap in an existing parking row, for example, according to a procedure illustrated in FIG. 21. A flowchart illustrated in FIG. 21 includes Steps S801 to S805 as an example. As described above, the number of steps included in the flowchart or a processing order can be changed as appropriate. The process flow illustrated in FIG. 21 can be performed in parallel with, in combination with, or in place of various processes described above. The process illustrated in FIG. 21 can be periodically performed while the traveling power supply of the vehicle is turned on.

First, in Step S801, the detection object information acquisition unit F4 acquires the sensing information from the surrounding monitoring sensor, and the process proceeds to Step S802. In Step S802, based on the sensing information acquired in Step S801, it is determined whether multiple street parking vehicles lined up along the roadside, that is, a row of the street parking vehicles, are detected. When the row of the street parking vehicles is detected, the determination in Step S802 is affirmative, and the process proceeds to Step S803. On the other hand, when the row of the street parking vehicles is not detected, a result of the determination in Step S802 is negative, and the process proceeds to Step S803. Whether the stopping vehicle corresponds to the street parking vehicle may be determined by jointly using the street parking point information acquired from the map server 2 by the street parking information acquisition unit F21.

In Step S803, the report data generation unit F5 detects a gap which is a gap between the street parking vehicles, based on the sensing information acquired in Step S801. The report data generation unit F5 may detect the gap, based on the street parking point information acquired by the street parking information acquisition unit F21 instead of and/or as a complement to the sensing information. Detecting the gap corresponds to specifying a region where the gap exists. The gap is a vacant space having at least a length which enables parallel parking of the subject vehicle. For example, a vacant space having a length of 2 m or longer along the roadside corresponds to the gap. When the gap does not exist in Step S803, this flow may end.

In Step S804, the report data generation unit F5 determines whether the subject vehicle is parked in the gap detected in Step S803. For example, whether the subject vehicle is parked in the gap can be determined, based on a fact that the vehicle speed is zero inside the gap. When the subject vehicle is parked in the gap, the report data generation unit F5 generates the subject vehicle parking report, and transmits the subject vehicle parking report to the map server 2 (Step S805). When the subject vehicle is not parked in the gap detected in Step S803, for example, when the subject vehicle passes by the lateral part of the gap, this flow ends. The above-described flow may be performed along with the movement of the vehicle or at every prescribed time.

According to the configuration in which the map cooperation device 50 transmits the subject vehicle parking report as described above, the map server 2 can recognize the point where the vehicle is parked on the road, on a real-time basis. In particular, according to the configuration in which the subject vehicle parking report is transmitted, based on a fact that the subject vehicle is parked in the gap of the row of the street parking vehicles, the map server 2 can perform a process for extending/joining a street parking area (to be described later) or dividing the street parking area, on a real-time basis.

Hitherto, a case where the subject vehicle is parked in the gap of the existing parking row has been described as an example. However, a scene for generating and transmitting the subject vehicle parking report is not limited thereto. The subject vehicle parking report may be transmitted, based on a fact that the subject vehicle is parked on the road, without being limited to the gap of the row of the street parking vehicles. For example, the map cooperation device 50 may generate and transmit the subject vehicle parking report, based on a fact that the subject vehicle is parked along the roadside. Parking along the roadside indicates a parking aspect in which a distance from the roadside to a side surface part of the subject vehicle falls within a parking determination distance, and an angle between the front-rear direction of the subject vehicle and the roadside is smaller than a predetermined value (for example, 30 degrees). The distance from the roadside to the side surface part of the subject vehicle or the orientation of the subject vehicle with respect to the roadside can be specified, based on the detection result of the surrounding monitoring sensor. The subject vehicle start report may always be transmitted not only when the subject vehicle leaves the parking row, but also when the vehicle starts. A configuration may be adopted in which the subject vehicle parking report and the subject vehicle start report are transmitted on a condition that the vehicle is parked on the road.

<Calculation of Detection Reliability by Map Cooperation Device 50>

Figures 22, 23:
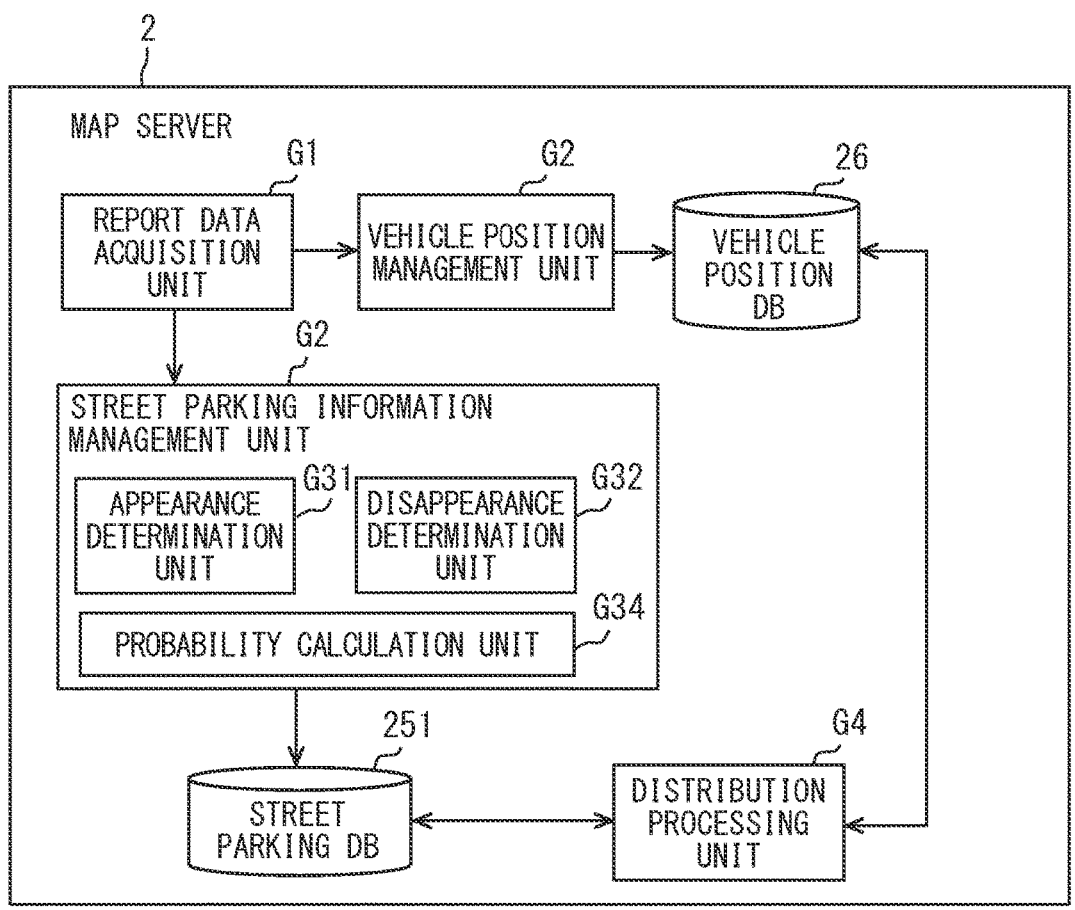
FIG. 22 is a figure illustrating an example of a reference used when a street parking presence-absence determination unit calculates detection reliability.
FIG. 23 is a figure illustrating a modification example of the map server.

The street parking presence-absence determination unit F51 may calculate a possibility that the street parking vehicle may actually exist, as detection reliability, based on a combination of whether the existence is detected by the front camera 11, whether the existence is detected by the millimeter wave radar 12, and whether the avoidance action is performed. For example, as illustrated in FIG. 22, a configuration may be adopted as follows. As viewpoints (sensors or behaviors) indicating the existence of the street parking vehicle increase, the possibility is calculated to have higher detection reliability. An aspect of determining the detection reliability illustrated in FIG. 22 is an example, and can be changed as appropriate.

The vehicle behavior in FIG. 22 indicates the avoidance action of the subject vehicle when the subject vehicle travels on the first lane. When the subject vehicle travels on the second lane, the behavior of the surrounding vehicle traveling on the first lane can be substituted for calculating the detection reliability. For example, the presence or absence of the lane change (in other words, the interruption) from the first lane to the second lane can be adopted as a viewpoint for calculating the detection reliability. When there is the interruption from the first lane to the second lane, it is expected that a flow of the vehicles in the second lane slows down. Therefore, when the subject vehicle travels on the second lane, and when the traveling speed is reduced in front of the on-map street parking point, it may be determined that the surrounding vehicle perform the avoidance action.

The street parking point report may include the above-described detection reliability calculated by the street parking presence-absence determination unit F51. The map server 2 may determine whether the street parking vehicle exists by performing statistical processing on the detection reliability included in the reports from multiple vehicles. The detection reliability may be evaluated by jointly using sight line information of the occupant which is detected by the DSM. For example, when the sight line of the driver's seat occupant is directed in a direction in which the street parking vehicle is determined to exist while the vehicle passes along the lateral part of the street parking vehicle, the detection reliability may be set to be higher.

The above-described detection reliability indicates the reliability of the report indicating that the street parking vehicle exists. Therefore, the above-described detection reliability can also be called existence report reliability. As non-detection reliability, the street parking presence-absence determination unit F51 may calculate a possibility that the street parking vehicle may not exist, based on a combination of whether the street parking vehicle is detected by the front camera 11, whether the street parking vehicle is detected by the millimeter wave radar 12, and whether the avoidance action is performed. The non-detection reliability corresponds to a reverse meaning of the above-described detection reliability. As the detection reliability is higher, the non-detection reliability may be set to be lower. The non-detection reliability indicates the reliability of the report indicating that the street parking vehicle does not exist. Therefore, the above-described non-detection reliability can also be called non-existence report reliability.

<Regarding Actual Existence Probability of Street Parking Vehicle>

The map server 2 may be configured to calculate and distribute a possibility of the existence of the street parking vehicle, as an actual existence probability. The actual existence probability corresponds to reliability of the determination result and notification which indicate the street parking vehicle exists. For example, as illustrated in FIG. 23, the street parking information management unit G3 may include a probability calculation unit G33 that calculates the reliability of the determination result indicating that the street parking vehicle exists, as the actual existence probability.

Figure 24:
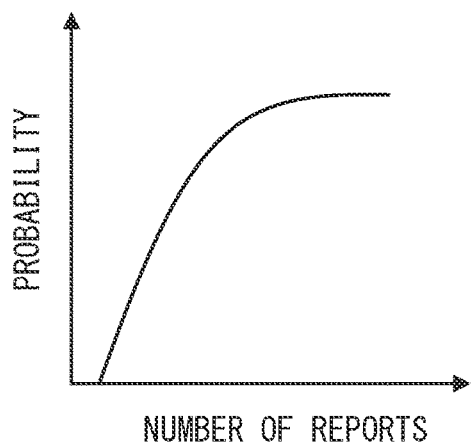
FIG. 24 is a figure conceptually illustrating an example of a calculation rule of the map server to calculate an actual existence probability of the street parking vehicle.

The probability calculation unit G33 calculates the actual existence probability, based on a ratio of the vehicles already performed the avoidance actions with reference to the behavior data of multiple vehicles. For example, as illustrated in FIG. 24, the probability calculation unit G33 sets the actual existence probability to be higher, as the number of vehicles reporting the existence of the street parking vehicle increases. For example, in addition to the vehicles changing the traveling position from the first lane to the second lane, the vehicles reporting the existence of the street parking vehicle include the vehicles having the uploaded detection result of the street parking vehicle, which are the vehicles traveling on the second lane. The probability calculation unit G33 may calculate the actual existence probability in accordance with the number and the type of the reports indicating the existence of the street parking vehicle, when the existence of the street parking vehicle can be confirmed by the image analysis of the server processor 21 or a visual observation of an operator is set to 100. For example, as the number of vehicles already performed the avoidance actions increases or as the number of vehicles detecting the street parking vehicle by the surrounding monitoring sensors increases, the actual existence probability may be set to be higher.

The probability calculation unit G33 may calculate the actual existence probability, based on a difference between the number of reports indicating that the street parking vehicle exists and the number of reports indicating that the street parking vehicle does not exist. For example, when the number of reports indicating that the street parking vehicle exists and the number of reports indicating that the street parking vehicle does not exist are the same as each other, the actual existence probability may be set to 50%. The probability calculation unit G33 may calculate the actual existence probability by performing the statistical processing on the detection reliability included in the reports from multiple vehicles. The probability calculation unit G33 may periodically calculate the actual existence probability.

The distribution processing unit G4 may distribute the street parking point notification packet including the above-described actual existence probability. When the actual existence probability of the street parking vehicle at a certain point is changed, the distribution processing unit G4 may distribute the street parking point notification packet including the updated actual existence probability to the vehicle to which the street parking point notification packet for the point is distributed. For example, the distribution processing unit G4 may periodically distribute the street parking point notification packet together with the information including a probability that the street parking vehicle exists. For example, the distribution processing unit G4 may distribute the street parking point notification packet at a prescribed interval by indicating the actual existence probability in three stages such as "still exists", "high possibility of still existing", and "high possibility of disappearance".

A value obtained by subtracting the actual existence probability from 100% corresponds to a disappearance probability indicating a probability that the street parking vehicle may disappear. The distribution processing unit G4 may transmit a disappearance notification packet including the disappearance probability of the street parking vehicle.

<Using Operation Information of Commercial Vehicle>

A commercial vehicles such as a bus, a taxi, a truck, and a moving work vehicle may have a configuration in which stopping and moving are reported to the map server 2 on a real-time basis. The commercial vehicle may include a construction vehicle. For example, the above-described commercial vehicle is equipped with a commercial in-vehicle device as the map cooperation device 50 configured to report a stop position and a movement state. In this manner, the map server 2 is configured to be capable of recognizing the stop position. In this system configuration, when the stop position acquired from the above-described commercial in-vehicle device is located on the road, the map server 2 registers the point as the street parking point. When receiving the report indicating that the movement starts again from the commercial in-vehicle device, the setting of the street parking point corresponding to the vehicle is canceled.

The distribution processing unit G4 of the map server 2 may set the actual existence probability of the street parking point information to a high level, and may immediately distribute the street parking point information, based on a stop report from the commercial in-vehicle device. The distribution processing unit G4 may set the disappearance probability of the disappearance notification packet to a high level, and may immediately distribute the disappearance notification packet, based on a start report from the commercial in-vehicle device. The reason is shown as below. Any information is based on reports from the parties concerned, and has high reliability. The map server 2 may indirectly acquire information on the stop position and the movement restart of the commercial vehicle, from an operation company and/or an operation management server that manages an operation of the vehicle. The configuration for transmitting information on parking and starting to the map server 2 may be applied to the map cooperation device 50 for a vehicle such as a private vehicle, other than the commercial vehicle.

<Supplement Regarding Distribution Aspect of Street Parking Information>

It is preferable that the street parking point notification packet includes the position, the type, and the size of the street parking vehicle. The position information of the street parking vehicle may include not only the position coordinates but also the protruding amount to the first lane as detailed position information. Furthermore, the street parking point notification packet may include width information of a region in which the vehicle can travel on the first lane, excluding a portion blocked by the street parking vehicle.

According to the configuration in which the street parking point notification packet includes the protruding amount and a traveling available width of the street parking vehicle, the vehicle receiving the street parking point notification packet can determine whether the lane change is required or whether the street parking vehicle can be avoided by adjusting the lateral position. Even when the vehicle travels across the lane boundary, it is possible to calculate the protruding amount to the second lane. When the protruding amount to the second lane can be calculated, the protruding amount of the subject vehicle can be notified to the vehicle traveling on the second lane through inter-vehicle communication, and the subject vehicle can cooperate with the surrounding vehicle for the traveling position.

The street parking point notification packet may include time information when it is determined that the street parking vehicle has appeared and a latest (in other words, last) time when it is determined that the street parking vehicle still exists. Since the determination times are included, the vehicle receiving the information can estimate reliability of the received information. For example, as the elapsed time from the final determination time is shorter, the reliability is higher. The street parking point notification packet may include information on the number of vehicles confirming the existence of the street parking vehicle. The higher reliability of the street parking information can be estimated, as the number of vehicles confirming the existence of the street parking vehicle increases. Depending on whether the reliability of the street parking information is high, a control aspect in the vehicle may be changed, with regard to whether the street parking information is used for vehicle control or is used only for notification to the occupant.

The street parking point notification packet may include characteristic information such as the color of the street parking vehicle. The street parking point notification packet may include an image of the street parking vehicle which is captured by a certain vehicle. According to this configuration, the in-vehicle system 1 or the occupant scheduled to pass through the street parking point can easily associate the street parking vehicle notified from the map server 2 with the street parking vehicle in the real world. As a result, it is possible to improve determination accuracy in determining whether the street parking vehicle notified from the map server 2 still exists or has disappeared.

The distribution processing unit G4 may distribute the information by setting a lane change recommendation POI (Point of Interest) to a point in front of the street parking point by the predetermined distance in the street parking vehicle lane. The lane change recommendation POI indicates a point where the lane change is recommended. According to the configuration in which the map server 2 sets and distributes the lane change recommendation POI in this way, a process for calculating the lane change point of the vehicle can be omitted, and a processing load on the processing unit 51 or the driver-assistance ECU 60 can be reduced. Even in the configuration which proposes the lane change to the user, a timing for displaying a street parking vehicle notification image can be determined by using the lane change recommendation POI.

The street parking point notification packet may include information indicating whether the place still remains at risk, such as whether the street parking vehicle has disappeared. Whether the place still remains at risk may be expressed by the above-described actual existence probability. As in the street parking point notification packet, it is preferable that the street parking vehicle disappearance packet also includes the characteristics of the street parking vehicle or the time at which the disappearance is determined.

The distribution processing unit G4 may be configured to distribute the street parking point notification packet only to a vehicle in which a predetermined application such as an autonomous driving application is executed. As the predetermined application, in addition to the autonomous driving application, adaptive cruise control (ACC), lane trace control (LTC), or a navigation application can be adopted. In the configuration for pull-based distribution of the street parking point information, the map cooperation device 50 may be configured to request the map server 2 for the street parking point information in a condition that a specific application is executed. According to the above-described configuration, stability in control of the driver-assistance ECU 60 can be improved while excessive information distribution is restricted. The distribution processing unit G4 may be configured to perform push-based distribution of the street parking point notification packet, only on a vehicle which is set to automatically receive the street parking point information, based on settings of the user. According to this configuration, it is possible to reduce a possibility of communication between the map server 2 and the map cooperation device 50 with each other via wireless communication against an intention of the user.

The distribution processing unit G4 may distribute the street parking point information in units of mesh/map tiles. For example, the street parking point information in a map tile may be distributed to the vehicle existing in the map tile or the vehicle requesting for the map of the map tile. According to this configuration, a distribution target can be simply selected, and information on multiple street parking points can be collectively distributed. As a result, a processing load on the map server 2 can be reduced. A method for using the received street parking point information depends on which type of applications is activated in the in-vehicle system 1. According to the above-described configuration, the street parking point information can be used in a more diversified and flexible manner in the in-vehicle system 1.

<Regarding Upload Processing of In-Vehicle System 1>

The map cooperation device 50 may be configured to transmit the street parking point report, only when the content registered in the map and the content observed by the vehicle are different from each other as the street parking information. In other words, a configuration may be adopted as follows. When the content of the map and the actual status coincide with each other, the street parking point report may not be transmitted. For example, when the street parking vehicle is observed at a point where the existence of the street parking vehicle is not registered on the map, or when the street parking vehicle does not exist at a point where the existence of the street parking vehicle is registered on the map, the street parking point report is transmitted. According to the above-described configuration, the amount of communication can be reduced. The server processor 21 may not perform a determination processing related to the presence or absence of the street parking vehicle for portions where the real world and the map registration contents coincide with each other. That is, a processing load on the server processor 21 can also be reduced.

Hitherto, a configuration has been disclosed as follows. The map cooperation device 50 voluntarily uploads the vehicle behavior data to the map server 2 when the vehicle passes through the vicinity of the street parking vehicle. However, a configuration of the map cooperation device 50 is not limited thereto. As another aspect, it is conceivable to adopt a configuration as follows. The map cooperation device 50 may upload the vehicle behavior data to the map server 2 only when there is a predetermined movement such as the lane change and the sudden deceleration. In the configuration in which the vehicle behavior data is uploaded only when each vehicle shows a specific movement, there is a possibility that information for determining whether the street parking vehicle has disappeared may be less likely to be collected in the map server 2. The reason is shown as below. When the street parking vehicle has disappeared, the vehicle no longer shows the specific movement.

Based on the above-described possibility, the server processor 21 may transmit an upload instruction signal which is a control signal instructing to upload the street parking point report, to the vehicle passing and/or scheduled to pass through the on-map street parking point. In other words, the map cooperation device 50 may be configured to determine whether to upload the street parking point report, based on an instruction from the map server 2. According to this configuration, an upload status of the street parking point report can be controlled by each vehicle, based on the determination of the map server 2, and unnecessary communication can be restricted. For example, when information on the appearance or the disappearance of the street parking vehicle is sufficiently collected, measures such as restricting the upload from vehicle can be adopted.

The server processor 21 may set a point where the vehicle behavior indicating the existence of the street parking vehicle is observed based on the vehicle condition report, as a verification point, and may transmit an upload instruction signal to the vehicle scheduled to pass through the verification point. For example, the point where the vehicle behavior indicating the existence of the street parking vehicle is observed is a point where two or three vehicles consecutively changed lanes. According to the configuration, it is possible to intensively and quickly collect information on a point where the street parking vehicle is suspected to exist, and it is possible to detect the existence state of the street parking vehicle on a real-time basis.

A configuration may be adopted in which whether to upload the street parking point report can be set in the vehicle. For example, a configuration may be adopted in which the user can set whether to upload the street parking point report via an input device. Furthermore, a configuration may be adopted in which the user can change settings of information items uploaded as the street parking point report. According to this configuration, it is possible to reduce a possibility of increasing the amount of communication by the user who unintentionally uploads the vehicle behavior data to the map server 2. From a viewpoint of privacy protection, a configuration may be adopted as follows. The transmission source information may be rewritten to a number different from the actual vehicle ID by using a predetermined encryption code, and may be uploaded to the map server 2.

The street parking information distribution system 100 may be configured to grant an incentive for the user who positively uploads information on the street parking vehicle. Since the incentive is granted in transmitting the street parking point report, the information related to the street parking vehicle can be more easily collected, and effectiveness of the street parking information distribution system 100 can be improved. The incentive can be granted for a decrease in automobile-related taxes, a decrease in usage fees for map services, and points that can be used to purchase goods or to use services. A concept of electronic money is also included in the points that can be used to purchase predetermined goods or to use services.

<Regarding Grouping of Street Parking Point>

Figure 25:
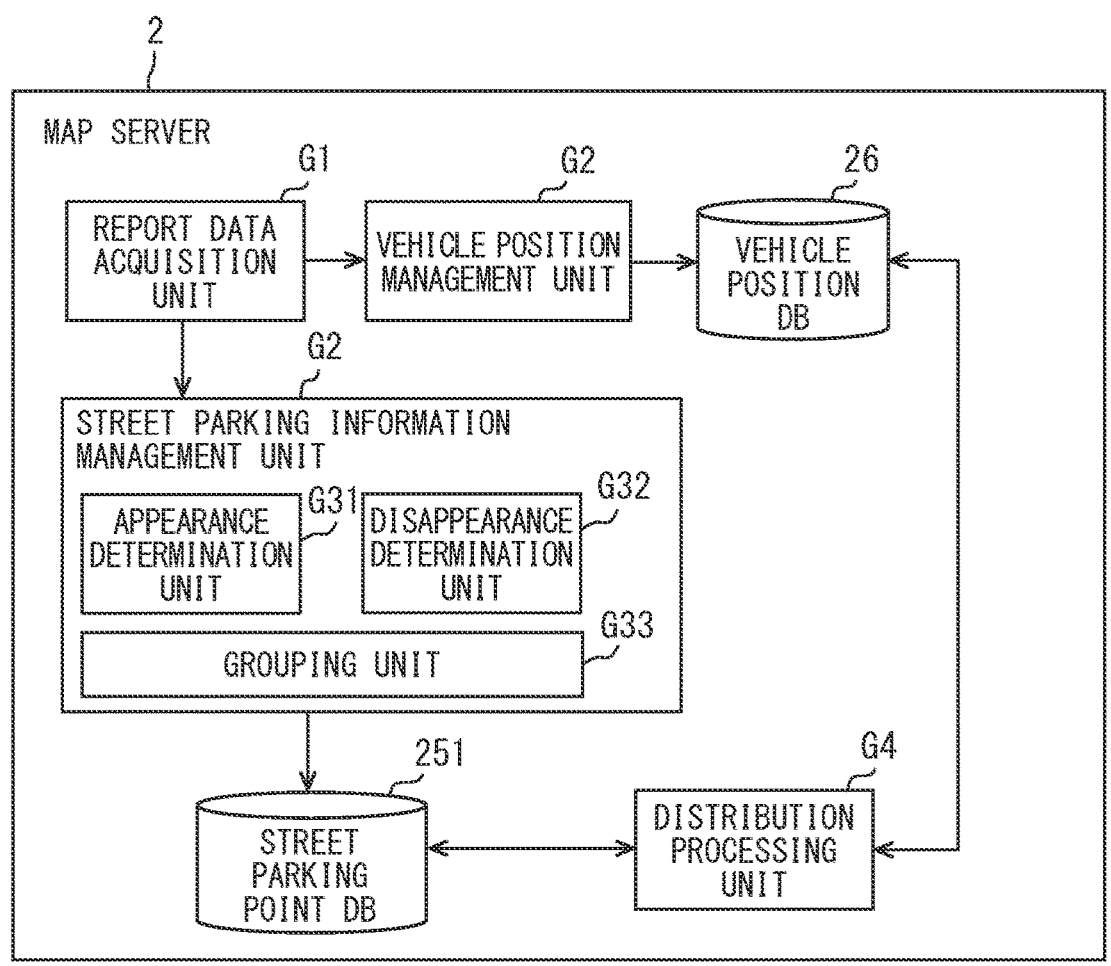
FIG. 25 is a figure describing a configuration for grouping and distributing street parking points.

There are places and time periods where the street parking vehicle is easily parked as described above. Therefore, the following case is conceivable. Even at a point where only one street parking vehicle exists at first, a new street parking vehicle may appear in front of and behind the point with the lapse of time, and a certain section may be filled with the street parking vehicles. In view of this case, the map server 2 may be configured to distribute information by grouping points where multiple street parking vehicles are gathered together, as a street parking area. For example, when there is only one street parking vehicle, the map server 2 may issue a point notification, and when other parking-stopping vehicles are detected in front of and behind the point, the map server 2 may define other vehicles as a street parking area, and may distribute the street parking area. FIG. 25 is a view illustrating a configuration of the map server 2 corresponding to the technical idea, and includes a grouping unit G34.

The grouping unit G34 is configured to group multiple street parking points in accordance with a predetermined rule. The grouped street parking points correspond to the street parking area described above. For example, the grouping unit G34 groups the street parking points whose interval in the road extending direction is smaller than a predetermined threshold value (hereinafter, referred to as a connection distance) into one group. For example, the connection distance can be 25 m, 50 m, 100 m, 200 m, or 250 m. When the connection distance is short, the street parking area is segmented, and for example, the autonomous driving vehicle is prompted to frequently change the lane. Therefore, it is desirable that the connection distance as a threshold value for grouping has a length to a certain degree. The connection distance may be changed depending on a road type (national road or prefectural road) or a speed limit. As a road scale is larger, and as the speed limit is higher, the connection distance may be set to be longer.

Figure 26:
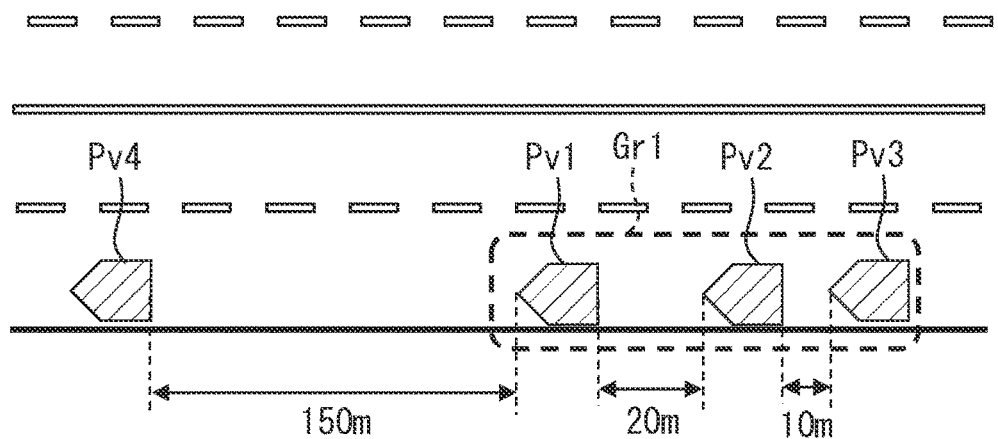
FIG. 26 is a figure describing grouping of the street parking points.

The street parking point where an interval between front and rear street parking vehicles is separated by the connection distance or longer is treated as a separate group or point. For example, as illustrated in FIG. 26, when the connection distance is set to 100 m, street parking vehicles Pv1 to Pv3 having a vehicle interval of 100 m or shorter are included in the same group Gr1. On the other hand, a street parking vehicle Pv4 having an interval of 100 m or longer from the street parking vehicle Pv1 is treated as a separate group or point. The point here indicates a single street parking vehicle which is not included in any group (street parking area when adjusted).

Figure 27:
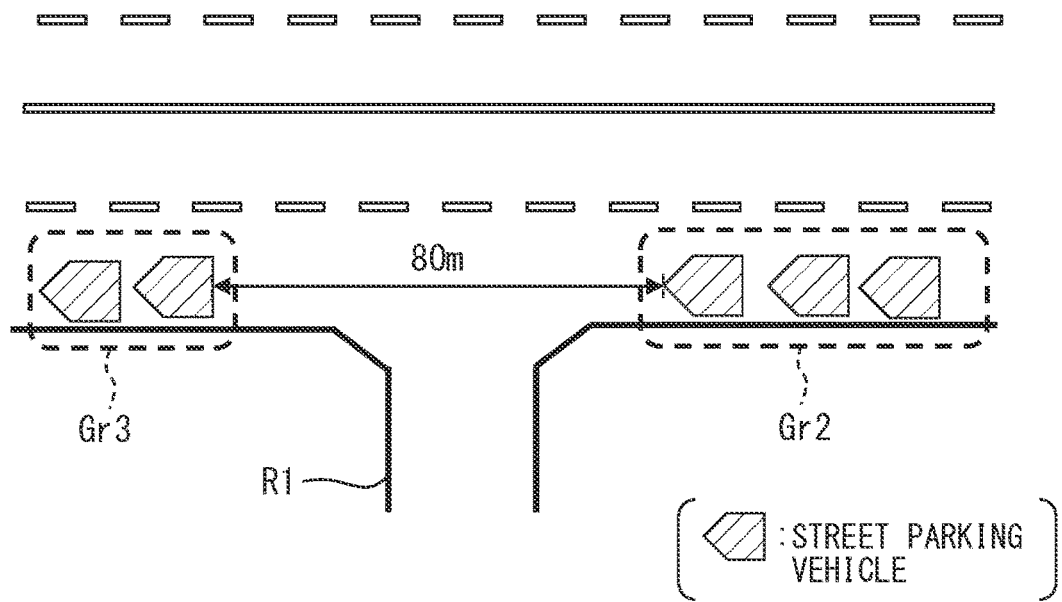
FIG. 27 is a figure describing an example of a rule for grouping the street parking points.

Even when the interval between the front and rear street parking vehicles falls within the connection distance, for example as illustrated in FIG. 27, when there is a connection point connected to another road (hereinafter, referred to as a branch road R1) in an intermediate portion of the interval, the grouping unit G34 may divide the street parking area into separate groups Gr2 and Gr3 while the connection point is used as a turning point. Since the street parking area is divided while the connection point connected to the branch road R1 is used as the turning point, it is possible to reduce a possibility that the vehicle may not enter the road due to the street parking area information. A configuration may be adopted as follows. When the map server 2 is configured to be capable of acquiring a path plan from each in-vehicle system 1, and when the vehicle planning an entering path to the branch road R1 does not exist, multiple street parking vehicles may be grouped by ignoring the branch road R1. For example, the groups Gr2 and Gr3 may be integrated into one group. In other words, multiple street parking points existing via the branch road R1 may be defined as one street parking area.

Figure 28:
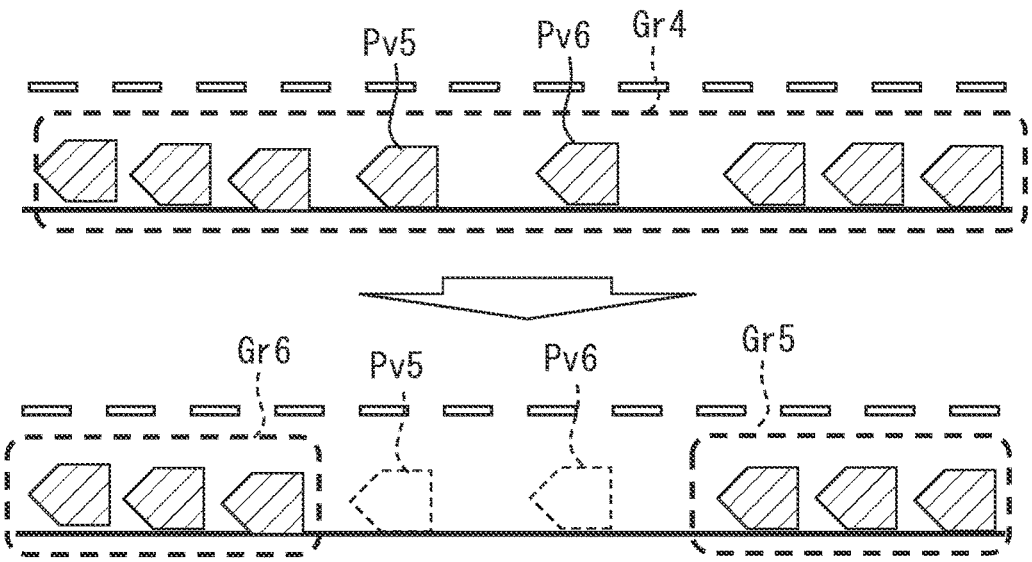
FIG. 28 is a figure describing an operation of a grouping unit.

The grouping unit G34 updates a size (consequently, a configuration of the group) of the street parking area, as the street parking point has appeared and has disappeared. For example, as illustrated in FIG. 28, when a blank space equal to or longer than the connection distance is formed inside the street parking area due to the disappearance of the street parking vehicles Pv5 and Pv6 forming one street parking area (group Gr4), the area is divided into two street parking areas (groups Gr5 and Gr6). According to this configuration, it is possible to reduce a possibility of the problem that due to old street parking area information, parking-stopping of the vehicle is not available even though parking-stopping of the vehicle near the road shoulder is needed. In a configuration where each map cooperation device 50 transmits the subject vehicle parking report and the subject vehicle start report, the grouping unit G34 can update the street parking area on a real-time basis, based on the reports.

In the configuration including the grouping unit G34 as described above, the distribution processing unit G4 may collectively distribute information regarding multiple street parking points belonging to the same group, as street parking area information. The street parking area information includes start coordinates of the area and a distance thereof. The street parking area information may include the number of parking vehicles forming the street parking area, position information on a terminal of the area, and an expanding direction of the street parking area. The street parking area information may also include characteristics (color and vehicle type) of vehicles in the start and the terminal of the area. When the street parking area information includes the characteristic information on the leading vehicle and the trailing vehicle, it is easier for the map cooperation device 50 to verify a current status of the point indicated by the street parking area information. For example, it is easier to verify whether the street parking area is expanded or shrunk. According to the configuration in which multiple street parking point information are collectively distributed as the street parking area information, the amount of communication can be reduced as a whole. Since the map cooperation device 50 does not need to individually process multiple street parking points, a processing load on the map cooperation device 50 can be reduced.

The street parking point report uploaded by the map cooperation device 50 when the vehicle travels in a point defined as the street parking area may be limited to data in the vicinity of a start point and an end point of the parking area. The reason is shown as below. When the parking area is long, and when the image data needs to be constantly uploaded while the vehicle travels in the section, there is a possibility that communication costs and the traffic volume may increase. However, due to the movement of the street parking vehicle, there is a possibility that a vacant space equal to or longer than the connection distance may be formed inside the region notified as the street parking area. A configuration may be adopted as follows. When the vehicle passes through the street parking area, for example, the image data may be uploaded, each time the vehicle travels every connection distance or half of the connection distance.

As a point, the distribution processing unit G4 may notify the street parking point which does not belong to any street parking area and/or any group. When the number of vehicles forming the street parking area is reduced and treated as a point, in other words, when the grouping is canceled, the distribution of the street parking area information may be switched to point notification. The street parking area information obtained by collecting the information on multiple street parking points is also included in a concept of the street parking point information.

<Using Example of Information on Parking-Stopping Vehicle Group>

Hitherto, an aspect has been disclosed as follows. A position of the parking-stopping vehicle along the roadside of the normal road is detected on a real-time basis, based on the behavior data of the vehicle passing around the position and the detection result of the surrounding monitoring sensor. However, a method for detecting the position of the above-described parking-stopping vehicle can also be used for a technique for detecting position information in an end of a traffic congestion on a real-time basis, for example. Hereinafter, an example of a traffic congestion information distribution system that determines and distributes a traffic congestion section, based on a report from the vehicle will be described with reference to FIGS. 29 and 30.

Figure 29:
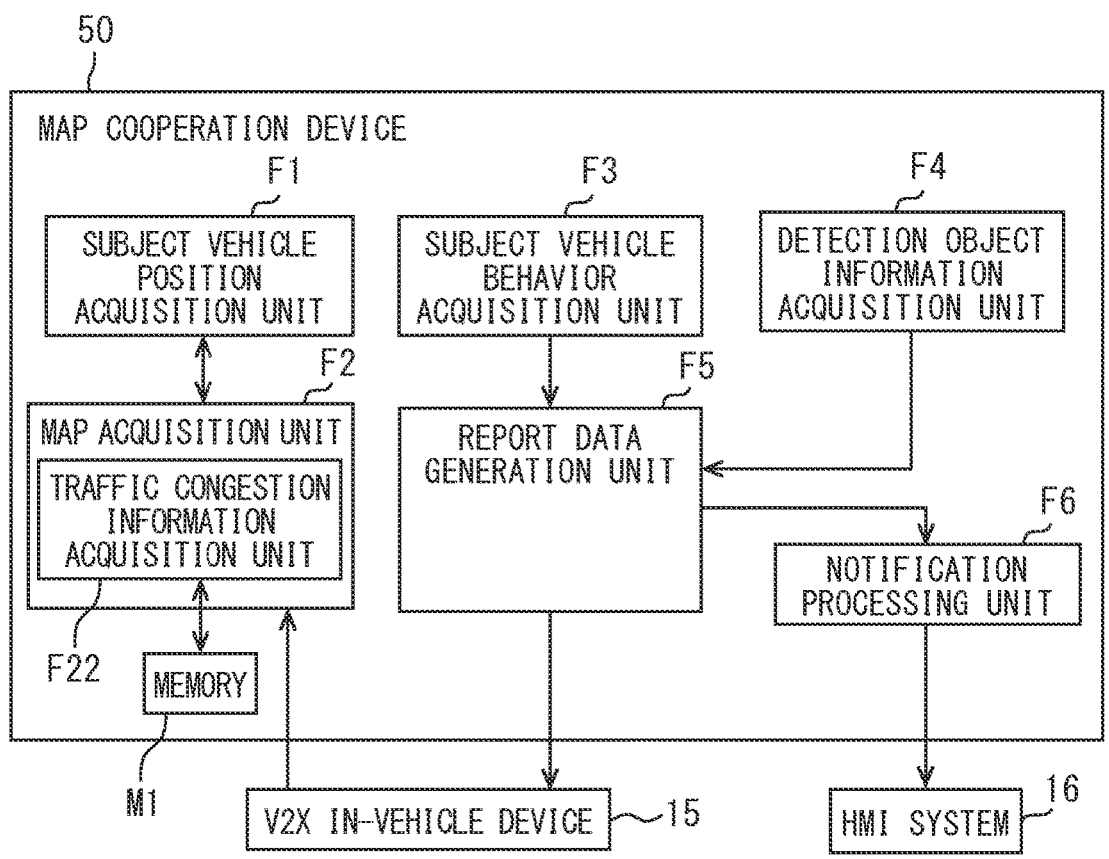
FIG. 29 is a figure illustrating a configuration of the map cooperation device that uploads information related to a traffic congestion section.
Figure 30:
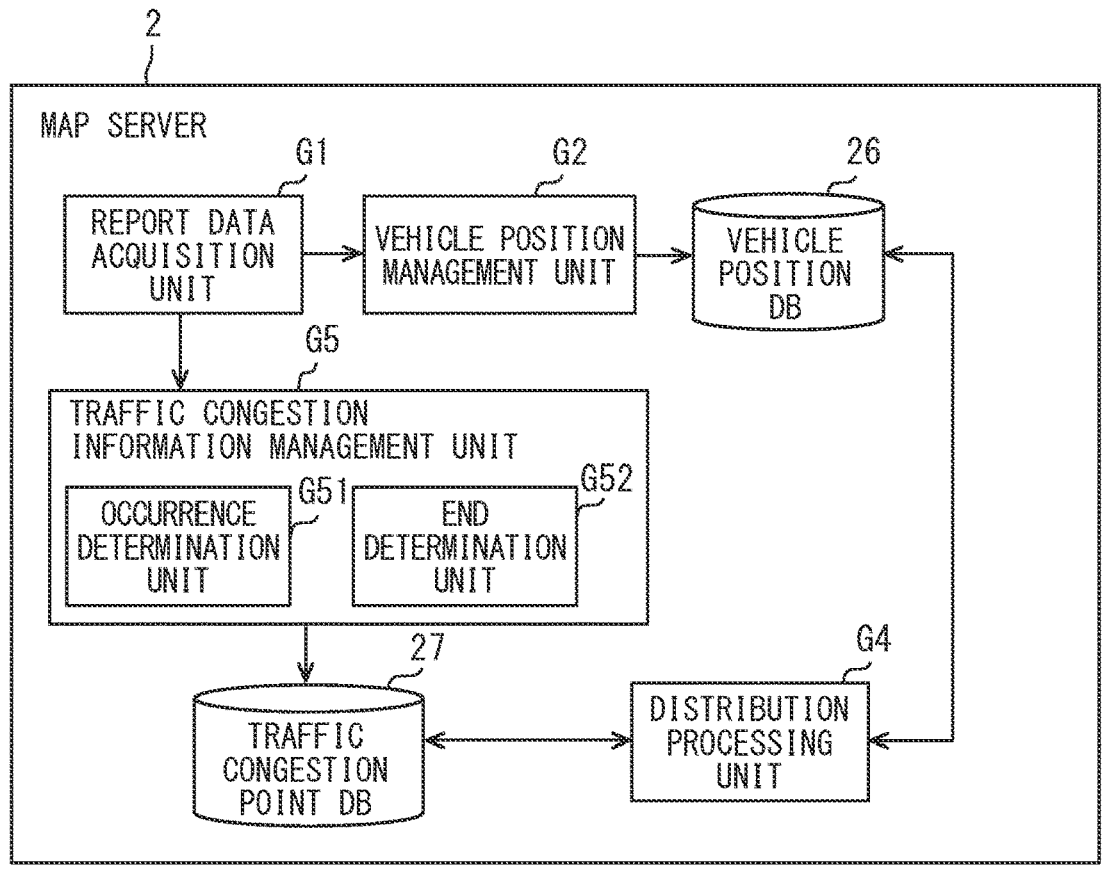
FIG. 30 is a figure illustrating a configuration of the map server that detects and distributes an end of the traffic congestion section, based on a report from a vehicle.

As illustrated in FIG. 29, the map cooperation device 50 forming the traffic congestion information distribution system of the present disclosure includes a traffic congestion information acquisition unit F22 in addition to the subject vehicle position acquisition unit F1. As illustrated in FIG. 30, the map server 2 includes a traffic congestion information management unit G5 and a traffic congestion point DB 27 in addition to the report data acquisition unit G1 and the distribution processing unit G4. The traffic congestion information management unit G5 includes an occurrence determination unit G51 and an end determination unit G52.

The traffic congestion information acquisition unit F22 is configured to acquire a traffic congestion section and an end position thereof from the map server 2. Based on the information acquired by the subject vehicle behavior acquisition unit F3 and the detection object information acquisition unit F4, as a traffic congestion section report, the report data generation unit F5 uploads data indicating a current status of a traffic congestion notification section which is a traffic congestion section notified from the map server 2, to the map server 2. The content uploaded as the traffic congestion section report may be the vehicle behavior data when the vehicle passes through the traffic congestion notification section, or may be the image data obtained by imaging the traffic congestion notification section. The content may be detection position information on the stopping vehicle detected by the surrounding monitoring sensor. Furthermore, the content may include the above-described multiple types of information.

The traffic congestion information management unit G5 is configured to update the position and length of the traffic congestion end, based on a traffic congestion section report uploaded from the vehicle. The occurrence determination unit G51 sets the point as a traffic congestion section, when a stopping vehicle exists at the point determined not to be in the traffic congestion section at the previous time. As a method for detecting occurrence of a traffic congestion point, a method similar to the method for determining the appearance of the street parking point can be used. Whether the row of stopping vehicles on the road depends on the traffic congestion or the street parking may be determined by the distance in the lateral direction from the roadside or the lane ID. For example, a row of vehicles existing at a position separated by a predetermined distance (for example, 0.5 m) or longer from the roadside, or a row of vehicles existing on the second lane or the third lane may be determined that the rows are caused by the traffic congestion.

The end determination unit G52 is configured to update the position of the traffic congestion end, based on the report from the vehicle. For example, the end determination unit G52 re-calculates a traffic congestion end position on an assumption that the traffic congestion section is shrunk when there exists a vehicle passing through the position set in the traffic congestion end during the previous determination at a speed exceeding a predetermined threshold value. For example, a determination logic similar to that in determining the appearance/disappearance of the street parking vehicle can be adopted for determining a change in the position of the traffic congestion end. The vehicle behavior used to detect the traffic congestion section is not limited to a change in traveling position from the first lane to the second lane, when the street parking point is detected. The lane change from any optional traveling lane to another lane can be used as the vehicle behavior data for specifying the position of the traffic congestion end. Stopping at a point separated by a predetermined distance or longer from a traffic light or lighting of a hazard flasher can also be used as the vehicle behavior data (in other words, a determination criterion) for specifying the position of the traffic congestion end. Here, a traffic congestion status such as the presence or absence of the traffic congestion and the position of the traffic congestion end is determined in units of the lane. However, in another aspect, the traffic congestion status may be determined in units of the road.

The traffic congestion point DB 27 is a database that stores information on the traffic congestion sections generated by the traffic congestion information management unit G5. The traffic congestion section data stored in the traffic congestion point DB 27 is updated whenever necessary by the traffic congestion information management unit G5. An update processing for updating the traffic congestion section by the traffic congestion information management unit G5 may be performed in turn from the point where the number of reports from the vehicle exceeds a predetermined threshold value. The distribution processing unit G4 distributes data stored in the traffic congestion point DB 27 to the vehicle.

According to the above-described configuration, the traffic congestion status such as the presence or absence of the traffic congestion and the position of the traffic congestion end can be specified in units of the lane. According to the configuration for determining the traffic congestion status in units of the lane, the traffic congestion status can be distributed by distinguishing the traffic congestion of the vehicles waiting for the right turn and/or waiting for the left turn from the traffic congestion in the whole road. A vehicle scheduled to straightly travel to the intersection can take measures such as the lane change by acquiring information indicating that the traffic congestion occurs due to the vehicle waiting for the right or left turn in front of the subject vehicle traveling lane.

According to the above-described configuration, the information on the traffic congestion section, particularly real-time position information on the traffic congestion end can be distributed to each vehicle. Each in-vehicle system 1 acquires real-time position information on the traffic congestion end. Accordingly, each in-vehicle system 1 can perform vehicle control for the lane change or the deceleration with a sufficient time/distance margin.

<Example of Application to Autonomous Driving>

For example, the street parking information generated by the map server 2 or the traffic congestion information for each lane may be used to determine whether to perform autonomous driving. As a road condition for the autonomous driving, a configuration may be adopted in which the number of lanes is regulated to be equal to or more than a predetermined number n. The predetermined number n is an integer equal to or greater than "2", and for example, is "2", "3", or "4". In this configuration, a section where the number of available lanes is less than n due to the traffic congestion resulting from the street parking vehicle or the vehicle waiting for the right or left turn may be an autonomous driving unavailable section. The number of available lanes is the number of lanes on which the vehicle can substantially travel. For example, when the first lane in a two-lane road on each side is blocked by the street parking vehicle on the road, the number of available lanes of the road is "1".

Figure 31:
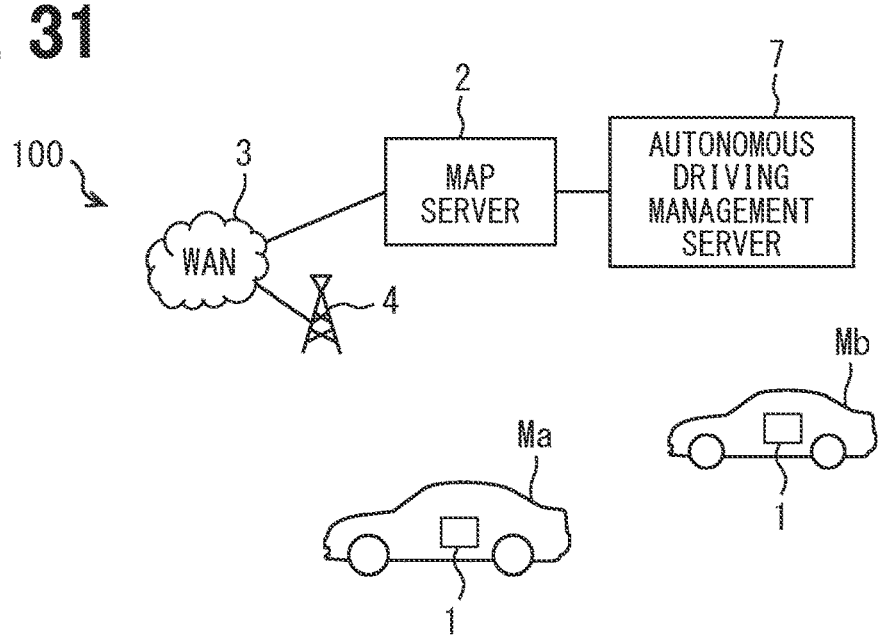
FIG. 31 is a figure illustrating a configuration of a system that dynamically sets an autonomous driving unavailable section, based on street parking point information and traffic congestion information.

A configuration may be adopted as follows. Whether the lane corresponds to the autonomous driving unavailable section may be determined by the vehicle (for example, the driver-assistance ECU 60 or the autonomous driving ECU). The map server 2 may set the autonomous driving unavailable section, based on the street parking information, and may distribute the autonomous driving unavailable section. For example, in the map server 2, a section where the number of available lanes is insufficient due to the street parking vehicle is set as the autonomous driving unavailable section, and the autonomous driving unavailable section is distributed. When it is confirmed that the street parking vehicle has disappeared, the autonomous driving unavailable setting is canceled, and the cancellation is distributed. As illustrated in FIG. 31, a server for distributing the setting of the autonomous driving unavailable section may be provided separately from the map server 2 as an autonomous driving management server 7. The autonomous driving management server corresponds to a server for managing autonomous driving available/unavailable sections. As described above, the street parking information can be used to determine whether an operational design domain (ODD) set for each vehicle is satisfied. As illustrated in FIG. 31, a system for distributing information related to whether the autonomous driving is available to vehicle, based on the street parking information will be referred to as an autonomous driving unavailable section distribution system.

<Appendix (1)>

The control unit and the method which are described in the present disclosure may be realized by a dedicated computer constituting a processor programmed to execute one or multiple functions embodied by a computer program. The device and the method which are described in the present disclosure may be realized by a dedicated hardware logic circuit. The device and the method which are described in the present disclosure may be realized by one or more dedicated computers configured by a combination of a processor that executes a computer program and one or more hardware logic circuits. The computer program may be stored in a computer-readable non-transitional tangible recording medium as an instruction executed by a computer. For example, means and/or functions provided by the map cooperation device 50 and the map server 2 can be provided by software recorded in a physical memory device, a computer executing the software, only software, only hardware, or a combination thereof. Some or all of the functions provided by the map cooperation device 50 and the map server 2 may be realized as hardware. An aspect in which a certain function is realized as hardware includes an aspect in which the function is realized by using one or multiple ICs. For example, the server processor 21 may be realized by using an MPU or a GPU instead of the CPU. The server processor 21 may be realized by combining multiple types of calculation processing devices such as the CPU, the MPU, and the GPU. Furthermore, the ECU may be realized by using a field-programmable gate array (FPGA) or an application specific integrated circuit (ASIC). The same applies to the processing unit 51. Various programs may be stored in a non-transitory tangible storage medium. Various storage media, such as a hard-disk drive (HDD), a solid state drive (SSD), an erasable programmable rom (EPROM), a flash memory, a USB memory, and a secure digital (SD) memory card, can be adopted as a storage medium of the program.

<Appendix (2)>

The present disclosure also includes the following configurations. In the following description, the map server corresponds to the parking-stopping point management device, the appearance determination unit corresponds to the parking-stopping point detection unit, and the disappearance determination unit corresponds to the existence state determination unit. The information presentation control device corresponds to the HMI system/HCU. The driver-assistance device corresponds to the driver-assistance ECU.

- In the map server, the appearance determination unit and the disappearance determination unit have different conditions for determining that the street parking vehicle exists.
- The map server is configured to be capable of acquiring the image obtained by imaging the point where the street parking vehicle exists from the vehicle. The disappearance determination unit determines that the street parking vehicle is moved, based on a fact that the number or the ratio of the vehicles which do not perform the avoidance action at the street parking point exceeds a threshold value. The threshold value for determining that the street parking vehicle has disappeared is changed, based on whether the street parking vehicle is reflected on the above-described image.
- The map server is configured to instruct the vehicle scheduled to pass through the street parking point to transmit a predetermined type of the information for determining the existence state of the street parking vehicle, including the vehicle behavior data.
- The map server adopts a configuration in which at least one of the appearance determination unit and the disappearance determination unit determines whether the street parking vehicle exists by using the camera image captured by the vehicle, in addition to the vehicle behavior data of the multiple vehicles.
- The map server is configured to change a combination of information types for determining that the street parking vehicle exists, when the appearance of the street parking vehicle is determined and when the disappearance of the street parking vehicle is determined.
- The map server is configured not to use the analysis result of the image captured by the vehicle-mounted camera when the disappearance is determined, while the analysis result of the image captured by the vehicle-mounted camera is jointly used when the appearance is determined.
- The map server is configured to change the weight of each information type for determining that the street parking vehicle exists, when the appearance of the street parking vehicle is determined and when the disappearance of the street parking vehicle is determined.
- In the configuration that uses the analysis result of the image captured by the vehicle-mounted camera as the determination criterion for determining whether the street parking vehicle exists, when the disappearance is determined, the map server is configured to reduce the weight of the analysis result of the image, compared to when the appearance is determined.
- The map server is configured to determine the appearance and the disappearance of the street parking vehicle by comparing the traffic volumes in each lane.
- The map server is configured to adopt the lane change performed after deceleration as the avoidance action. According to the configuration, it is possible to exclude the lane change for overtaking.
- The map server is configured not to distribute the street parking point information to the vehicle traveling and/or scheduled to travel on the lane separated by one or more lanes away from the first lane.
- The street parking presence-absence determination device or the map server does not determine that the street parking vehicle exists, when the distance measuring sensor does not detect the three-dimensional object, even when the camera detects the street parking vehicle.
- The map cooperation device serving as the vehicle device configured to upload the street parking point report including the vehicle behavior to the map server, based on the instruction from the map server or voluntarily, when the vehicle travels within a prescribed range from the street parking point notified from the map server.
- The map cooperation device including the report processing unit that transmits the data set including at least one of the subject vehicle behavior data indicating the behavior of the subject vehicle, the other vehicle behavior data indicating the behavior of other vehicles, and the image of the vehicle-mounted camera, to the server, as the street parking point report, when the vehicle passes through the vicinity of the street parking point acquired from the map server.
- The map cooperation device adopts a configuration in which the report processing unit changes the content to be transmitted to the server as the street parking point report, depending on whether the subject vehicle traveling lane is the lane adjacent to the roadside at the determination point located by the predetermined distance in front of the notified street parking point.
- The map cooperation device outputs the street parking point information acquired from the map server to the navigation device or the autonomous driving device.
- The information presentation control device causes the display to display the street parking vehicle notification image generated based on the street parking point information acquired from the map server.
- The information presentation control device does not notify the occupant of the information regarding the street parking vehicle, when the vehicle travels and/or is scheduled to travel on the lane separated by one or more lanes away from the first lane.
- The driver-assistance device is configured to switch between whether to perform the vehicle control based on the information and whether to use the information only for information presentation, based on the actual existence probability of the street parking vehicle notified from the map server.

The invention claimed is:

1. A parking-stopping point management device, comprising:
 a determination criterion acquisition unit that is configured to acquire at least one of vehicle behavior data indicative of a behavior of at least one vehicle and sensing information of a surrounding monitoring sensor mounted in the at least one vehicle in association with position information of the at least one vehicle;

a parking-stopping point detection unit that is configured to detect a street parking point which is a point where a vehicle is parked on a normal road;
an existence state determination unit that is configured to determine whether the vehicle still exists at the street parking point detected by the parking-stopping point detection unit based on information acquired by the determination criterion acquisition unit; and
a distribution processing unit that is configured to distribute information on the street parking point detected by the parking-stopping point detection unit to the at least one vehicle, wherein
the parking-stopping point detection unit is further configured to:
set, as the street parking point, a position of a vehicle stopping on a road when a distance between the vehicle stopping on the road and a roadside falls within a predetermined distance; and
prioritize detection of the street parking point on the road at an exit side of an intersection over detection of the street parking point on the road at an entrance side of the intersection.

2. The parking-stopping point management device according to claim 1, wherein
the distribution processing unit is configured to distribute, to a vehicle scheduled to pass through the street parking point, a street parking point notification packet which is a communication packet indicative of information on the street parking point, and
the distribution processing unit is configured to, when the existence state determination unit determines that the street parking vehicle has disappeared from the street parking point, distribute, to the vehicle to which the street parking point notification packet was distributed, a disappearance notification packet which is a communication packet indicating that the street parking vehicle has disappeared.

3. The parking-stopping point management device according to claim 1, wherein
the determination criterion acquisition unit is configured to acquire the vehicle behavior data from a plurality of vehicles,
the parking-stopping point detection unit and the existence state determination unit are configured to determine whether an avoidance action from a first lane to a second lane is performed by each of the vehicles based on the vehicle behavior data,
the parking-stopping point detection unit is configured to determine that a vehicle is parked or stops at a point when at least one of the vehicles performs the avoidance action around the point, and
the existence state determination unit is configured to determine that the vehicle parked or stopping at the point has disappeared when at least one of the vehicles is determined to pass through the point without performing the avoidance action.

4. The parking-stopping point management device according to claim 1, wherein
the determination criterion acquisition unit is configured to acquire the sensing information from a plurality of vehicles,
the parking-stopping point detection unit is configured to detect the street parking point based on the sensing information from the vehicles, and
the existence state determination unit is configured to determine whether the street parking vehicle still exists at the street parking point based on the sensing information provided by at least one of the vehicles that is passing through the parking-stopping point.

5. The parking-stopping point management device according to claim 4, wherein
the parking-stopping point detection unit is configured to specify, as a protruding amount, a blocked width of a first lane blocked by a stopping vehicle that is parked at the street parking point to protrude into the first lane based on the sensing information, and
the distribution processing unit is configured to distribute the protruding amount in association with position information of the street parking point.

6. A parking-stopping point management device, comprising:
a determination criterion acquisition unit that is configured to acquire at least one of vehicle behavior data indicative of a behavior of at least one vehicle and sensing information of a surrounding monitoring sensor mounted in the at least one vehicle in association with position information of the at least one vehicle;
a parking-stopping point detection unit that is configured to detect a street parking point which is a point where a vehicle is parked on a normal road; and
an existence state determination unit that is configured to determine whether the vehicle still exists at the street parking point detected by the parking-stopping point detection unit based on information acquired by the determination criterion acquisition unit, wherein
the parking-stopping point detection unit is further configured to:
acquire a position, on a map, of a stopping vehicle that stops on the normal road based on map data and the sensing information acquired by the determination criterion acquisition unit;
determine whether the stopping vehicle is a street parking vehicle parked on a road based on a position of a roadside on the map and the position of the stopping vehicle on the map; and
detect, when the stopping vehicle is determined to be the street parking vehicle, a point where the stopping vehicle exists as the street parking point; and
the point where the stopping vehicle exists is determined as the street parking point based on conditions of (a) no intersection nor traffic light existing within a predetermined first distance in a road traveling direction from the stopping vehicle and (b) a distance from a roadside to the stopping vehicle being within a predetermined second distance, when the stopping vehicle is determined as the street parking vehicle.

7. The parking-stopping point management device according to claim 6, further comprising
a distribution processing unit that is configured to distribute information on the street parking point detected by the parking-stopping point detection unit to the at least one vehicle.

8. The parking-stopping point management device according to claim 7, further comprising:
a grouping unit that is configured to set a street parking area including a plurality of street parking points detected by the parking-stopping point detection unit by grouping together the plurality of street parking points based on a positional relationship of the street parking points, wherein
the distribution processing unit is configured to distribute the street parking points grouped together by the grouping unit as street parking area information including a start point of the street parking area.

9. The parking-stopping point management device according to claim 8, wherein
the grouping unit is configured to set the street parking area by grouping together the street parking points that are arranged with intervals therebetween in a road extending direction, and
each of the intervals is equal to or smaller than a predetermined threshold distance.

10. The parking-stopping point management device according to claim 8, wherein
the distribution processing unit is configured to distribute, in addition to a position of a leading vehicle among street parking vehicles in the street parking area, the street parking area information including at least one of a length of the street parking area and a position of a vehicle among the street parking vehicles that is located at an end of the street parking area.

11. The parking-stopping point management device according to claim 8, wherein
the distribution processing unit is configured to distribute the street parking area information including at least one of characteristic information of a leading vehicle among street parking vehicles in the street parking area and characteristic information of a vehicle among the street parking vehicles that is located at an end of the street parking area, and
the characteristic information includes at least one of a color of a vehicle body and a vehicle type.

12. The parking-stopping point management device according to claim 7, wherein
the parking-stopping point detection unit is configured to detect the street parking point on the road at an exit area of an intersection in preference to the street parking point on the road at an entrance area of the intersection.

13. A parking-stopping point management method for managing point information indicative of a parking-stopping point of a parking-stopping vehicle on a road, the method, executed by at least one processor, comprising:
acquiring at least one of vehicle behavior data indicative of a behavior of at least one vehicle and sensing information of a surrounding monitoring sensor mounted in the at least one vehicle in association with position information;
detecting a street parking point which is a point where a vehicle is parked on a normal road based on the at least one of the behavior of the at least one vehicle and the sensing information;
determining whether the vehicle still exists at the detected street parking point based on the at least one of the behavior of the at least one vehicle and the sensing information; and
distributing information on the street parking point to the at least one vehicle, wherein
detecting the parking-stopping point further includes:
detecting a stopping vehicle that stops on a road;
setting, as the street parking point, a position where the stopping vehicle exists when a distance between the stopping vehicle and a roadside falls within a predetermined distance; and
prioritizing detection of the street parking point on the road at an exit side of an intersection over detection of to the street parking point on the road at an entrance side of the intersection.

14. A parking-stopping point management method for managing point information indicative of a parking-stopping point of a parking-stopping vehicle on a road, the method, executed by at least one processor, comprising:
acquiring at least one of vehicle behavior data indicative of a behavior of at least one vehicle and sensing information of a surrounding monitoring sensor mounted in the at least one vehicle in association with position information;
detecting a street parking point which is a point where a vehicle is parked on a normal road; and
determining whether the vehicle still exists at the detected street parking point based on the at least one of vehicle behavior data and the sensing information, wherein
detecting the parking-stopping point further includes:
acquiring a position, on a map, of a stopping vehicle that stops on the normal road based on map data and the sensing information,
determining whether the stopping vehicle is a street parking vehicle on a road based on a position of a roadside on the map and the position of the stopping vehicle on the map, and
detecting a position where the stopping vehicle exists as the street parking point when the stopping vehicle is determined to be the street parking vehicle;
wherein when the stopping vehicle is determined as the street parking vehicle, the street parking point where the stopping vehicle exists is determined based on conditions of (a) no intersection nor traffic light existing within a predetermined first distance in a road traveling direction from the stopping vehicle and (b) a distance from a roadside to the stopping vehicle being within a predetermined second distance.

15. A vehicle device for transmitting, to a server, information related to a parking-stopping point of a vehicle on a road, the vehicle device comprising:
a stopping vehicle information acquisition unit that is configured to acquire, based on an input signal from a surrounding monitoring sensor mounted in a subject vehicle, information related to a stopping vehicle that is stopped on the road;
a parking determination unit that is configured to determine, based on the information related to the stopping vehicle which is acquired by the stopping vehicle information acquisition unit, whether the stopping vehicle is a street parking vehicle parked on the road or a temporary stopping vehicle with a travelling state; and
a report processing unit that is configured to transmit, to the server, a data set indicative of a point where the street parking vehicle exists when the parking determination unit determines that the stopping vehicle is the street parking vehicle, wherein
the stopping vehicle information acquisition unit is further configured to acquire a position and a direction of each of a plurality of stopping vehicles,
the parking determination unit is configured to determine that the stopping vehicles are the street parking vehicles when the stopping vehicles constitute a row and at least one of the stopping vehicles is parked in a direction opposite to the other stopping vehicles, and
the point where each of the stopping vehicles exists is determined as a street parking point based on conditions of (a) no intersection nor traffic light existing within a predetermined first distance in a road travelling direction from the stopping vehicle and (b) a distance from a roadside to the stopping vehicle being within a predetermined second distance.

16. The vehicle device according to claim 15, further comprising:
- a subject vehicle behavior acquisition unit that is configured to detect, as a behavior of the subject vehicle, that the subject vehicle is parked, wherein
- the report processing unit is configured to specify a surrounding environment when the subject vehicle is parked based on an input signal from the surrounding monitoring sensor, and
- the report processing unit is configured to transmit, to the server, a data set including a position where the subject vehicle is parked when the subject vehicle is parked along a roadside.

17. A vehicle device for transmitting, to a server, information related to a parking-stopping point of a vehicle on a road, the vehicle device comprising:
- a stopping vehicle information acquisition unit that is configured to acquire, based on an input signal from a surrounding monitoring sensor mounted in a subject vehicle, information related to a stopping vehicle that is stopped on a road;
- a parking determination unit that is configured to determine, based on the information related to the stopping vehicle which is acquired by the stopping vehicle information acquisition unit, whether the stopping vehicle is a street parking vehicle parked on the road or a temporary stopping vehicle with a travelling state;
- a report processing unit that is configured to transmit, to the server, a data set indicative of a point where the street parking vehicle exists when the parking determination unit determines that the stopping vehicle is the street parking vehicle;
- wherein the point where the stopping vehicles exists is determined as a street parking point based on conditions of (a) no intersection nor traffic light existing within a predetermined first distance in a road traveling direction from the stopping vehicle and (b) a distance from a roadside to the stopping vehicle being within a predetermined second distance.

18. The vehicle device according to claim 17, wherein the parking determination unit is configured not to determine that the stopping vehicle is the street parking vehicle when the stopping vehicle has a distance from the roadside that is equal to or greater than a predetermined parking determination threshold value.

19. A parking-stopping point management device, comprising a processor and memory configured to implement:
- a determination criterion acquisition unit that is configured to acquire at least one of vehicle behavior data indicative of a behavior of at least one vehicle and sensing information of a surrounding monitoring sensor mounted in the at least one vehicle in association with position information of the at least one vehicle;
- a parking-stopping point detection unit that is configured to detect a street parking point which is a point where a vehicle is parked on a normal road;
- an existence state determination unit that is configured to determine whether the vehicle still exists at the street parking point detected by the parking-stopping point detection unit based on information acquired by the determination criterion acquisition unit; and
- a distribution processing unit that is configured to distribute information on the street parking point detected by the parking-stopping point detection unit to the at least one vehicle, wherein
- the parking-stopping point detection unit is further configured to:
- set, as the street parking point, a position of a vehicle stopping on a road when a distance between the vehicle stopping on the road and a roadside falls within a predetermined distance; and
- prioritize detection of the street parking point on the road at an exit side of an intersection over detection of the street parking point on the road at an entrance side of the intersection.

* * * * *